United States Patent
Tagnit-Hamou et al.

(10) Patent No.: US 9,856,171 B2
(45) Date of Patent: Jan. 2, 2018

(54) ULTRA-HIGH PERFORMANCE GLASS CONCRETE AND METHOD FOR PRODUCING SAME

(71) Applicant: SOCPRA SCIENCES ET GENIE S.E.C., Sherbrooke (CA)

(72) Inventors: Arezki Tagnit-Hamou, Sherbrooke (CA); Nancy Soliman, Sherbrooke (CA)

(73) Assignee: SOCPRA SCIENCES ET GÉNIE S.E.C., Sherbrooke (CA)

( * ) Notice: Subject to any disclaimer, the term of this patent is extended or adjusted under 35 U.S.C. 154(b) by 0 days.

(21) Appl. No.: 14/780,276

(22) PCT Filed: Mar. 28, 2014

(86) PCT No.: PCT/CA2014/050323
§ 371 (c)(1),
(2) Date: Sep. 25, 2015

(87) PCT Pub. No.: WO2014/153671
PCT Pub. Date: Oct. 2, 2014

(65) Prior Publication Data
US 2016/0039716 A1 Feb. 11, 2016

Related U.S. Application Data

(60) Provisional application No. 61/806,083, filed on Mar. 28, 2013.

(51) Int. Cl.
*C04B 28/02* (2006.01)
*C04B 24/28* (2006.01)
*B28B 11/24* (2006.01)
*C04B 28/04* (2006.01)
*C04B 20/00* (2006.01)

(52) U.S. Cl.
CPC ........... *C04B 24/283* (2013.01); *B28B 11/24* (2013.01); *C04B 20/008* (2013.01); *C04B 20/0076* (2013.01); *C04B 20/0088* (2013.01); *C04B 20/0092* (2013.01); *C04B 28/02* (2013.01); *C04B 28/04* (2013.01); *C04B 2201/52* (2013.01); *Y02W 30/91* (2015.05); *Y02W 30/94* (2015.05)

(58) Field of Classification Search
CPC ..... C04B 28/02; C04B 28/04; C04B 20/0076; C04B 20/008; C04B 20/0088; C04B 20/0092; C04B 14/06; C04B 14/22; C04B 14/48; C04B 14/062; C04B 14/42; C04B 18/146; C04B 18/04; C04B 40/0028; C04B 40/0024; C04B 2201/52; C04B 2103/32; C04B 2103/0088
See application file for complete search history.

(56) References Cited

U.S. PATENT DOCUMENTS

| | | | |
|---|---|---|---|
| 5,503,670 A | 4/1996 | Richard et al. | |
| 7,413,602 B2 | 8/2008 | Grasso, Jr. et al. | |
| 7,700,017 B2 | 4/2010 | McCarthy et al. | |
| 7,875,113 B2* | 1/2011 | Hughes | C04B 28/02 106/644 |
| 8,303,708 B2 | 11/2012 | Rigaud et al. | |
| 8,480,802 B2 | 7/2013 | McPherson | |
| 9,353,006 B2* | 5/2016 | Lura | C04B 28/02 |
| 2003/0037708 A1 | 2/2003 | Monawar | |
| 2003/0041783 A1 | 3/2003 | Monawar | |
| 2005/0045069 A1 | 3/2005 | McCarthy et al. | |
| 2009/0239977 A1* | 9/2009 | Dubey | C04B 28/02 524/5 |
| 2010/0229715 A1* | 9/2010 | Tonyan | F41H 5/0428 89/36.02 |
| 2010/0326326 A1* | 12/2010 | Rigaud | C04B 28/04 106/709 |
| 2012/0152153 A1* | 6/2012 | Gong | C04B 28/006 106/705 |
| 2012/0234208 A1 | 9/2012 | McPherson | |

FOREIGN PATENT DOCUMENTS

| | | |
|---|---|---|
| EP | 2837609 | 2/2015 |
| GB | 2442073 | 3/2008 |
| WO | 0158822 | 8/2001 |

(Continued)

OTHER PUBLICATIONS

Derwent-Acc—No. 2014-F28110, abstract of Chinese Patent Specification No. CN 103541500 A (Jan. 2014).*
Soutsos et al., Reactive glass powder concrete (RGPC)—"green" flags for "green" pavements IN K. Kovler, Concrete Durability and Service Life Planning—Concrete Life'09, Conference, Sep. 7-9, 2009, pp. 327-335, online, http://www.rilem.org/gene/main.php?base=500218&id_publication=70&id_papier=7849.
University of Liverpool, Concret Research Group, Sustainable Construction Products: Manufacturing Concret Using Recycled Materials, Brochure, Nov. 2009, p. 6, online, http://www.liv.ac.uk/media/livacuk/concrete/documents/University_of_Liverpool_Sustainable_Construction_Products_Br.pdf.
Kou et al., The Effect of Recycled Glass Powder and Reject Fly Ash on the Mechanical Properties of Fibre-Reinforced Ultrahigh Performance Concrete, Advances in Materials Science and Engineering, 2012, pp. 1-8, vol. 2012, online, http://dx.doi.org/10.1155/2012/263243.

(Continued)

*Primary Examiner* — Anthony J Green
(74) *Attorney, Agent, or Firm* — Robic, LLP.

(57) ABSTRACT

There is provided a Ultra-high performance glass concrete (UHPGC) including between 300 and 1000 kg/m³ of cement, between 0 and 1400 kg/m³ of glass sand (GS), between 0 and 300 kg/m³ of reactive pozzolanic material, between 150 and 900 kg/m³ of glass powder (GP), between 0 and 600 kg/m³ of fine glass powder (FGP), between 5 and 60 kg/m³ of superplasticizer, between 50 and 300 kg/m³ of fiber; and, between 130 and 275 kg/m³ of water, wherein the content of GP is of at least 3 wt % of the UHPGC, and/or the content of GS is of at least 19 wt % of the UHPGC and/or the content of FGP is of at least 0.5 wt % of the UHPGC.

28 Claims, 38 Drawing Sheets

(56) References Cited

FOREIGN PATENT DOCUMENTS

WO      0179132      10/2001
WO      2011130482      10/2011

OTHER PUBLICATIONS

U.S. Department of Transportation, Federal Highway Administration, Research, Development and Technology, Ultra-High Performance Concrete: A State-of-the-Art Report for the Bridge Community, Publication No. FHWA-HRT-13-060, Jun. 2013, pp. 5-12, online, http://www.fhwa.dot.gov/publications/research/infrastructure/structures/hpc/13060/13060.pdf.

Ductal, The Technology of Ductal®: Ten years of research, Ten years of experience, online, http://www.ductal.com/wps/portal/ductal/6_1-Ductal_overview.

Nassar et al : "Strength and durability of recycled aggregate concrete containing milled glass as partial replacement for cement". Construction and Building Materials, Elsevier, Netherlands, vol. 29, Oct. 12, 2011 (Oct. 12, 2011), pp. 368-377, XP028444497, ISSN: 0950-0618, DOI: 10.1016/J. CONBUILDMAT.2011.10.061 [retrieved on Oct. 19, 2011].

Nassar et al: "Green and durable mortar produced with milled waste glass", Magazine of Concrete Research, Thomas Telford, GB, vol . 64, No. 7, Jul. 1, 2012 (Jul. 1, 2012), pp. 605-615, XP008181951, ISSN: 0024-9831, DOI:10.1680/MACR.11.00082 [retrieved on May 25, 2012].

Zhao Hui et al: "Study of properties of mortar containing cathode ray tubes (CRT) glass as replacement for river sand fine aggregate", Construction and Building Materials, Elsevier, Netherlands, vol . 25, No. 10, Apr. 14, 2011 (Apr. 14, 2011), pp. 4059-4064, XP028375487, ISSN: 0950-0618, DOI: 10.1016/J. CONBUILDMAT.2011.04.043 [retrieved on Apr. 21, 2011].

M. Mageswari et al: "The Use of Sheet Glass Powder as Fine Aggregate Replacement in Concrete" Apr. 1, 2009, Sep. 8, 2009, Aug. 7, 2010 The Open Civil Engineering Journal, vol. 4, No. 1, Aug. 19, 2010 (Aug. 19, 2010) pp. 65-71, XP055013419, ISSN: 1874-1495, DOI: 10.2174/1874149501004010065.

* cited by examiner

ULTRA-HIGH PERFORMANCE GLASS CONCRETE AND METHOD FOR PRODUCING SAME

TECHNICAL FIELD OF THE INVENTION

The technical field relates to ultra-high performance concrete containing glass particles and, more particularly, waste glass particles. It also relates to a method for producing ultra-high performance glass concrete. This application is a national phase entry of PCT patent application serial number PCT/CA2014/050323, filed on Mar. 28, 2014, (now pending) designating the United States of America.

BACKGROUND

Ultra-High Performance Concrete (UHPC) is a type of concrete that was developed by agencies concerned with infrastructure protection. UHPC is characterized by being a steel fibre-reinforced cement composite material with compressive strengths in excess of 150 MPa. UHPC is also characterized by its constituent material make-up: typically fine-grained sand, quartz powder, silica fume, small steel fibers, and Portland cement. It is substantially free of large aggregate.

Reactive powder concrete (RPC) is one of the most widely used type of UHPC, which provides combinations of ultra-high strength, high ductility, and excellent durability characteristics.

Conventional reactive powder concrete (RPC) includes between 800 kg/m³ and 1000 kg/m³ of cement particles smaller than 100 μm, between 25 and 35 wt % of silica fume with particles between 0.10 and 0.20 μm, between 0 and 40 wt % of crushed quartz (or quartz powder) with particles smaller than 100 μm, between 110 wt % and 140 wt % quartz sand with particles between 150 and 630 μm, and 2.5 wt % of steel fibers. The percentages are based on the total cement content of the mix by weight. It is also characterized by a low water to binder ratio, typically between 0.11 and 0.25 as well as high amount of superplasticizer.

The RPC is designed with a high cement content ranging between 800 and 1000 kg/m³. Furthermore, estimate of the final hydration percentage of the cement in the UHPC ranges from 31 to 60% due to the very low water-to-cement ratio (w/cm). This huge amount of cement not only affects the production cost and consumes the natural sources of limestone, clay, coal, and electric power, but also has a negative effect on the environmental conditions through the carbon dioxides ($CO_2$) emission, which can contribute to the greenhouse effect. This can be illustrated by knowing that the production of 1.0 ton of cement (clinker) can emit approximately 1.0 ton of $CO_2$. The RPC fabrication requires a relatively high content of silica fume due to its extreme fineness, high amorphous silica content, as well as the physical (filler, lubrication) and pozzolanic effects. This high content of silica fume with limited resources and high cost is considered as one of the impedances of the RPC use in the concrete market. There is thus a need for other materials with similar functions to partially or fully substitute the silica fume in RPC. On the other hand, the use of quartz sand (QS) and quartz powder (QP) in the RPC do not satisfy the sustainability requirements. Also, silica fume, quartz sand and quartz powder are very expensive.

Glass is a material produced by melting a number of materials including silica, soda ash, and calcium carbonates (CaCO3) at a high temperature followed by cooling during which solidification occurs without crystallization. The glass can be recycled so many times without significant alternation of its physical and chemical properties. Large quantities of glass cannot be recycled because of breaking, color mixing, or expensive recycling cost. The amount of waste glass is gradually increased over the recent years due to an ever-growing use of glass products. Most of the waste glasses have been dumped into landfill sites, which is undesirable as it is not biodegradable and less environmentally friendly. Therefore, there is a need to find products in which waste glass can be incorporated.

BRIEF SUMMARY OF THE INVENTION

It is therefore an aim of the present invention to address the above mentioned issues.

According to a general aspect, there is provided an ultra-high performance glass concrete (UHPGC) comprising: a cement content between 300 and 1000 kg/m³; between 0 and 1400 kg/m³ of glass sand (GS); between 0 and 300 kg/m³ of reactive pozzolanic material; between 150 and 900 kg/m³ of glass powder (GP); between 0 and 600 kg/m³ of fine glass powder (FGP); between 5 and 60 kg/m³ of superplasticizer; between 50 and 300 kg/m³ of fiber; and between 130 and 275 kg/m³ of water, wherein a content of GP is of at least 3 wt % of the UHPGC, and/or a content of GS is of at least 19 wt % of the UHPGC, and/or a content of FGP is of at least 0.5 wt % of the UHPGC.

In an embodiment, the content of GP is of at least 6 wt % of the UHPGC, and/or the content of GS is of at least 26 wt % of the UHPGC, and/or the content of FGP is of at least 0.7 wt % of the UHPGC.

In an embodiment, the content of GP is of at least 8 wt % of the UHPGC, and/or the content of GS is of at least 30 wt % of the UHPGC, and/or the content of FGP is of at least 0.9 wt % of the UHPGC.

In an embodiment, the cement comprises particles smaller than about 100 μm.

In an embodiment, the cement is at least one of HS cement and LS cement.

In an embodiment, the content of glass powder (GP) ranges between about 10 wt % and about 80 wt % of the cement content.

In an embodiment, the glass powder comprises particles smaller than about 100 μm.

In an embodiment, the glass sand comprises particles smaller than about 850 μm.

In an embodiment, the glass sand comprises particles between about 150 μm and about 850 μm.

In an embodiment, the fine-glass powder comprises particles smaller than about 10 μm.

In an embodiment, a content of reactive pozzolanic material ranges between 15 wt % and 30 wt % of the cement content.

In an embodiment, the reactive pozzolanic material comprises silica fume.

In an embodiment, the silica fume comprises particles between about 0.10 μm and about 0.20 μm.

In an embodiment, the superplasticizer comprises polyacrylate.

In an embodiment, a content of the superplasticizer ranges between 1 wt % and 4 wt % of the cement content.

In an embodiment, the ultra-high performance concrete has a compressive strength between 130 MPa and 270 MPa.

In an embodiment, the ultra-high performance concrete has a compressive strength between 160 MPa and 230 MPa.

In an embodiment, the ultra-high performance concrete has a slump-flow between 130 mm and 350 mm.

In an embodiment, the ultra-high performance concrete has a water to binder ratio between 0.10 and 0.30.

In an embodiment, the ultra-high performance concrete has a water to binder ratio between 0.15 and 0.25.

In an embodiment, the ultra-high performance concrete has a packing density between 0.71 and 0.85.

According to another general aspect, there is provided an Ultra-high performance glass concrete (UHPGC) comprising: between about 15 wt % and about 40 wt % of cement; between about 0 wt % and about 40 wt % of glass sand (GS); between about 4.5 wt % and about 10 wt % of reactive pozzolanic material; between about 5 wt % and about 25 wt % of glass powder (GP); between about 0 wt % and about 10 wt % of fine glass powder (FGP); between about 0.2 wt % and about 4 wt % of superplasticizer; between about 1.5 wt % and about 4 wt % of fibers; and between about 4 wt % and about 10 wt % of water, wherein a sum of GS+GP+FGP is greater than or equal to about 10 wt %.

In an embodiment, the sum GS+GP+FGP is greater than or equal to about 30 wt %.

In an embodiment, the sum GS+GP+FGP is greater than or equal to about 50 wt %.

In an embodiment, the sum GS+GP+FGP is greater than or equal to about 65 wt %.

In an embodiment, a content of GP is of at least 6 wt % of the UHPGC, and/or a content of GS is of at least 26 wt % of the UHPGC, and/or a content of FGP is of at least 0.7 wt % of the UHPGC.

In an embodiment, a content of GP is of at least 8 wt % of the UHPGC, and/or a content of GS is of at least 30 wt % of the UHPGC, and/or a content of FGP is of at least 0.9 wt % of the UHPGC.

In an embodiment, the cement comprises particles smaller than about 100 μm.

In an embodiment, the cement is at least one of HS cement and LS cement.

In an embodiment, the glass powder comprises particles smaller than about 100 μm.

In an embodiment, the glass sand comprises particles smaller than about 850 μm.

In an embodiment, the glass sand comprises particles between about 150 μm and about 850 μm.

In an embodiment, the fine-glass powder comprises particles smaller than about 10 μm.

In an embodiment, a content of reactive pozzolanic material ranges between 15 wt % and 30 wt % of the cement content.

In an embodiment, the reactive pozzolanic material comprises silica fume.

In an embodiment, the silica fume comprises particles between about 0.10 μm and about 0.20 μm.

In an embodiment, the superplasticizer comprises polyacrylate.

In an embodiment, the content of the superplasticizer ranges between 1 wt % and 4 wt % of the cement content.

In an embodiment, the ultra-high performance concrete has a compressive strength between 130 MPa and 270 MPa.

In an embodiment, the ultra-high performance concrete has a compressive strength between 160 MPa and 230 MPa.

In an embodiment, the ultra-high performance concrete has a slump-flow between 130 mm and 350 mm.

In an embodiment, the ultra-high performance concrete has a water to binder ratio between 0.10 and 0.30.

In an embodiment, the ultra-high performance concrete has a water to binder ratio between 0.15 and 0.25.

In an embodiment, the ultra-high performance concrete has a packing density between 0.71 and 0.85.

According to another general aspect, there is provided a method for producing an ultra-high performance concrete, the method comprising: mixing together cement particles, reactive pozzolanic material, and glass powder for a first period of time wherein the reactive pozzolanic material is in a ratio of between 0.15 and 0.30 of the cement content and the glass powder is in a ratio of between 0.10 and 0.80 of the cement content; diluting a superplasticizer in water wherein the superplasticizer is in a ratio of between 0.01 and 0.04 of the cement content; adding a first quantity of the diluted superplasticizer to the mixed particles; mixing the mixed particles with the first quantity of the diluted superplasticizer for a second period of time; then, adding a remaining quantity of the diluted superplasticizer and fibers; mixing the mixed particles with the diluted superplasticizer and the fibers for a third period of time; and then, casting the mixed particles with diluted superplasticizer and the fibers to obtain the ultra-high performance concrete.

In an embodiment, the method further comprises adding at least one of quartz sand, glass sand, quartz powder, and fine glass powder to the cement particles, the reactive pozzolanic material and the glass powder and mixing together for the first period of time, wherein the quartz sand is in a ratio between 0 and 1.4 of the cement content, the glass sand is in a ratio between 0 and 1.4 of the cement content, the quartz powder is in a ration between 0 and 0.3 of the cement content, and the fine glass powder is in a ratio of 0 and 0.3 of the cement content.

In an embodiment, the method further comprises demoulding the ultra-high performance concrete and curing the demoulded ultra-high performance concrete.

In an embodiment, the reactive pozzolanic material comprises silica fume.

According to another general aspect, there is provided a composition for a ultra-high performance concrete comprising: cement particles; quartz sand in a ratio between 0 and 1.4 of the cement content, glass sand in a ratio between 0 and 1.40 of the cement content, quartz powder in a ratio between 0 and 0.30 of the cement content, reactive pozzolanic material in a ratio between 0.15 and 0.30 of the cement content, glass powder in a ratio between 0.10 and 0.80 of the cement content, fine glass powder in a ratio between 0 and 0.40 of the cement content, a superplasticizer in a ratio between 0.01 and 0.04 of the cement content, fibers, and wherein the composition has a water to binder ratio between 0.10 and 0.30.

In an embodiment, the reactive pozzolanic material comprises silica fume.

In an embodiment, the silica fume comprises particles between about 0.10 μm and about 0.20 μm.

In an embodiment, a content of GP is of at least 6 wt % of the composition, and/or a content of GS is of at least 26 wt % of the composition, and/or a content of FGP is of at least 0.7 wt % of the composition.

In an embodiment, a content of GP is of at least 8 wt % of the composition, and/or a content of GS is of at least 30 wt % of the composition, and/or a content of FGP is of at least 0.9 wt % of the composition.

In an embodiment, the cement comprises particles smaller than about 100 μm.

In an embodiment, the cement is at least one of HS cement and LS cement.

In an embodiment, the ratio of the glass powder (GP) ranges between about 0.2 and 0.7 of the cement content.

In an embodiment, the ratio of glass powder (GP) ranges between about 0.3 and 0.6 of the cement content.

In an embodiment, the glass powder comprises particles smaller than about 100 μm.

In an embodiment, the ratio of glass sand is above 0.8 of the cement content.

In an embodiment, the glass sand comprises particles smaller than about 850 μm.

In an embodiment, the glass sand comprises particles between about 150 μm and about 850 μm.

In an embodiment, the ratio of fine-glass powder ranges between 0.1 and 0.4 of the cement content.

In an embodiment, the ratio of fine glass powder ranges between 0.3 and 0.4 of the cement content.

In an embodiment, the fine-glass powder comprises particles smaller than about 10 μm.

In an embodiment, the superplasticizer comprises polyacrylate.

In an embodiment, the ultra-high performance concrete has a compressive strength between 130 MPa and 270 MPa.

In an embodiment, the ultra-high performance concrete has a compressive strength between 160 MPa and 230 MPa.

In an embodiment, the ultra-high performance concrete has a slump-flow between 130 mm and 350 mm.

In an embodiment, the composition has a water to binder ratio between 0.10 and 0.30.

In an embodiment, the composition has a water to binder ratio between 0.15 and 0.25.

In an embodiment, the ultra-high performance concrete has a packing density between 0.71 and 0.85.

BRIEF DESCRIPTION OF THE DRAWINGS

FIG. 10 includes FIG. 10a and FIG. 10b and are graphs showing the compressive strength in MPa of a RPC (Ref-1) and an embodiment of UHPGC (Mix A) wherein 100 wt % of quartz sand of the RPC is replaced by glass sand.

FIG. 11 includes FIG. 11a and FIG. 11b and are graphs showing the compressive strength in MPa of a RPC (Ref-1) and an embodiment of UHPGC (Mix B) wherein 30 wt % of cement of Ref-1 is replaced by glass powder.

FIG. 12 includes FIG. 12a and FIG. 12b and are graphs showing the compressive strength in MPa of a RPC (Ref-1) and another embodiment of UHPGC (Mix C) wherein 100 wt % of quartz powder of Ref-1 is replaced by glass powder.

FIG. 15 includes FIG. 15a and FIG. 15b and are graphs showing the compressive strength in MPa of a RPC (Ref-1) and an embodiment of UHPGC (Mix D)

FIG. 16 includes FIG. 16a and FIG. 16b.

FIG. 17 includes FIG. 17a and FIG. 17b.

FIG. 18 includes FIG. 18a and FIG. 18b.

FIG. 19 includes FIG. 19a and FIG. 19b.

FIG. 20 includes FIG. 20a and FIG. 20b, which are graphs showing the compressive strength in MPa of a traditional RPC (Ref-2) and an embodiment of UHGPC (Mix P).

FIG. 21 includes FIG. 21a and FIG. 21b, which are graphs showing the compressive strength in MPa of a traditional RPC (Ref-2) and an embodiment of UHGPC (Mix Q).

FIG. 22 includes FIG. 22a and FIG. 22b, which are graphs showing the compressive strength in MPa of a traditional RPC (Ref-2) and an embodiment of UHGPC (Mix R).

FIG. 23 includes FIG. 23a and FIG. 23b, which are graphs showing the compressive strength in MPa of a traditional RPC (Ref-2) and an embodiment of UHPGC (Mix S).

FIG. 24 includes FIG. 24a and FIG. 24b, which are graphs showing the compressive strength in MPa of a traditional RPC (Ref-2) and an embodiment of UHPGC (Mix T).

FIG. 25 includes FIG. 25a and FIG. 25b, which are graphs showing the compressive strength in MPa of a traditional RPC (Ref-2) and an embodiment of UHPGC (Mix U).

FIG. 26 includes FIG. 26a and FIG. 26b, which are graphs showing the compressive strength in MPa of a traditional RPC (Ref-2) and an embodiment of UHPGC (Mix V).

It will be noted that throughout the appended drawings, like features are identified by like reference numerals.

DETAILED DESCRIPTION

Figure 1:
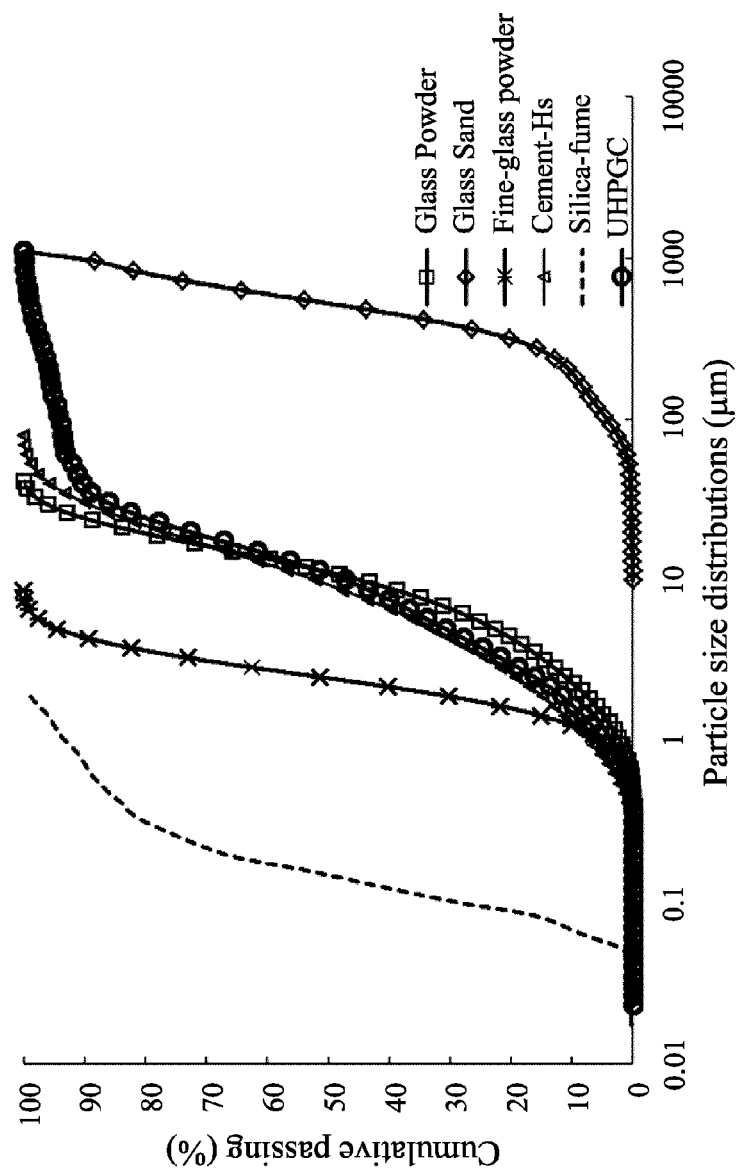
FIG. 1 is a graph showing the proportions and the granulometry of the UHPGC constituents, individually and when combined together, in accordance with an embodiment.

A new Ultra-High Performance Glass Concrete (UHPGC) is described below in which glass material with different particle size distribution is used as granular replacement for conventional RPC components. In an embodiment, the glass material is waste glass material.

The composition of a mix for the UHPGC includes cement, a reactive pozzolanic material such as silica fume (SF), glass powder (GP), a superplasticizer (SP) such as polyacrylate, fibers, water, and, optionally, quartz sand (QS), glass sand (GS), quartz powder (QP), and fine glass powder (FGP). The composition of the mix for the UHPGC is shown below in Table 1.

As mentioned above, the composition of the UHPGC comprises between 300 kg/m$^3$ and 1000 kg/m$^3$ of cement or between 400 kg/m$^3$ and 900 kg/m$^3$ of cement. In an embodiment, the cement particles are smaller than about 100 μm. In an embodiment, the cement can be of type HS (high-sulfate resistance cement) or LH (Low Heat cement).

As mentioned above, the composition of the UHPGC comprises glass powder. In an embodiment, the composition comprises glass powder in a concentration ranging between 10 wt % and 90 wt % of the cement content. In an embodiment, the composition comprises between 150 kg/m$^3$ and 900 kg/m$^3$ of glass powder, or between 200 kg/m$^3$ and 800 kg/m$^3$ of glass powder, or between 200 kg/m$^3$ and 700 kg/m$^3$ of glass powder, or again between 5 wt % and 25 wt % of glass powder of the total concrete mass. In an embodiment, glass powder is characterized with particles smaller than 100 μm. Glass powder can be used as replacement to quartz powder and cement in traditional RPC. More particularly, in an embodiment, glass powder is used in replacement of up to 100 wt % of crushed quartz (or quartz powder) with respect to conventional RPC and/or up to 50 wt % of cement with respect to conventional RPC.

The composition of the UHPGC can comprise glass sand. In an embodiment, the composition comprises glass sand in a concentration ranging between 0 and 140 wt % of the total cement content. In an embodiment, the composition comprises between 0 kg/m$^3$ and 1400 kg/m$^3$ of glass sand, or between 0 kg/m$^3$ and 1150 kg/m$^3$ of glass sand. In an embodiment, the glass sand has particles smaller than 850 μm and, in a particular embodiment, has particles between about 150 μm and about 850 μm. In a particular embodiment, the glass sand has particles smaller than 800 μm, with a $d_{50}$ of about 550 μm. Glass sand can be used as a granular replacement to quartz sand in conventional RPC. More particularly, in an embodiment, glass sand is used in replacement of up to 100 wt % of quartz sand in conventional RPC.

The composition of the UHPGC can comprise fine-glass powder. In an embodiment, the composition comprises fine-glass powder in a concentration ranging between 0 and 60 wt %, or between 0 and 40 wt %, or between 0 and 30 wt % of the total cement content. In an embodiment, the composition comprises between 0 kg/m$^3$ and 600 kg/m$^3$ of fine-glass powder, or between 0 kg/m$^3$ and 250 kg/m$^3$ of fine-glass powder. In an embodiment, fine-glass powder is characterized with particles smaller than 10 μm. In an embodiment, fine-glass powder can be used as replacement to up to 70 wt % of silica fume in conventional RPC as well as a replacement of 100 wt % of quartz powder.

In an embodiment, the composition of the UHPGC further comprises silica fume (SF), as reactive pozzolanic material. It is understood that reactive pozzolanic materials include silica fume, also known as micro-silica, which is a by-product in the production of silicon or ferrosilicon alloys. In an alternative embodiment, other reactive pozzolanic materials such as metakaolin may be used. In an embodiment, the UHPGC can include a mixture of silica fume and metakaolin. In an embodiment, the composition comprises reactive pozzolanic material, such as silica fume and/or metakaolin, in a concentration ranging between 0 wt % and 30 wt % of the cement content, or between 0 wt % and 15 wt % of the cement content, or again between 15 wt % and 30 wt % of the cement content. In an embodiment, the composition comprises between 0 kg/m$^3$ and 300 kg/m$^3$ of reactive pozzolanic material, or between 130 kg/m$^3$ and 260 kg/m$^3$ of reactive pozzolanic material, such as silica fume and/or metakaolin. In an embodiment, the particles of reactive pozzolanic material, such as silica fume range between about 0.10 μm and about 0.20 μm and typical mean particle size for metakaolin is 1.3 μm. In an embodiment, the particles of metakaolin range between about 0.20 μm and about 4 μm.

The composition of the UHPGC also comprises fibers (such as steel fibers, natural fibers, carbon fiber, and glass fibers), a superplasticizer, and water. The fibers are added to increase tensile strength and improve ductility. In an embodiment, the fibers are micro-fibers such as fibers having a length of about 11 to 14 mm, and more particularly about 13 mm, and a diameter of about 1 to 5 mm, and more particularly 2 mm. In an embodiment, the composition comprises fibers in a concentration ranging between 1.5 and 4 wt % of the total cement content, or between 1.5 and 3 wt % of the total cement content.

The superplasticizer used with the UHPGC mixture is a high-range water reducer composed of powerful organic polymers used to disperse cement particles and improving the flowability of mixes. In one embodiment, the superplasticizer comprises polyacrylate and, more particularly, polycarboxylate, which works essentially by steric repulsion. In an embodiment, the composition comprises superplasticizer in a concentration ranging between 1 wt % and 4 wt %, or between 1 wt % and 3 wt % of the total cement content. In an embodiment, the composition comprises between 5 kg/m$^3$ and 60 kg/m$^3$ of superplasticizer, or between 10 kg/m$^3$ and 35 kg/m$^3$ of superplasticizer.

The UHPGC can also include quartz sand and quartz powder. In an embodiment, the quartz sand particles range between about 150 μm and about 650 μm. In an embodiment, the quartz powder particles are smaller than about 100 μm. In an embodiment, the composition comprises quartz sand in a concentration ranging between 0 and 140 wt % of the total cement content. In an embodiment, the composition comprises between 0 kg/m$^3$ and 1400 kg/m$^3$ of quartz sand, or between 0 kg/m$^3$ and 1150 kg/m$^3$ of quartz sand. In an embodiment, the composition comprises quartz powder in a concentration ranging between 0 and 30 wt % of the total cement content. In an embodiment, the composition comprises between 0 kg/m$^3$ and 400 kg/m$^3$ of quartz powder, or between 0 kg/m$^3$ and 260 kg/m$^3$ of quartz powder.

The UHPGC has a total water content between 130 kg/m$^3$ and 275 kg/m$^3$, or between 135 kg/m$^3$ and 260 kg/m$^3$. The water content may be determined in accordance with the water-to-binder ratio.

The resulting UHPGC is characterized by a compressive strength between 130 MPa and 270 MPa in normal curing regime and, in a particular embodiment, between 160 MPa and 230 MPa in hot curing regime. In an embodiment, the UHPGC is characterized by a slump flow between 130 and 350 mm. The slump of the UHPGC is measured using the flow table test according to ASTM C 1437-07.

The UHPGC composition is characterized by water to binder ratio between 0.10 and 0.30 and, in a particular embodiment, between 0.15 and 0.25. The binder (b) is composed of cement, such as Portland cement, and the reactive pozzolanic material as well as the amount of glass powder and the amount of the fine glass powder. More specifically, the water to binder ratio is defined as the ratio of water to (cement+reactive pozzolanic material+glass powder replacing cement+glass powder replacing reactive pozzolanic material+fine glass powder replacing cement+fine glass powder replacing reactive pozzolanic material).

It is understood that throughout the specification, "cement content", "cement mass" or "cement weight" refers to the cement mass alone, without taking into account the replacement constituents. It is also understood that "total cement mass", or "total cement weight", or "total cement content" refers to the sum (cement+GP replacing cement+FGP replacing cement).

In an embodiment, the dry mixture, i.e. all constituents except water and fibers, is characterized by a packing density between 0.71 and 0.85.

Table 1 shows the constituents of the UHPGC including their relative content (in kg/m$^3$ and in wt % according to cement content) and their properties (diameter range and mean diameter). In Table 1, the value of each individual constituent is estimated according to 100% of cement or the percentage value of cement and the percentage value of glass powder that replaces cement based on the original RPC composition. For instance, the value of silica fume equals 25 wt % of the total cement weight (100 wt %) or the combination of 50 wt % of cement and 50 wt % of glass powder that replaces cement or the combination of 70 wt % of cement and 30 wt % of glass powder that replaces cement or 80 wt % of cement and 20 wt % of glass powder that replaces cement, etc.

Table 2 shows the chemical characterization of several constituents of the UHPGC in accordance with an embodiment. Table 3 shows the physical properties of several constituents of the UHPGC in accordance with an embodiment.

FIG. 1 shows the proportions and the granulometry of the UHPGC constituents individually and when combined together, in accordance with an embodiment.

TABLE 1

Constituents of UHPGC.

| Constituents | Mix design (kg/m$^3$) | Typical diameter range (μm) | Mean diameter (μm) | Mix design (%) Total weight according to cement weight |
|---|---|---|---|---|
| Type HS or LH cement | 300-1000 | <100 | | 50-100 |
| Quartz sand | 0-1400 | 150-600 | 250 | 0-140 |
| Glass Sand | 0-1400 | 150-1000 | 250-400 | 0-140 |
| Quartz powder | 0-400 | <100 | 10-13 | 0-40 |
| Silica fume | 0-300 | 0.10-0.20 | | 0-30 |
| Glass Powder | 150-900 | <100 | 10-13 | 10-90 |
| Fine glass powder | 0-600 | 1-7 | 2 | 0-60 |
| Superplasticizer (Polyacrylate) | 5-60 | — | — | 1-4 |
| Steel fibers | 50-300 | 12.7 mm | — | 1.5-4 |
| Total water | 130-260 | | — | 0.10-0.30 (w/b) |
| Compressive strength (f$_c$'), MPa | 130-270 | In two different regime (Normal and hot curing) | | |
| Packing density range | 0.71-0.85 | | | |

TABLE 2

Characterization of constituents

| Identification | QS (wt %) | QP (wt %) | GS (wt %) | GP (wt %) | FGP (wt %) | HS cement (wt %) | LH cement (wt %) | SF (wt %) |
|---|---|---|---|---|---|---|---|---|
| Silicon Dioxide ($SiO_2$) | 99.811 | 98.844 | 72.475 | 72.056 | 72.056 | 22.0 | 23.260 | 99.8 |
| Iron Oxide ($Fe_2O_3$) | 0.045 | 0.045 | 0.275 | 0.381 | 0.381 | 4.3 | 4.780 | 0.09 |
| Aluminum Oxide ($Al_2O_3$) | 0.140 | 0.757 | 1.713 | 1.490 | 1.490 | 3.5 | 3.351 | 0.11 |
| Calcium Oxide (CaO) | 0.166 | 0.029 | 11.104 | 11.267 | 11.267 | 65.6 | 64.541 | 0.382 |
| Titanium Dioxide ($TiO_2$) | 0.015 | 0.045 | 0.058 | 0.041 | 0.041 | 0.151 | 0.170 | — |
| Sulfur trioxide ($SO_3$), | — | — | — | — | — | 2.3 | 2.229 | — |
| Magnesium Oxide (MgO) | 0.008 | 0.014 | 0.975 | 1.204 | 1.204 | 1.91 | 0.054 | 0.246 |
| Sodium oxide ($Na_2O$) | — | — | 12.56 | 12.856 | 12.856 | 0.07 | 0.046 | 0.20 |
| Potassium Oxide ($K_2O$) | 0.053 | 0.185 | 0.589 | 0.527 | 0.527 | 0.86 | 0.543 | 0.536 |
| Equivalent alkali ($Na_2O_{eq}$) | — | — | — | — | — | 0.95 | — | — |
| Zinc oxide (ZnO) | — | — | — | — | — | 0.097 | 0.010 | 0.25 |
| Loss on ignition (LOI) | 0.23 | 0.18 | 0.718 | 0.51 | 0.51 | 1.017 | 0.9 | 3.5 |
| $C_3S$ | — | — | — | — | — | 50 | 28 | — |
| $C_2S$ | — | — | — | — | — | 25 | 49 | — |
| $C_3A$ | — | — | — | — | — | 2.0 | 4 | — |
| $C_4AF$ | — | — | — | — | — | 14 | 12 | — |

TABLE 3

Physical properties of constituents

| Identification | QS | QP | GS | GP | HS cement | LH cement | FGP | SF |
|---|---|---|---|---|---|---|---|---|
| Specific gravity (g/cm$^3$) | 2.71 | 2.75 | 2.57 | 2.60 | 3.21 | 3.21 | 2.60 | 2.2 |
| Blaine surface (m$^2$/kg) | — | — | — | 382 | 367 | 367 | — | 20,000 |
| Moisture content | <0.1% | <0.1% | 0% | 0% | — | — | 0% | — |
| Size distribution (μm) | <600 | <100 | ≤1000 | <100 | <100 | <100 | <10 | <2 |
| Mean PSD at d50 (μm) | 250 | 13 | 350 | 13 | 11 | 12 | 3 | 0.15 |

Selecting Granular Materials for UHPGC

The fields of particle packing deals with problem of selecting appreciate size and proportion of particulate materials to obtain compact mixture. Typically, when the packing of the mix is optimized, the porosity can be decreased and the strongest matrix can be obtained. For selecting the granular mixture with a relatively low porosity, more fine particles are needed to fill the voids of the system. These fine particles expel water from the voids and help the water to be more homogenously distributed in the system. This can improve the workability of mixture.

The packing of granular mixtures (quartz sand (QS), quartz powder (QP), cement, silica fume (SF)) was determined by using the compressible packing model [F. de Larrard, "Concrete Mixture-Proportioning—A Scientific Approach", Modern Concrete Technology Series No. 9, S. Mindess and A. Bentur, editors, E & FN SPON, London, 421 p.].

The various physical properties such as specific gravity, particle size distribution, density, and other properties for the different materials used were determined, as indicated in Table 4. Initially, the unitary packing density was determined under two packing conditions: dry packing for quartz sand (QS) using ICT test and wet packing for cement, quartz powder (QP), and silica fume (SF) using Vicat needle test. From the results of unitary packing density measurements of each individual parameter (Table 4), the unitary packing of quartz sand (QS) was slightly higher than that of other grades. According to de Larrard, 1999, this could be attributed to the coarse friction being more amenable to vibratory compaction due to the fewer contact points between grains than the finer fraction.

TABLE 4

Constituents properties and unitary packing of quartz sand, quartz powder, cement, and silica fume

| Materials | Symbol | Dry packing method (ICT) | Wet packing method (Vicat) | Compressible packing index | Density | Typical diameter range | Mean particle size distribution $d_{50}$ | Ratio to previous size class |
|---|---|---|---|---|---|---|---|---|
| Quartz sand | QS | 0.65 | — | 9.0 | 2.65 | (150-630 μm) | 250 μm | — |
| Quartz powder | QP | — | 0.53 | 6.7 | 2.75 | (<100 μm) | 13 μm | 19:1 |

TABLE 4-continued

Constituents properties and unitary packing of quartz sand, quartz powder, cement, and silica fume

| Materials | Symbol | Dry packing method (ICT) | Wet packing method (Vicat) | Compressible packing index | Density | Typical diameter range | Mean particle size distribution $d_{50}$ | Ratio to previous size class |
|---|---|---|---|---|---|---|---|---|
| Cement | C | — | 0.54 | 6.7 | 3.25 | (<100 µm) | 10 µm | 1.3:1 |
| Silica fume | SF | — | 0.45 | 6.7 | 2.2 | (0.1-0.2 µm) | 0.13 µm | 67:1 |

Figure 2:
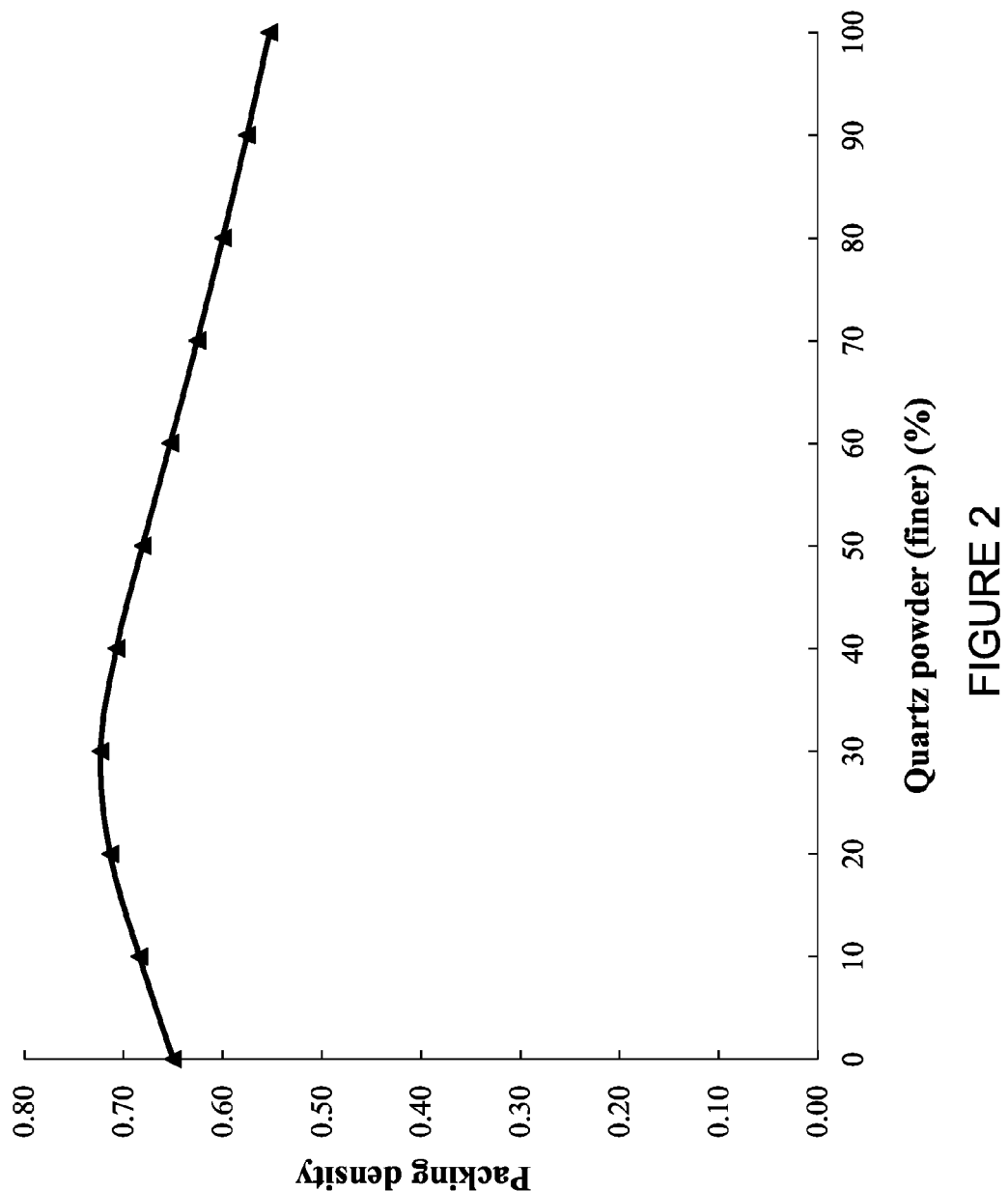
FIG. 2 is a graph showing the packing density of combined quartz powder and quartz sand.

In the next stage, the binary combination between QS and QP was determined, as shown in FIG. 2. In general, the binary mixture showed higher packing density than unitary packing due to filling of the void spaces by the finer particles. The addition of QP to the unitary packing of QS has increased the packing at 30% finer quartz addition. The highest packing density of 0.73% was registered for the combination QS and QP.

Figure 3:
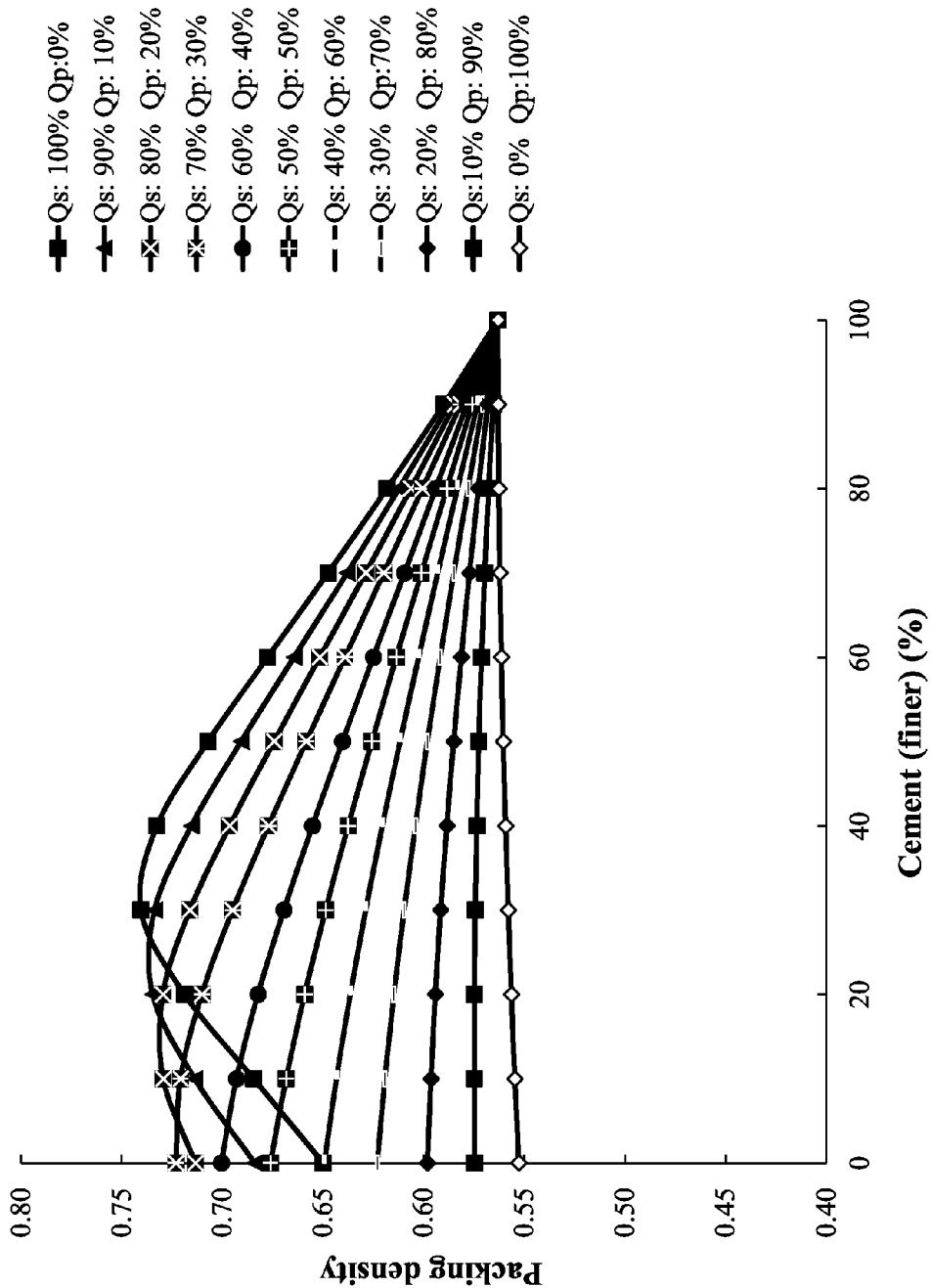
FIG. 3 is a graph showing the packing density of combined glass powder and glass sand.

The ternary combination were prepared by taking a binary combination between the QS and QP such as 100% QS and 0% QP with different cement replacements from 0 to 100% (from both the QS and QP). The combination ratios were varied between 0% and 100%, as indicated in FIG. 3. It can be observed from FIG. 3 that the addition of cement to the binary packing of QS and QP, in general, had slightly an effect on the packing density due to interaction between particle size of the QP and cement. The highest packing density of 0.74% was determined for the ternary combination QS, QP and cement with QP of 63%, QP of 7% and cement of 30%.

Figure 4:
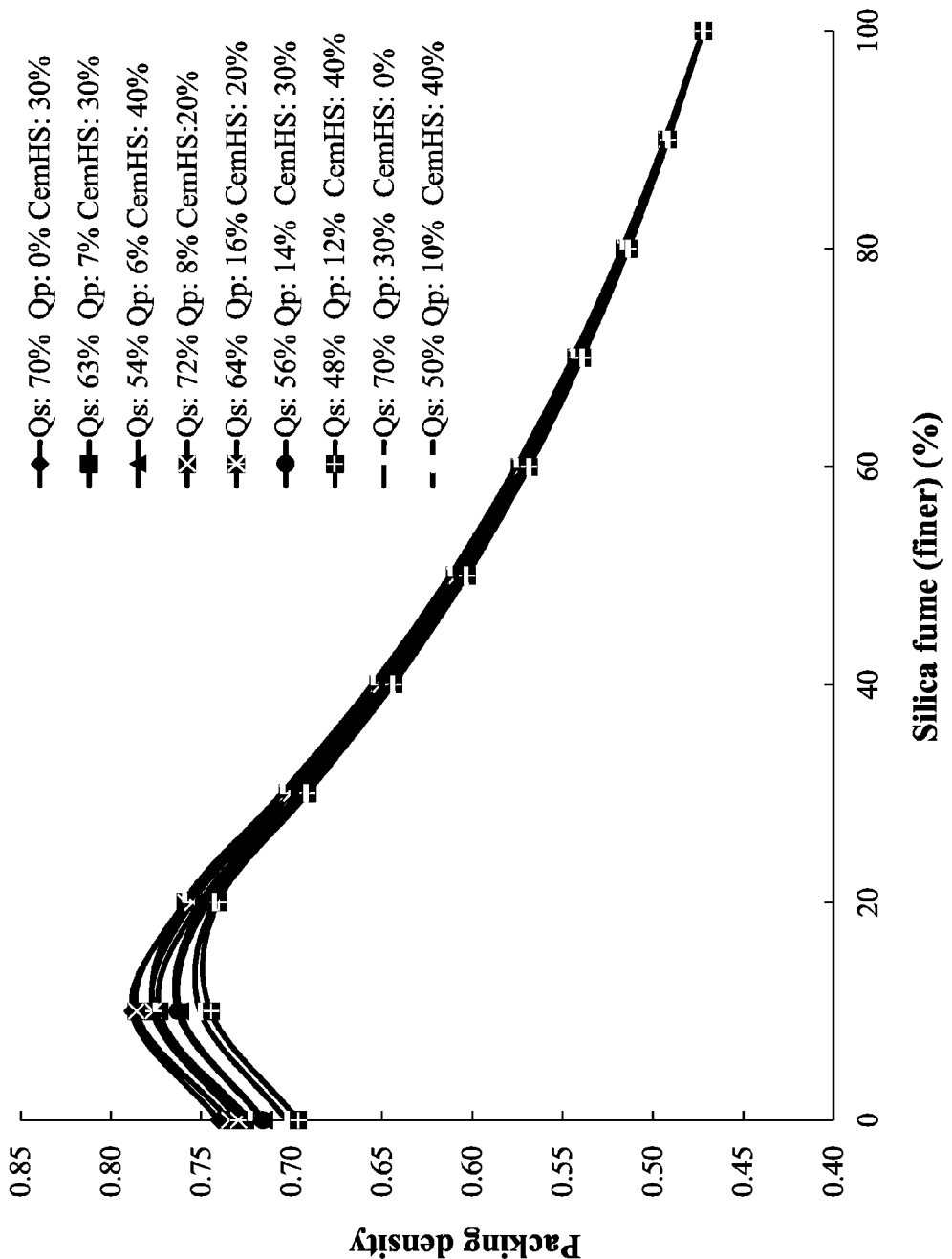
FIG. 4 is a graph showing the packing density of combined quartz powder, quartz sand, and cement.

Nine sets of ternary combination between the quartz sand (QS), quartz powder (QP), and cement that gave the maximum packing density were selected for further studies of packing density effect on quaternary granular system (FIG. 4). The silica fume (SF) as one of the important filler materials in the development of the RPC was chosen as the forth granular material. For the nine selected combinations between the quartz sand (QS), quartz powder (QP), and cement, the silica fume (SF) was added in denomination of 10% from 0% to 100%. The resultant packing density for the quaternary system is shown in FIG. 4. From FIG. 4, the quaternary combination of QS=56.7%, QP=6.3%, cement=27% and SF=10% had the best packing density of 0.76%. Obviously at these percentages the amount of quartz sand (QS) is slightly high. In general, higher packing density is preferred, although the maximum packing density may not be the optimal. Accordingly, the selected optimal packing density was 0.78%, which was obtained for a quaternary combination of QS=48.6%, QP=5.4%, cement=36%, and SF=10% (FIG. 4).

Water-Binder Ratio (w/b)

The water to binder ratio (w/b) of the UHPGC composition is between 0.10 and 0.30 and, in a particular embodiment, between 0.15 and 0.25. The water to binder ratio was selected to obtain a UHPC mixture characterized with a relatively compression strength and a suitable workability.

Packing Density Analysis: Vicat Test

The wet packing density of material passing the N 200 sieve can be determined by several test methods as indicated in the literature such as the Vicat test and the "thick paste" test. The thick paste test is described and recommended by de Larrard [de Larrard, 1999]. Both test methods yielded similar results, however the thick paste test had difficulty to define the microfines. For that reason the Vicat test was used. Vicat needle apparatus (ASTM C 187) was used for the determination of the normal consistency of hydraulic cement. The apparatus consisted of a metallic frame bearing a sliding rod with a cap at top, one Vicat conical mould, split type and glass base plate, and consistency plunger. An adjustable indicator moved over a graduated scale. The plunger was attached to the bottom end of the rod to make up the test weight of 300 g. Knowing the amount of water from the test, the packing density (φ) was calculated using:

$$\phi = \frac{1}{1 + \rho_s(w/s)}$$

where;

$\rho_s$ is density of the solid materials, w is water mass, and s is mass of solid materials.

Dry Packing Method—Intensive Compaction Tester (ICT)

Intensive compaction test (ICT) was used to determine the packing density of aggregate with a particle size distribution ≥125 µm according to De Larrard [De Larrard, F., "Concrete Mixture Proportioning: A Scientific Approach," London, 1999]. The main unit of the ICT is composed of a turntable and a cylinder which exerts a pressure ranging between 20 and 1000 kPa. The applied pressure used was 20 kPa to avoid crushing the aggregate during the test. Other accessories including a cylindrical container, top and bottom plates, and calibration parts were used with the ICT. The container was rigid and had an inside diameter at least five times the maximum size of aggregate.

The packing density of the particles with particle size distribution of 100 µm such as the quartz sand was determined, as follows;

(1) Calibration of the main unit parameters: this procedure was performed using a computer program associated with the compactor. The test pressure, initial mass of the sample, etc) were the inputs in the program.

(2) The material was tested in oven-dry or in saturated-surface dry conditions.

(3) The sample was spilled into the container, then the main unit was closed and the test started. Once the test started, the compactor exerted compression and shear forces on the tested sample. The computer program recorded the changes in the density of the material, the height of the sample, and the shear resistance opposed to the material. The number of cycles was limited to 200, because the density varied very little beyond this number.

(4) The packing density (φ) is defined as the volume of solids in a unit volume. If a weight of aggregate (w) with a specific gravity (SG) fills a container of a volume (Vc), then the φ can be calculated as in:

$$\phi = \frac{V_s}{V_c} = \frac{w}{V_c \cdot SG}$$

Fresh and Rheological Test Methods

As soon as mixing was completed, the measurements of the rheological properties of the RPC were carried out. The tests included fresh concrete temperature, as well as unit weight and air content (ASTM C 185-02). The rheology of the RPC was measured using the flow table test (ASTM C 1437-07). The flow table consists of a flow table, standard calipers, tamping rod, and a mini slump cone (70 mm in top diameter, 100 mm in bottom diameter, and 50 mm in height). To perform the test, the mini slump cone was filled then removed to allow the RPC to flow outward. Once the concrete reached a steady state, three diameters at three locations for the spread concrete were taken to determine the average diameter. The flow table was then dropped 25 times in approximately 25 seconds. The concrete was allowed to settle then the average diameter was determined in similar way.

Compressive Strength Test

The compressive strength ($f_c$) measurements for the RPC were measured on cubes (50×50×50 mm$_3$) according to ASTM C 109/C 109M. The compressive strength machine was adjusted for the RPC testing to have a loading rate of 2500 Newtons in 10 seconds. The $f_c$ normally represents the average of three samples.

Optimization of Optimum Granular Materials of UHPGC (Combined Between all the Different Granulametery of Waste Glass Materials)

The packing of granular mixtures (GS, GP, cement, FGP, and SF) was determined predicted by using the compressible packing model [de Larrard, 1999]. The various physical properties such as specific gravity, PSD, density, and other properties for the different materials used in this study were determined, as indicated in Table 5. Initially, the unitary packing density was determined under two packing conditions: dry packing for GS using ICT test and wet packing for cement, GP, FGP and SF using Vicat needle test. From the results of unitary packing density measurements of each individual parameter (Table 5).

Figure 6:
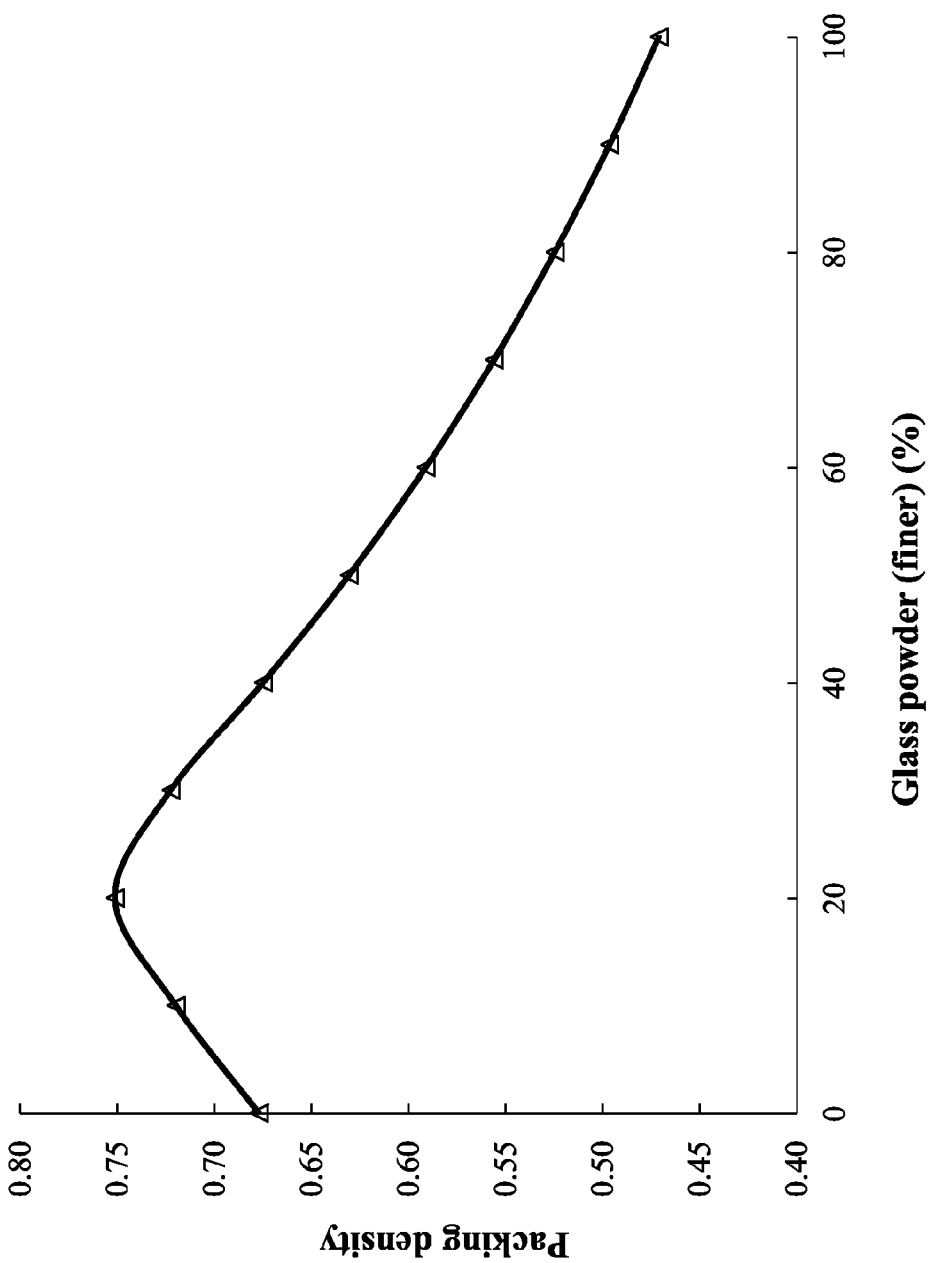
FIG. 6 is a graph showing the packing density of combined glass powder and glass sand.

The binary combination between GS and GP was determined, as shown in FIG. 6. In general, the binary mixture showed higher packing density than unitary packing. This is obviously due to filling of the void spaces by the finer particles. The addition of GP to the unitary packing of GS has increased the packing at 20% finer glass powder addition. The highest packing density of 0.75% is registered for the combination GS and GP.

Figure 7:
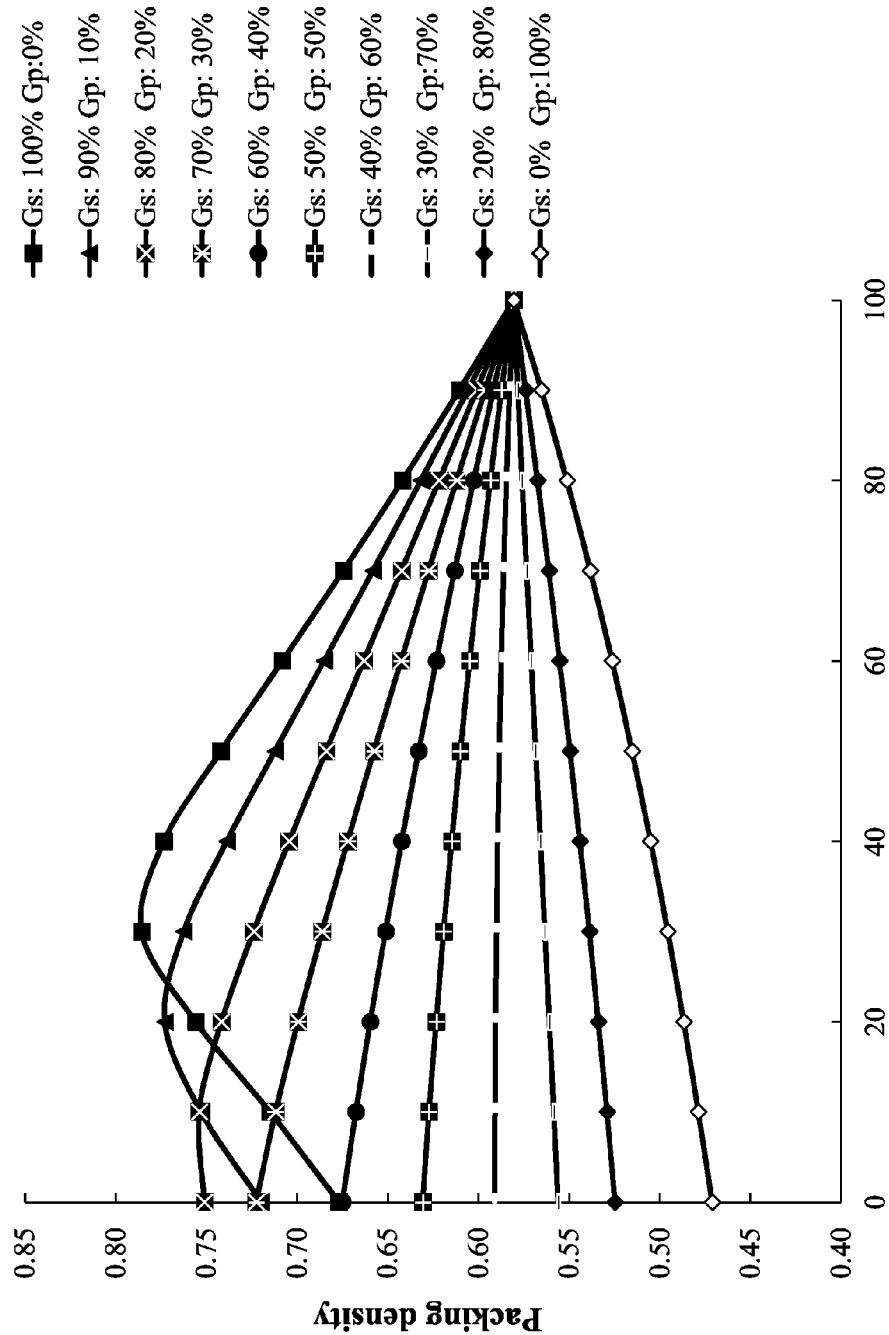
FIG. 7 is a graph showing the packing density of combined glass powder, glass sand, and cement.

The ternary combination were prepared by taking a binary combination between the GS and GP such as 100% GS and 0% GP with different cement replacements from 0 to 100% (from both the GS and GP). The combination ratios were varied between 0% and 100%, as indicated in FIG. 7. It can be observed from FIG. 7 that the addition of cement to the binary packing of GS and GP, in general, had slightly effect on the packing density due to interaction between particle size of the GP and cement according to de Larrard [1999]. The optimum packing density of 0.76% was determined for the ternary combination GS, GP and cement with QP of 60%, QP of 10% and cement of 30%.

Figure 8:
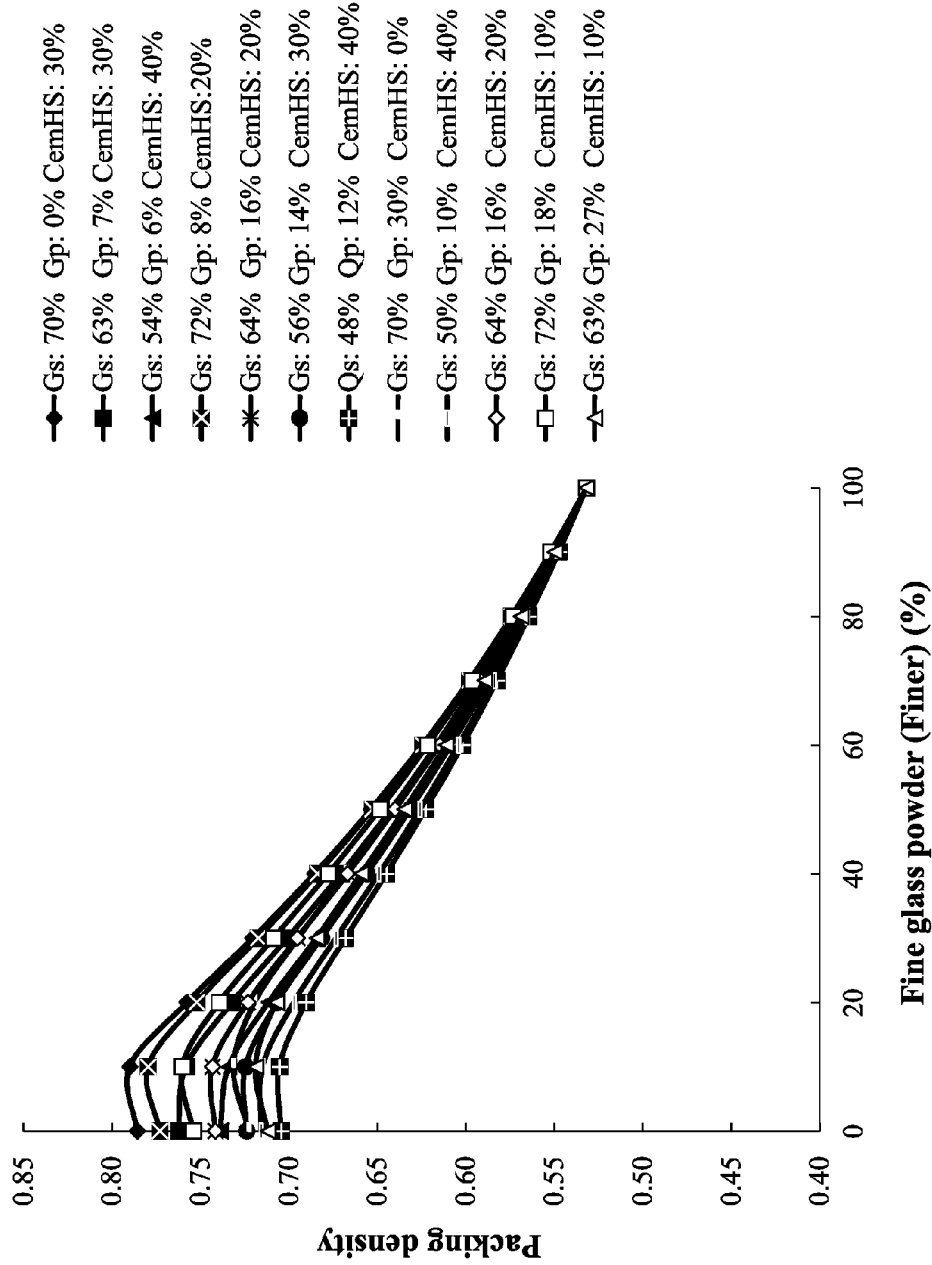
FIG. 8 is a graph showing the packing density of combined glass powder, glass sand, cement, and fine glass powder.

Twelve sets of ternary combination between the GS, GP, and cement that give the maximum packing density were selected for further studies of packing density effect on quaternary granular system (FIG. 8). For the twelve selected combinations between the GS, GP, and cement, the FGP was added in denomination of 10% from 0% to 100%. The resultant packing density for the quaternary system is shown in FIG. 8.

Figure 9:
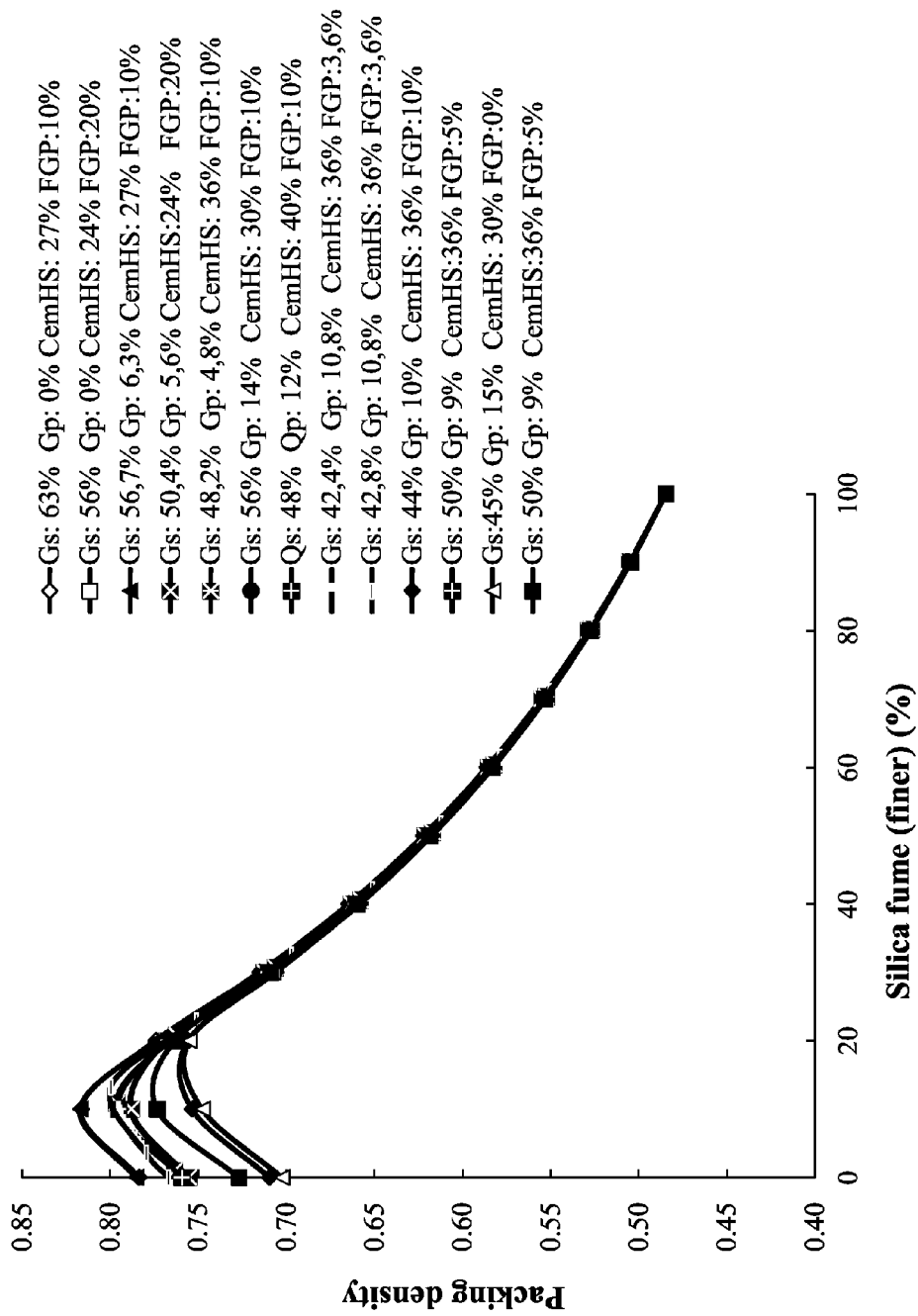
FIG. 9 is a graph showing the packing density of combined glass powder, glass sand, fine glass powder, cement and silica fume.

Thirteen sets of quaternary combination between the GS, GP, cement and FGP that give the maximum packing density were selected for further studies of packing density effect on a quinary granular system (FIG. 9). The SF as one of the important filler materials in the development of the UHPGC was chosen as the fifth granular material. The SF was added in denomination of 10% from 0% to 100%. In the thirteen selected combinations between the GS, GP, cement, and FGP as shown in FIG. 9. From FIG. 9, the quinary combination of GS=51%, GP=6%, cement=25% FGP=9% and SF=10% had the best packing density of 0.83%. In general, higher packing density is preferred, although the maximum packing density may not be the optimal [Johansen, V., and Andersen, P. J. (1991). "Particle Packing and Concrete Properties," *Materials Science of Concrete II*, Skalny, J., and Mindess, S., eds. Westerville, Ohio: American CeramicSociety, 111-147; Goltermann, P., Johansen, V., and Palbol, L. (1997). "Packing of Aggregates: An Alternative tool to Determine the Optimal Aggregate Mix," *ACI Materials Journal*, 94(5), 435-443; Powers, T. C. (1932). "Studies of Workability of Concrete," Proceedings, American Concrete Institute, Detroit, 28, 419-488; Powers, T. C. (1968). Properties of Fresh Concrete, New York: John Wiley & Sons, 664 pp.].

TABLE 5

Material properties and unitary packing of Glass sand, Glass powder, cement, Fine Glass powder and silica fume

| Materials | Symbol | Dry packing method (ICT) | Wet packing method (Vicat) | Compressible packing index | Density | Typical diameter range | Mean particle size distribution $d_{50}$ |
|---|---|---|---|---|---|---|---|
| Glass sand | QS | 0.66 | — | 9.0 | 2.54 | (150-830 μm) | 250 μm |
| Glass powder | GP | — | 0.53 | 6.7 | 2.6 | (<100 μm) | 13 μm |
| Cement | C | — | 0.54 | 6.7 | 3.25 | (<100 μm) | 10 μm |
| Fine glass powder | FGP | — | 0.50 | 6.7 | 2.6 | (<10 μm) | 3 μm |
| Silica fume | SF | — | 0.45 | 6.7 | 2.2 | (0.1-0.2 μm) | 0.13 μm |

Method for Manufacturing the UHPGC

There is also provided a method for manufacturing the UHPGC. The method described below ensures that the fine particles are uniformly distributed as they tend to agglomerate and form chunks. The minimal shear force for breaking these chunks can be reduced by keeping the particles dry.

Optionally, in a first step, all the particles of granular constituents should be dried before adding water and the superplasticizer. For instance and without being limitative, the dry powders including cement, silica fume (SF), glass powder (GP), and, optionally, quartz sand (QS), glass sand (GS), quartz powder (QP), and fine glass powder are mixed for 3 to 5 minutes. Then, the superplasticizer, previously diluted in water, is then gradually added to improve flowability of the mix. This first water addition humidifies the particles. For instance, half of the superplasticizer and water mixture is added to the mixed dry powders. Then, the mixing is resumed for an additional 3 to 5 minutes and the second half of the superplasticizer and water mixture is added. This second water addition provides fluidity to the mixture. The fibers, if any, are then added and all the constituents are mixed for an additional 5 minutes.

Curing

Optionally, curing can be applied after demoulding. Different curing conditions can be applied. For instance and without being limitative, the following curing procedures were applied.

First Curing Procedure (Normal Curing)

In the normal curing, the samples were stored in the fog room (20±2° C., RH>100%) until testing at 28, 56, and 91 days.

Second Curing Procedure (Standard Steam Treatment)

Figure 5:
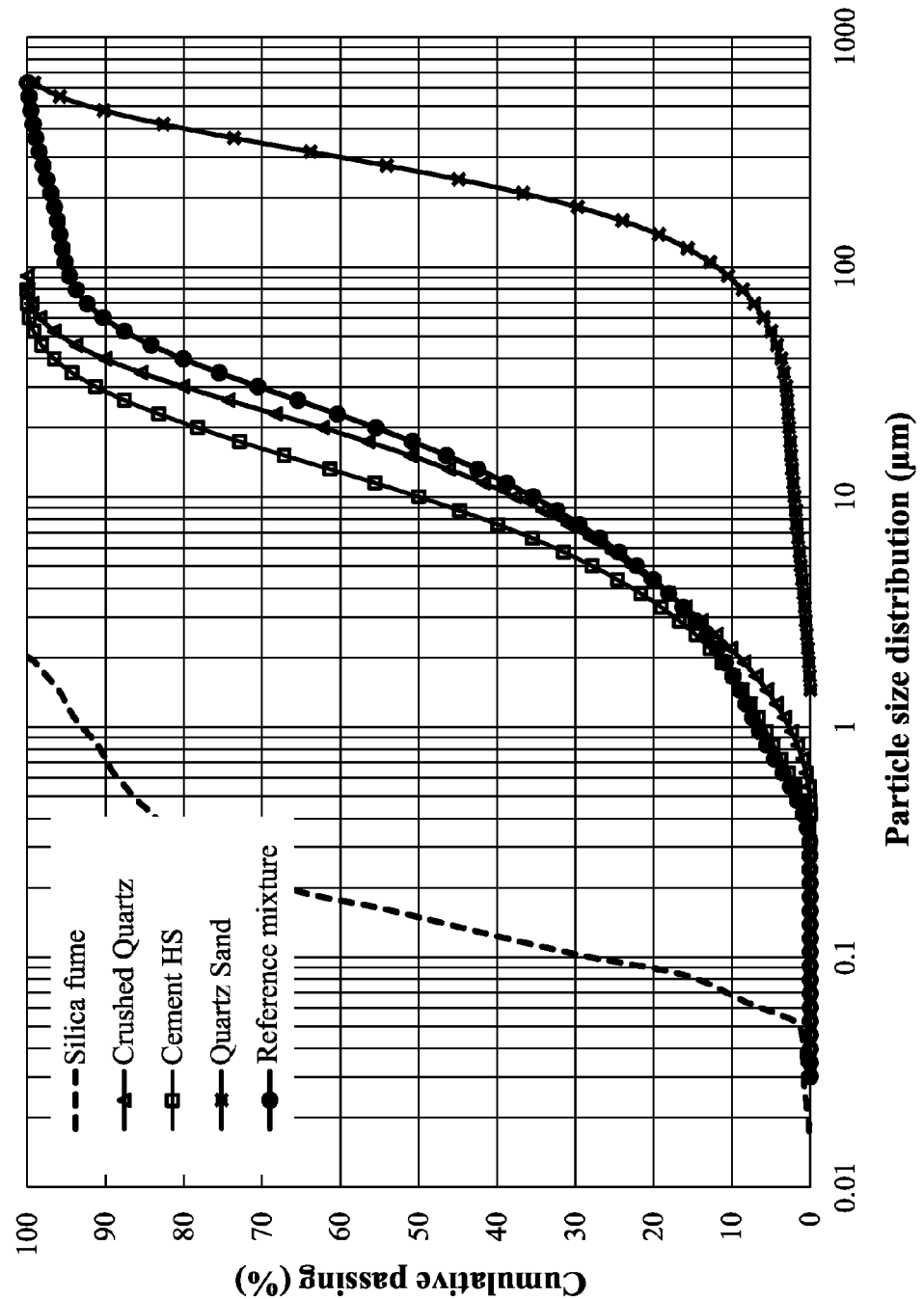
FIG. 5 is a graph showing the particle size distribution of quartz sand, quartz powder, cement, silica fume, and the reference mixture RPC-1.

Curing the demoulded UHPGC in steam of about 90° C. and a relative humidity of about 100% for about 48 hours. To carry out this curing process, the temperature was slowly size distribution between 150 μm and 850 μm were used as aggregates for the examples below. In total, five concrete mixtures (Ref-1 and A to D) were prepared. The mixture proportions are given in Table 6. The five concrete mixtures were proportioned with a water-to-binder ratio (w/b) of 0.17. The Ref-1 with the optimized granular mixture was selected as a reference mixture. The particle size distribution of the reference mixture Ref-1 is shown in FIG. 5.

The composition of mixture A was obtained by replacing 100 wt % of quartz sand in the reference mixture (Ref-1) by glass sand.

The composition of mixture B was obtained by replacing 30 wt % of cement in the reference mixture (Ref-1) by glass powder.

The composition of mixture C was obtained by replacing 100 wt % of quartz powder in the reference mixture (Ref-1) by glass powder.

The composition of mixture D was obtained by combining the different granulation waste glass materials with water to a w/b of 0.17 and superplasticizer at 1.5 wt % of cement content.

TABLE 6

Constituents of UHPGC

| Material and mixture | Ref-1 | | Mix A (100% QS replaced by GS) | | Mix B (30% of cement replaced by GP) | | Mix C (100% QP replaced by GP) | | Mix D | |
|---|---|---|---|---|---|---|---|---|---|---|
| | Ratio/ total cement content | kg/m³ | Ratio/ total cement content | kg/m³ | Ratio/ total cement content | kg/m³ | Ratio/ total cement content | kg/m³ | Ratio/ total cement content | kg/m³ |
| Water | 0.22 | 177 | 0.22 | 174 | 0.22 | 175 | 0.22 | 176 | 0.22 | 178 |
| Type HS Cement | 1 | 817 | 1 | 802 | 0.7 | 564↓ | 1 | 811 | 1 | 606(c) + 202(GP) |
| Silica fume (SF) | 0.277 | 225 | 0.277 | 221 | 0.275 | 221 | 0.277 | 223 | 0.20 | 161↓ |
| Quartz sand (QS) | 1.2 | 981 | — | — | 1.2 | 968 | 1.2 | 974 | — | — |
| Glass sand (GS) | — | — | 1.2 | 961 | — | — | — | — | 1.1 | 898 |
| Quartz powder (QP) | 0.30 | 245 | 0.30 | 240 | 0.30 | 245 | — | — | — | — |
| Glass powder (GP) | — | — | — | — | 0.30 | 242 | 0.30 | 244 | 0.30 | 243 |
| Fine glass powder (FGP) | — | — | — | — | — | — | — | — | 0.10 | 80 |
| % solid of SP | 0.02 | 18 | 0.02 | 18 | 0.02 | 18 | 0.02 | 18 | 0.015 | 13 |
| w/b ratio | 0.17 | | 0.17 | | 0.17 | | 0.17 | | 0.17 | | raised during about 3 hours to reach 90° C. at a relative humidity of about 100%. Then, the temperature and humidity was maintained during about 48 hours. Finally, the environment was allowed to cool down over the next six hours.

Third Curing Procedure (Tempered Steam Treatment)

The third procedure is similar to the second one described above except that the temperature inside the chamber was limited to about 60° C. and a relative humidity of about 95%.

EXAMPLES

Example 1

Raw Materials and Mixture Proportioning

Several cementitious materials were tested: Type HS cement, silica fume, glass powder, fine glass powder, and quartz powder. Quartz sand with a particle size distribution between 150 μm and 650 μm and glass sand with a particle Fresh and Rheological Test Methods As soon as mixing was completed, the measurements of the rheological properties of the RPC were carried out. The tests included fresh concrete temperature, as well as unit weight and air content (ASTM C 185-02). The rheology of the RPC was measured using the flow table test (ASTM C 1437-07). The flow table consists of a flow table, standard calipers, tamping rod, and a mini slump cone (70 mm in top diameter, 100 mm in bottom diameter, and 50 mm in height). To perform the test, the mini slump cone was filled then removed to allow the RPC to flow outward. Once the concrete reached a steady state, three diameters at three locations for the spread concrete were taken to determine the average diameter. The flow table was then dropped 25 times in approximately 25 seconds. The concrete was allowed to settle then the average diameter was determined in similar way.

Compressive Strength Test

The compressive strength ($f'_c$) measurements for the RPC compositions were measured on cubes (50×50×50 mm³)

according to ASTM C 109/C 109M. The compressive strength machine was adjusted for the RPC testing to have a loading rate of 2500 Newtons in 10 seconds. The $f'_c$ normally represents the average of three samples.

Results

The fresh properties of the concrete mixtures are summarized in Table 7.

TABLE 7

Fresh properties of mixtures Ref-1 and A to D

| Mixture | Slump flow (mm) | Theoretical unit weight (kg/m³) | Measured unit weight (kg/m³) | Air voids (%) | Temperature (° C.) | Packing density |
|---|---|---|---|---|---|---|
| Ref-1 | 152 | 2460 | 2350 | 4.7 | 29 | 0.76 |
| A | 145 | 2420 | 2250 | 6.7 | 22 | 0.73 |
| B | 161 | 2400 | 2300 | 5.3 | 21 | — |
| C | 178 ↑ | 2450 | 2310 | 5.5 | 21 | — |
| D | 190 | 2375 | 2300 | 3.4 | 22 | 0.79 |

Replacement of 100 wt % of quartz sand by glass sand

Figure 10B:
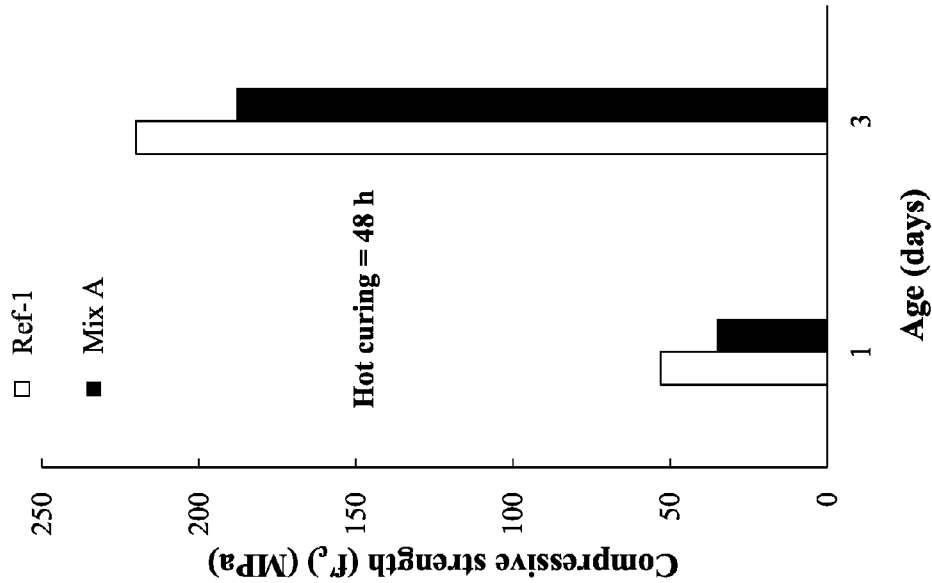
FIG. 10a shows the compressive strength as a function of time under normal curing and FIG. 10b shows the compressive strength as a function of time for a 48-hour hot curing.
Figure 10A:
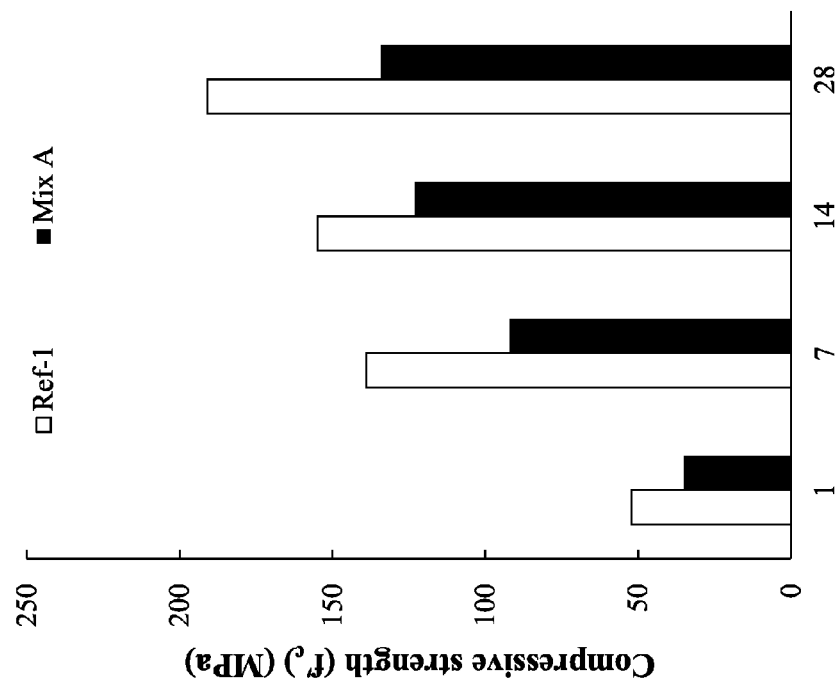

From the Data Presented in Table 7, the Replacement of 100 wt % Quartz sand by glass sand led to a decrease in the workability. The slump flow decreased from 152 mm (Ref-1) to 145 mm (Mix A) between the two mixtures, respectively. This can be attributed to the decrease in packing density from 0.79 to 0.73. The $f'_c$ for Ref-1 and Mix A mixtures made with different matrices (components), curing regimes, and curing ages were measured and given in FIG. 10. The types of matrices have an important influence on the $f'_c$. From the comparison between the Ref-1 and Mix A, the Ref-1 incorporating QS exhibited higher $f'_c$ at the same age. For example, the $f'_c$ at 28 days under normal curing regime were 192.2 and 135 for Ref-1 and Mix A, respectively. The $f'_c$ under hot standard curing regime at 48 h were 220 and 185 MPa for Ref-1 and Mix A, respectively. The decrease in the $f'_c$ was due to the decrease of packing density for the mixture incorporated glass sand. In addition, the particle size distribution of glass sand is higher than the particle size distribution of quartz sand. When a compressive force is applied, the shear and tensile stresses develop at the interfaces between the aggregates, forming small cracks approximately proportional in size to the maximum aggregate diameter, according to Richard and Cheyrezy, 1994 (Reactive Powder Concretes with High Ductility and 200-800 MPa Compressive Strength. Concrete Technology: Past, Present, and Future—Proceedings of V. Mohan Malhotra Symposium. American Concrete Institute, Detroit, Mich.).

Replacement of Cement by Glass Powder

Figure 11A:
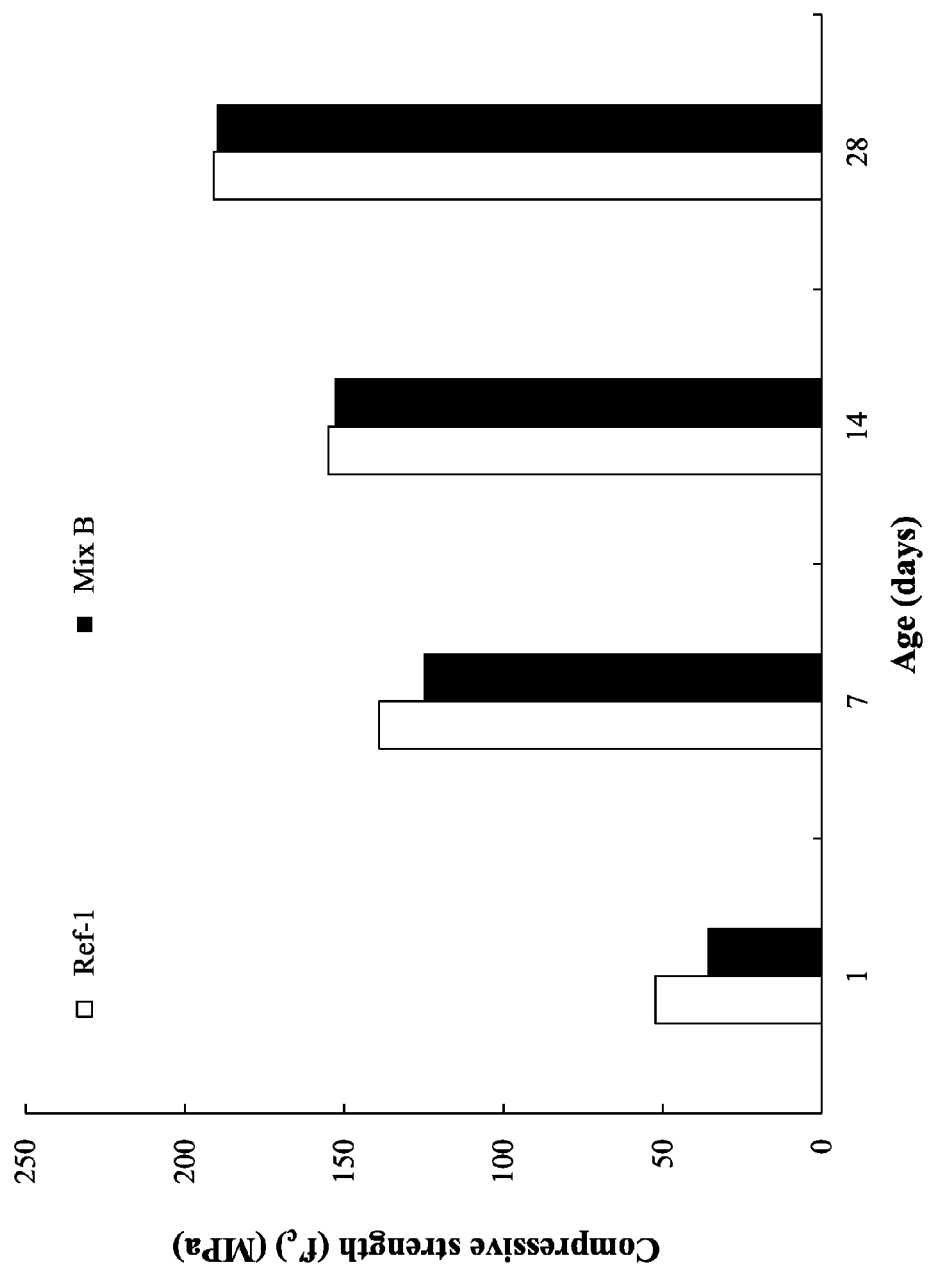
FIG. 11a shows the compressive strength as a function of time under normal curing and FIG. 11b shows the compressive strength as a function of time for a 48-hour hot curing.
Figure 11B:
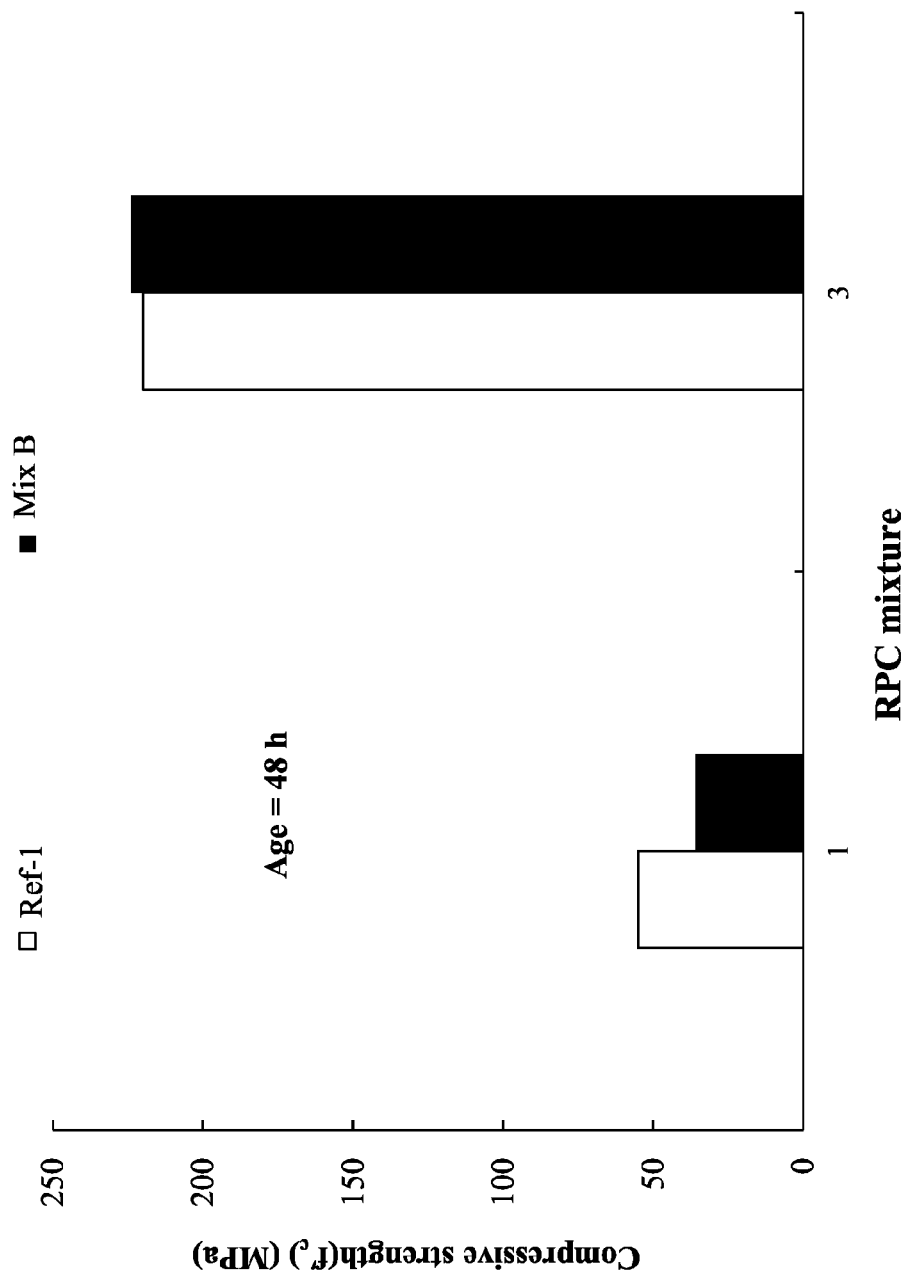

Since not all of the cement content in the RPC mixture is hydrated, part of this cement can be replaced by the glass powder. The test results showed that up to 30 wt % by volume of cement can be replaced by glass powder (GP) with no reduction on $f'_c$, as shown in FIG. 11. Besides reducing the cement content, the glass powder (GP) was also found to improve the flowability of a RPC mixture. For example, the slump flow increased from 152 to 161 mm when 30 wt % by volume of cement was replaced by glass powder (GP) in Ref-1 and Mix B, respectively. The improved flow characteristics may be due to a filling effect since the glass powder (GP) particles are slightly smaller than the cement particles. Another explanation for the increased flowability with glass powder (GP) may be due to the formation of fewer cement binding products in the first few minutes of the mixing.

Thus, the glass power replaced up to 30 wt % of cement (about 240 kg/m³) in conventional RPC with w/b equals 0.17 with similar $f'_c$ and improved workability (slump flow from 152 to 161 mm).

Replacement of Quartz Powder by Glass Powder

Figure 12A:
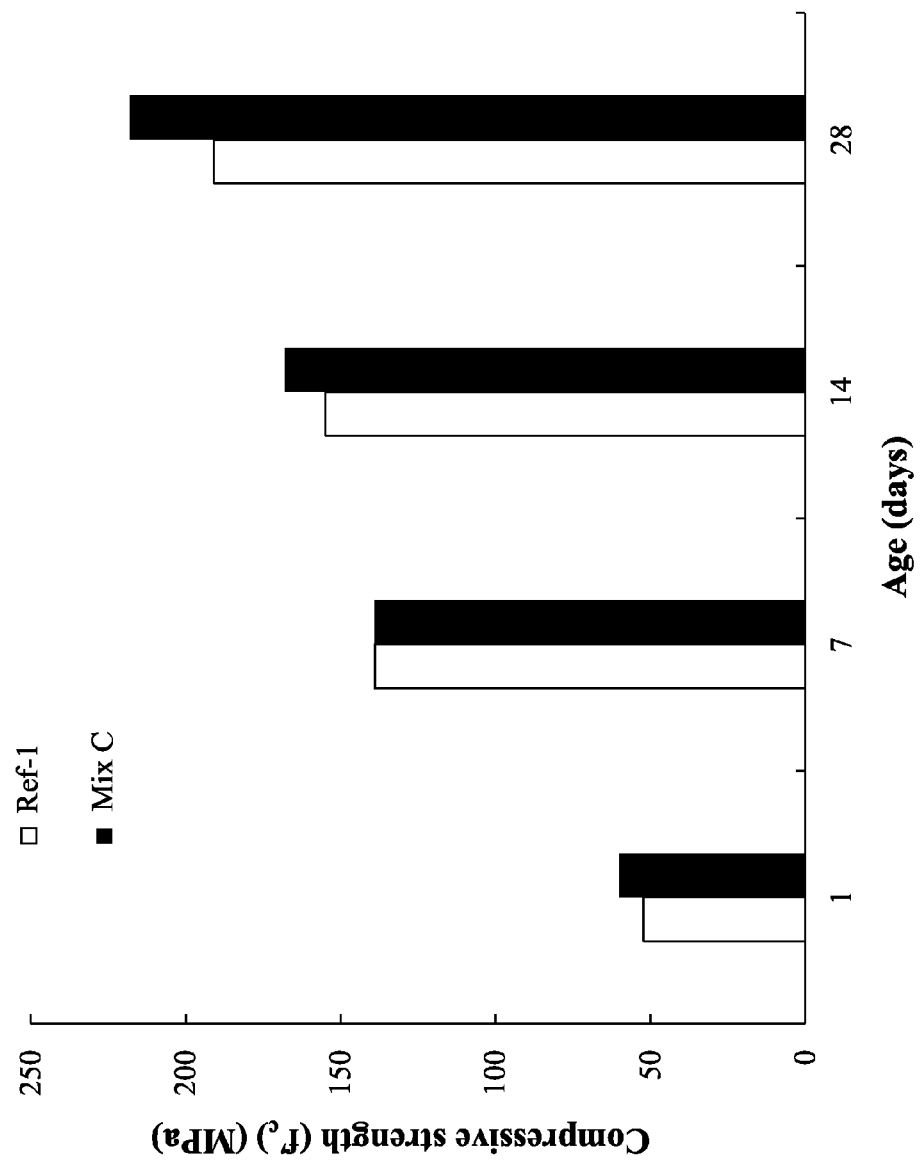
FIG. 12a shows the compressive strength as a function of time under normal curing and FIG. 12b shows the compressive strength as a function of time for a 48-hour hot curing.
Figure 12B:
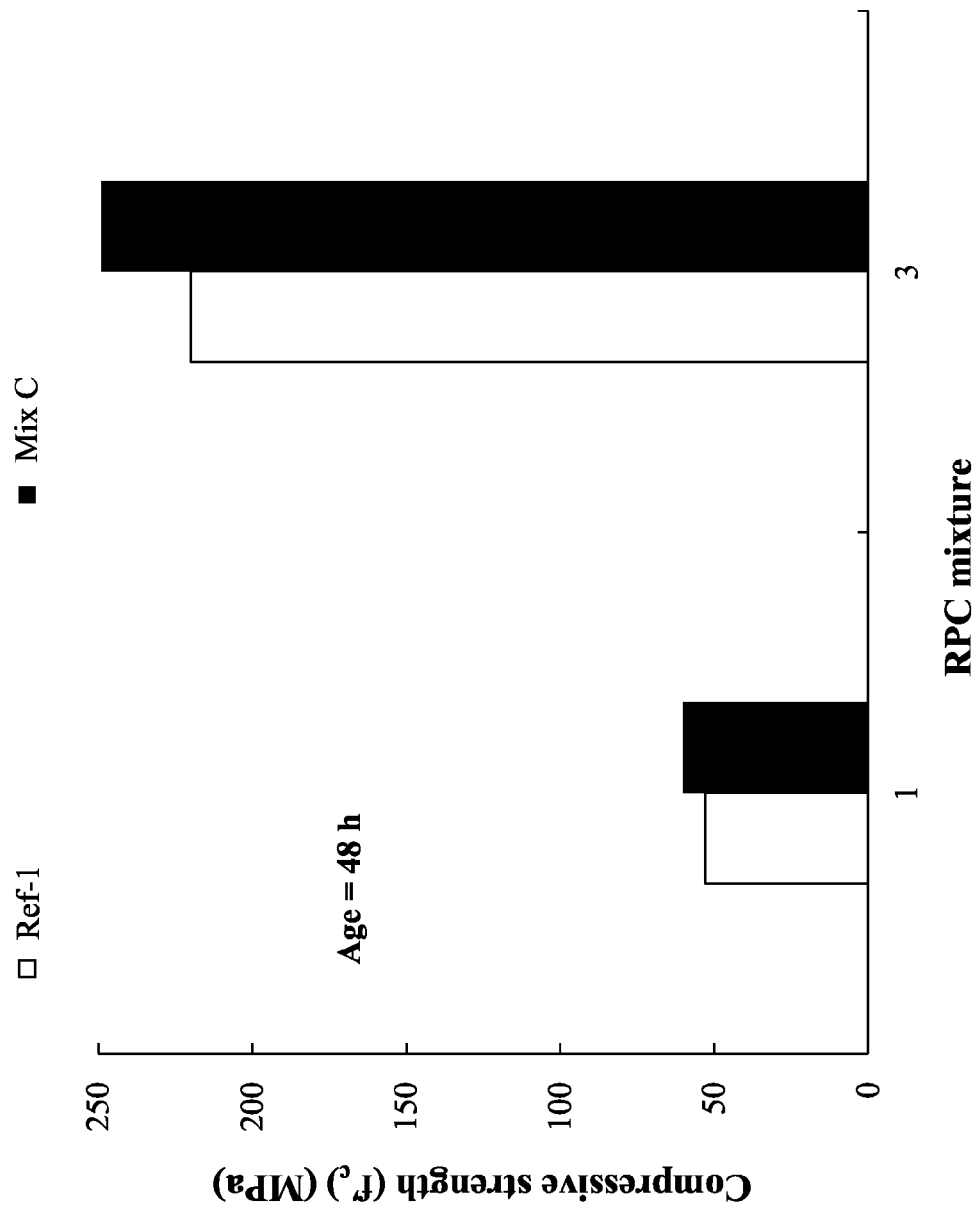

The glass powder (GP) of a $d_{50}$ of 10 μm (in Mix C) was used to replace totally the quartz powder (QP) in the Ref-1. The results showed an increase of $f'_c$ from 192.2 to 218.5 MPa with normal curing regime at 28 days and 220 to 249.1 MPa with hot slandered curing regime at 48 hours, as indicated in FIG. 12. The increasing of $f'_c$ can be referred to the pozzolanic reactivity of glass powder (GP), which can reduce the amount of portalantide and produce more C—S—H. This leads to enhancement of the microstructure and increase the $f'_c$. In addition, the slump flow increased from 152 to 178 mm between Ref-1 and Mix C mixtures. This increase in the slump flow was due to the fact that glass powder (GP) has no absorption.

Thus, the glass power replaced up to 100 wt % of quartz powder in conventional RPC with water-to-binder ratio (w/b) equals 0.17 with an increase in the 28-days compressive strength (ft) from 220 to 249 MPa and workability improvement (slump flow from 152 to 178 mm).

Example 2

UHPGC

An embodiment of UHPGC was conceived and tested. The selected packing density for the UHPGC was 0.79%, which was obtained for a quinary combination of GS=42.2 wt %, GP=20 wt %, cement=26 wt % FGP=3.6 wt % and SF=7.2 wt % as shown in Table 8.

TABLE 8

Example composition of an embodiment of UHPGC (Mix D)

| | Type of the materials | | | | | |
|---|---|---|---|---|---|---|
| | Type HS cement | Silica fume | Fine glass powder | Glass Sand | Glass powder | Packing density |
| Mixture Proportions wt % of total concrete mass | 26 | 7.2 | 3.6 | 42.2 | 20 | 0.79 |

Figure 14:
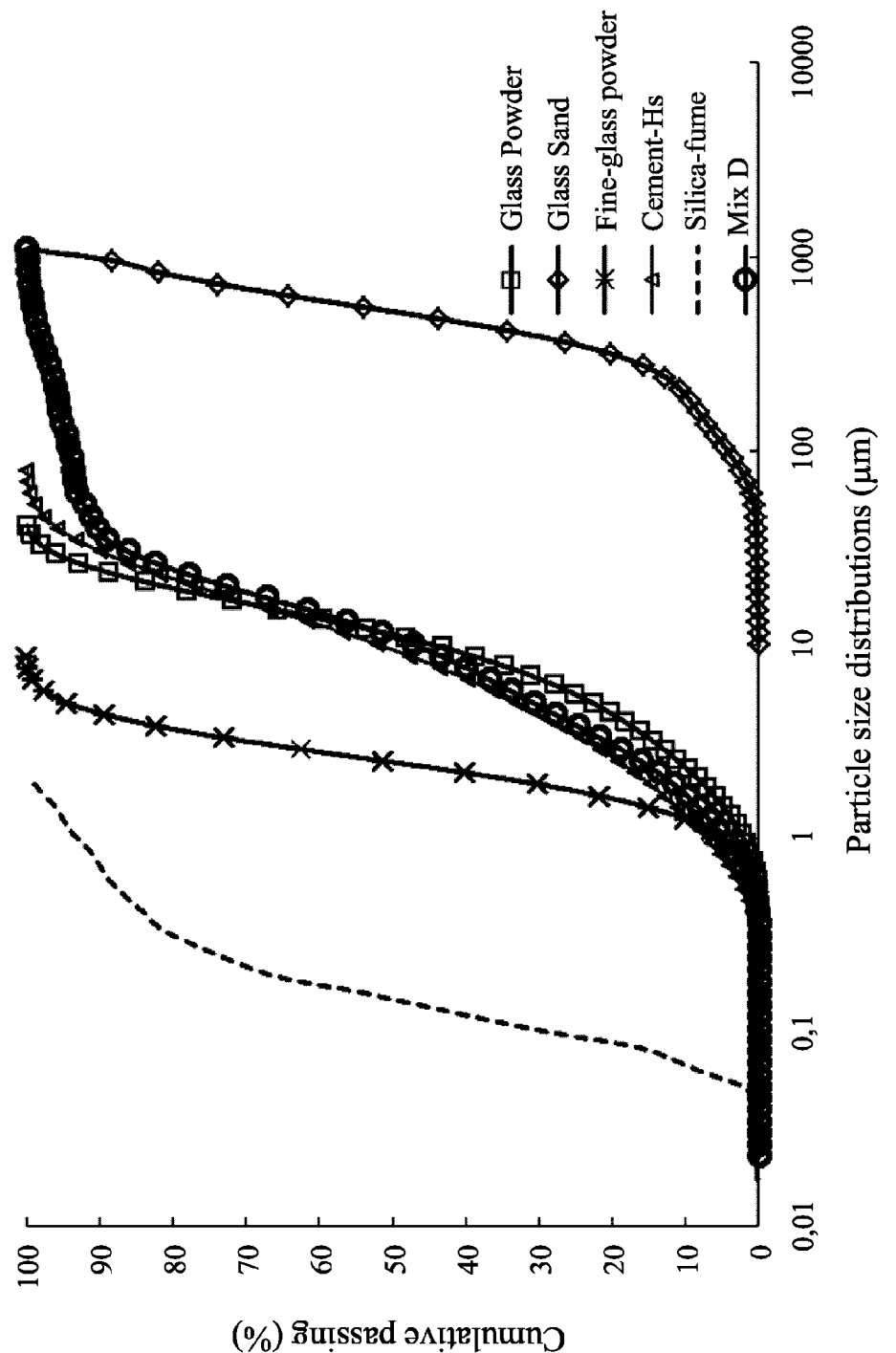
FIG. 14 is a graph showing the particle size distributions of combined glass powder, glass sand, fine glass powder, cement and silica fume, and an embodiment of UHPGC (Mix D).
Figure 15B:
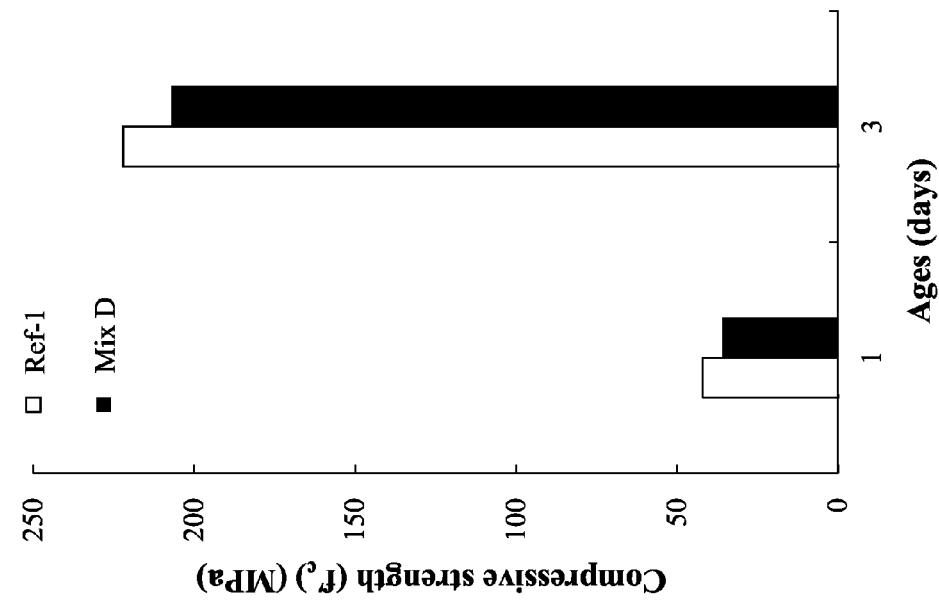
FIG. 15a shows the compressive strength as a function of time under normal curing and FIG. 15b shows the compressive strength as a function of time for a 48-hour hot curing.
Figure 15A:
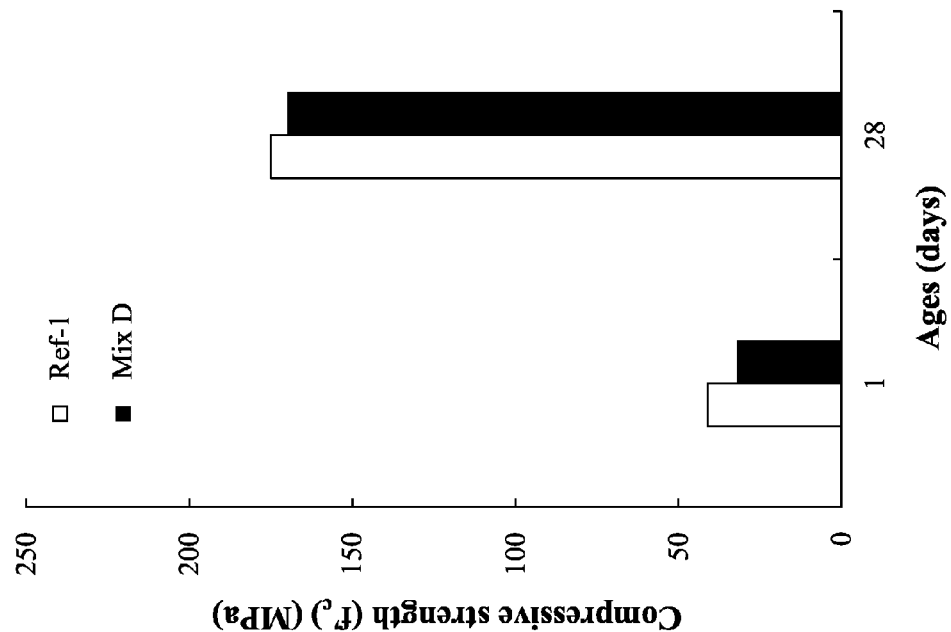

Mix D was prepared with a combination between all different the different granulometry of waste glass materials with water to w/b equal 0.17 and SP equal 1.5%. The particle size distribution of the UHPGC is shown in FIG. 14. The results showed a slight decrease of $f'_c$ from 175 to 167 MPa with normal curing regime at 28 days and 220 to 207 MPa with hot slandered curing regime of 48 hours, for traditional RPC and UHPGC respectively as indicated in FIG. 15.F

Example 4

Replacement of Cement by Glass Powder

Tests were conducted to compare the compressive strength and slump flow of reference composition Ref-2 with the compressive strength and slump flow of mixtures E to I (shown in Table 9 below). The results showed that up to 50 wt % of the cement (about 400 kg/m³) can be replaced by glass powder (GP) at w/b equal to 0.189 with no reduction on $f'_c$.

Figure 17A:
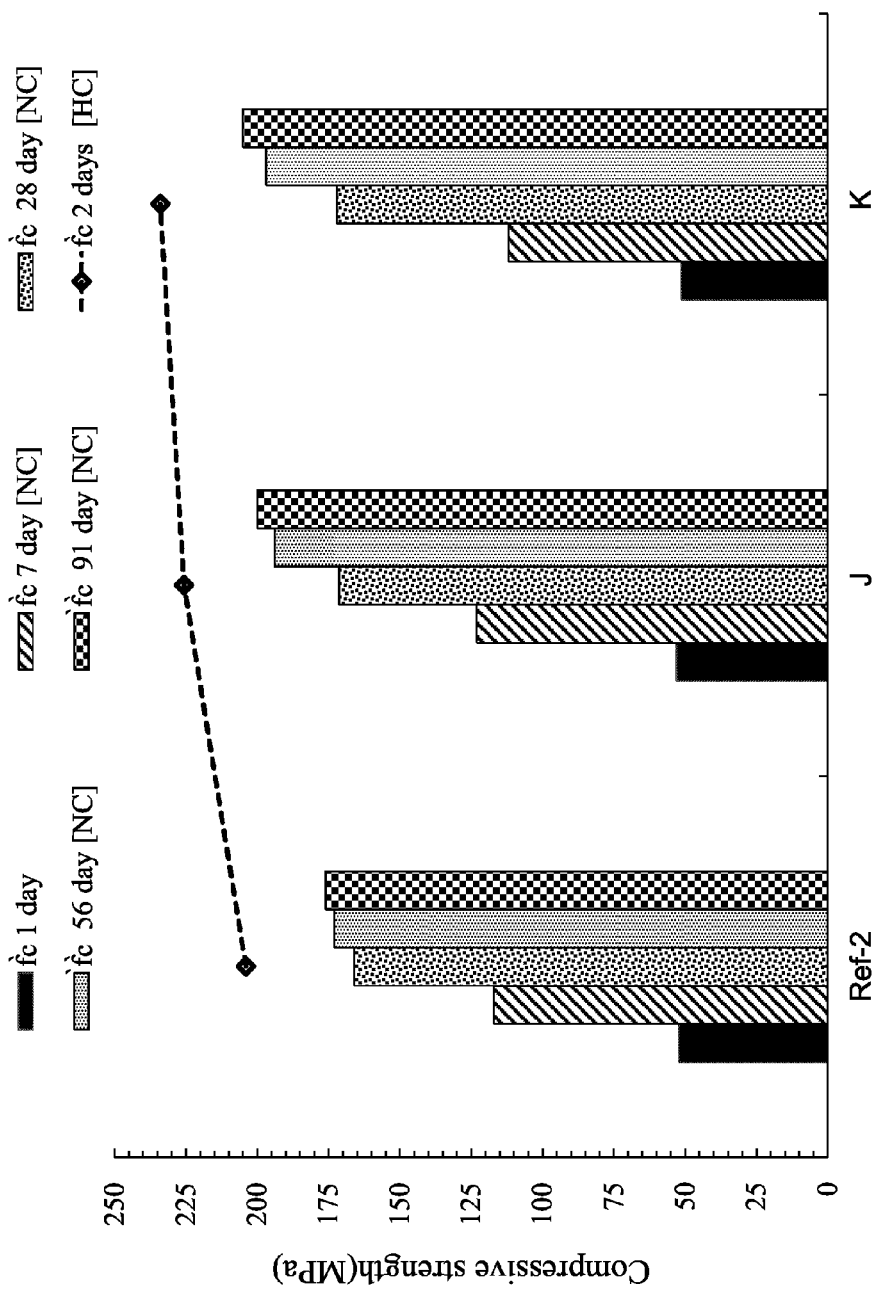
FIG. 17a is a graph showing the compressive strength in MPa of a RPC (Ref-2) and of embodiments of UHGPC (Mixes J and K)—as a function of time under normal curing (histogram), and after a 2-day hot curing (dashed line).

As shown in FIG. 17a, the results indicate an increase in compressive strength f'c from 206 MPa to 225 MPa in mixtures wherein 50 wt % of QP is replaced with GP and from 206 MPa to 234 MPa in mixtures wherein 100 wt % of QP is replaced with GP. This f'c increase was achieved with hot standard curing regime for 48 h. The increase in the compressive strength $f'_c$ is due to the enhancement of the reactivity of the UHPGC by adding amorphous pozzolanic materials such as glass powder, which leads in an enhancement of the microstructure.

Figure 17B:
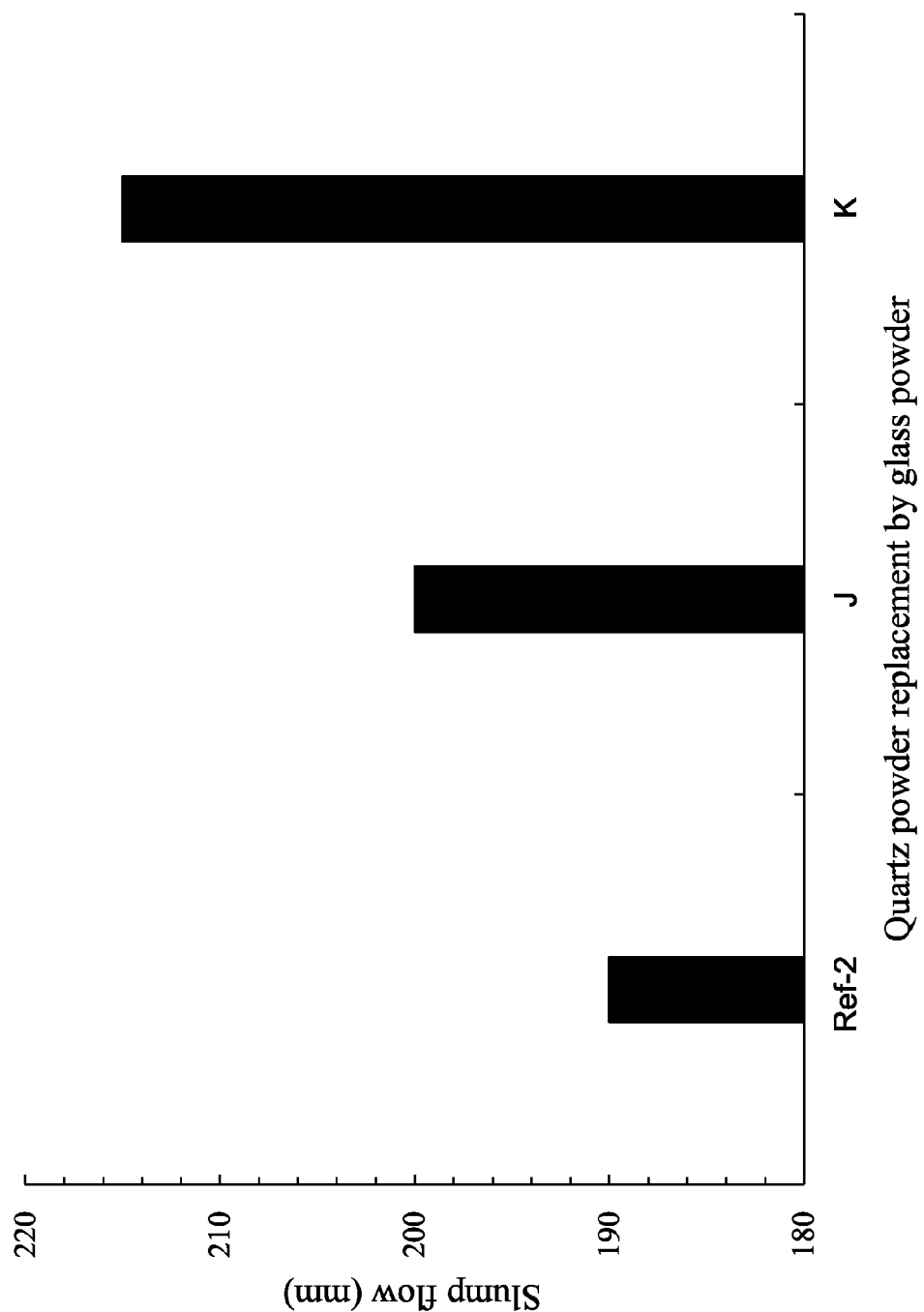
FIG. 17b is a graph showing the slump flow in mm of a traditional RPC (Ref-2) and of embodiments of UHGPC (Mixes J and K).

As shown in FIG. 17b, the slump flow increases from 190 mm to 200 mm in mixtures wherein 50 wt % of QP is

TABLE 9

Concrete mixtures Ref-2 and E to I

| Material and mixture | Ref-2 | | Mix E (10 wt % cement replaced) | | Mix F (20 wt % cement replaced) | | Mix G (30 wt % cement replaced) | | Mix H (40 wt % cement replaced) | | Mix I (50 wt % cement replaced) | |
|---|---|---|---|---|---|---|---|---|---|---|---|---|
| | wt % of total concrete mass | kg/m³ | wt % of total concrete mass | kg/m³ | wt % of total concrete mass | kg/m³ | wt % of total concrete mass | kg/m³ | wt % of total concrete mass | kg/m³ | wt % of total concrete mass | kg/m³ |
| Water | 8.00 | 195.5 | 8.02 | 195 | 8.00 | 193 | 8.01 | 192 | 8.02 | 191 | 8.03 | 190 |
| Type HS Cement | 33.04 | 807 | 29.78 | 724 | 26.47 | 639 | 23.19 | 556 | 19.85 | 473 | 16.56 | 392 |
| Silica fume (SF) | 9.21 | 225 | 9.21 | 224 | 9.20 | 222 | 9.22 | 221 | 9.19 | 219 | 9.17 | 217 |
| Quartz sand (QS) | 39.80 | 972 | 39.74 | 966 | 39.77 | 960 | 39.74 | 953 | 39.74 | 947 | 39.75 | 941 |
| Quartz powder (QP) | 9.95 | 243 | 9.91 | 241 | 9.94 | 240 | 9.92 | 238 | 9.95 | 237 | 9.93 | 235 |
| Glass powder (GP) | — | — | 3.33 | 81 | 6.63 | 160 | 9.92 | 238 | 13.26 | 316 | 16.56 | 392 |
| % solid of SP | | 13 | | 13 | | 13 | | 13 | | 13 | | 13 |
| w/b ratio | 0.189 | | 0.189 | | 0.189 | | 0.189 | | 0.189 | | 0.189 | |

Figure 16A:
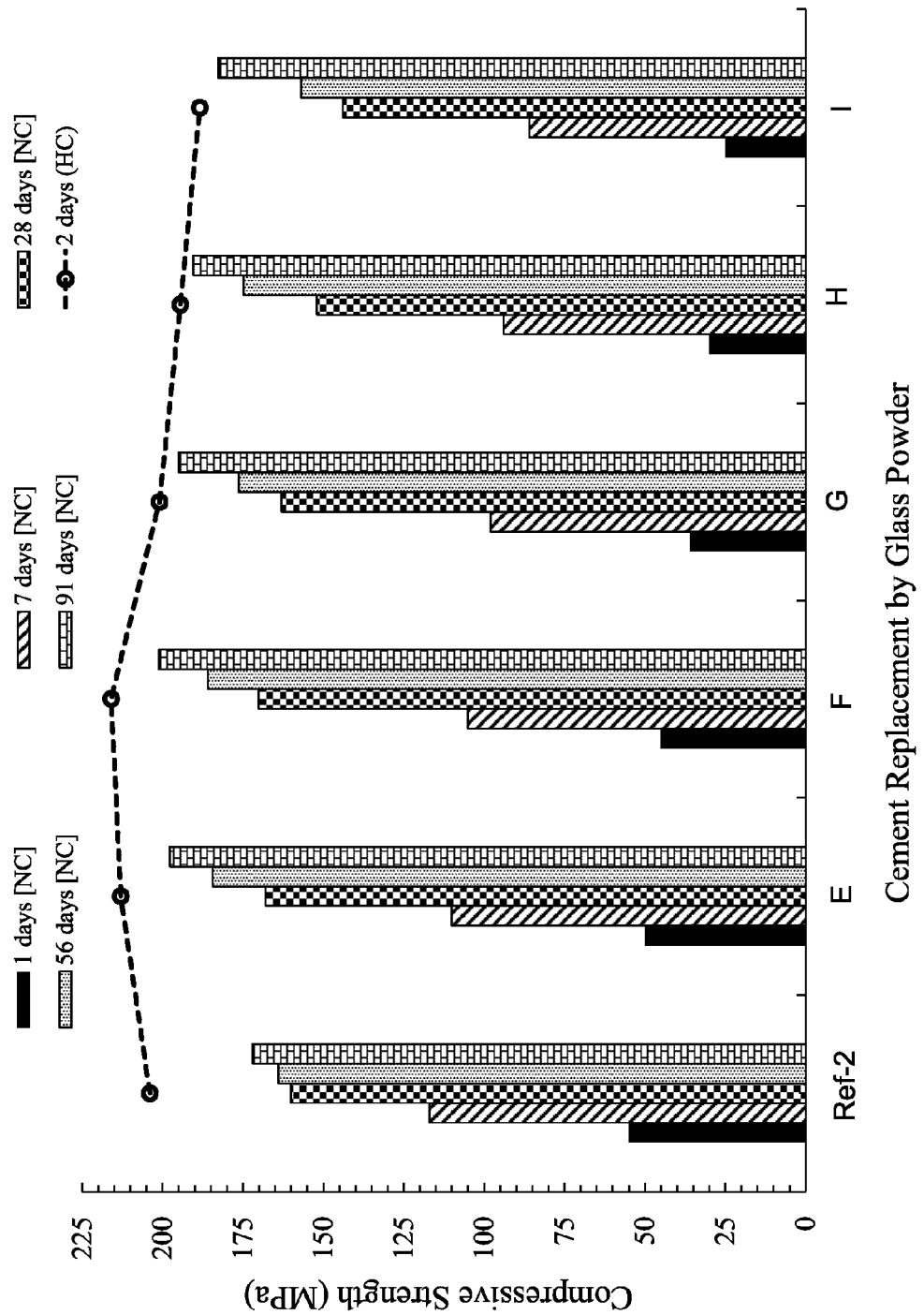
FIG. 16a is a graph showing the compressive strength in MPa of a RPC (Ref-2) and of embodiments of UHGPC (Mixes E to I)—as a function of time under normal curing, and after a 2-day hot curing.
Figure 16B:
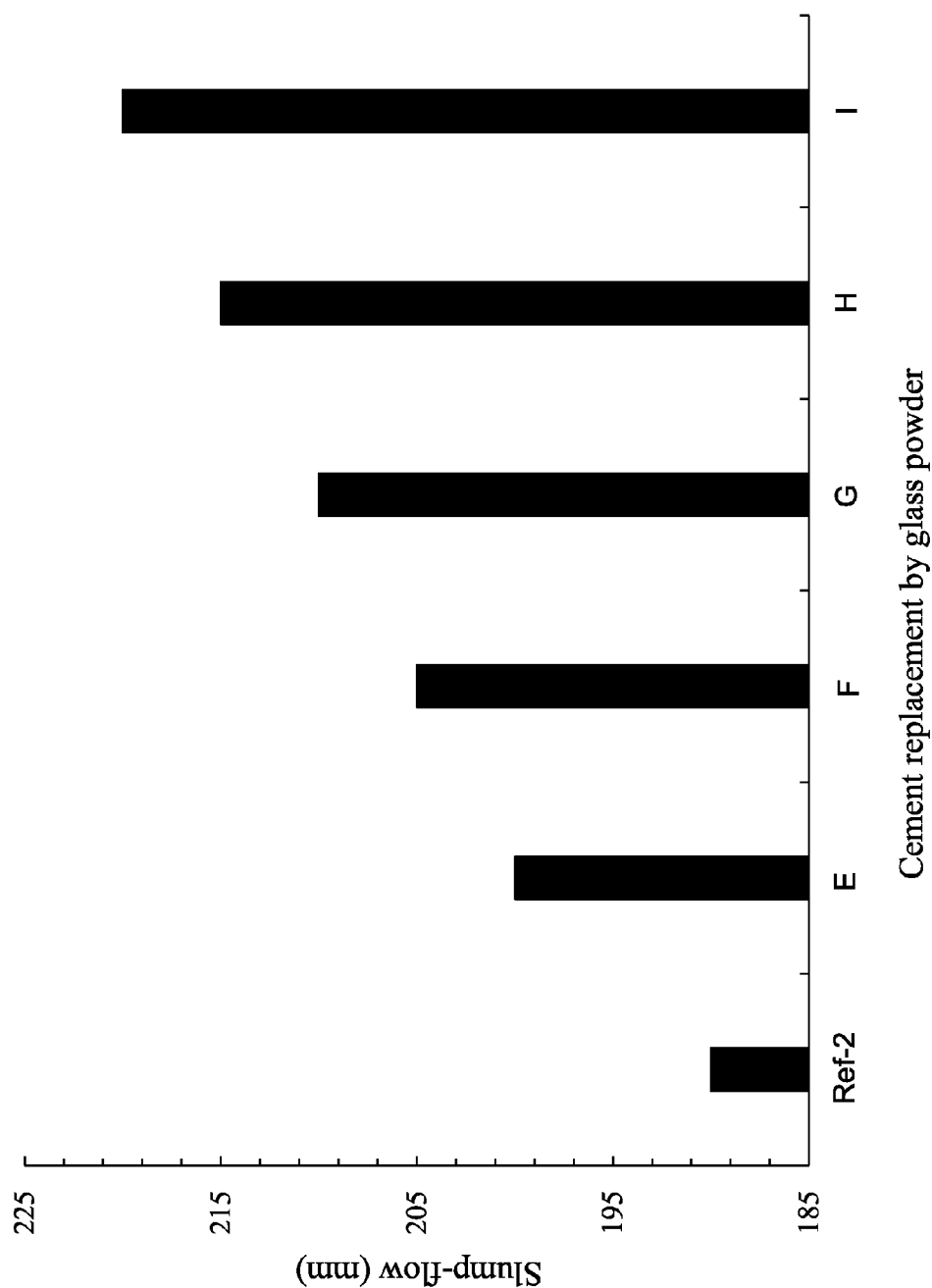
FIG. 16b is a graph showing the slump flow in mm of a traditional RPC (Ref-2) and of embodiments of UHGPC (Ref-1 and Mixes E to I).

FIG. 16a and FIG. 16b respectively show the compressive strength $f'_c$ and the slump-flow of the reference composition (Ref-2) and of mixtures E to I. No significant decrease of $f'_c$ is observed when the proportion of cement replaced by glass powder (GP) is varied from 0 to 50 wt % of the cement content. Furthermore, the glass powder (GP) was also found to improve the flowability of the mixtures. For example, the slump flow increased from 190 mm when 0 wt % of cement content was replaced with GP, to 220 mm when 50 wt % of cement content was replaced with GP.

Example 5

Replacement of Cement by Fine Glass Powder

The fine glass power replaced up to 60 wt % of cement (about 500 kg/m³) in conventional UHPC with different w/b equals 0.150-0.26 without any significant decrease in f'c and improved workability.

Example 6

Replacement of Quartz Powder (QP) by Glass Powder (GP)

Glass powder can replace up to 100 wt % of quartz powder (about 250 kg/m³) in conventional UHPC with different w/b equals 0.150-0.26. Experiments were conducted to evaluate the compressive strength $f'_c$ of UHPGC mixtures in which from 0 wt % QP to 100 wt % QP was replaced by GP, at a w/b of 0.189. Tests were conducted to compare the compressive strength and slump flow of reference concrete composition Ref-2 with the compressive strength and slump flow of mixtures J and K (shown in Table 10 below).

replaced with GP and from 190 mm to 215 mm in mixtures wherein 100 wt % of QP is replaced with GP.

Thus, the glass powder replaced up to 100 wt % of quartz powder in conventional RPC with water-to-binder ratio (w/b) equals 0.189 with an increase in the 28-days compressive strength (f'c) from 206 to 234 MPa and workability improvement (slump flow from 190 to 215 mm).

TABLE 10

Concrete mixtures Ref-2, J and K

| Material and mixture | Ref-2 | | Mix J (50% QP replaced by) | | Mix K (100% QP replaced) | |
|---|---|---|---|---|---|---|
| | wt % of total concrete mass | kg/m³ | wt % of total concrete mass | kg/m³ | wt % of total concrete mass | kg/m³ |
| Water | 8.00 | 195.5 | 8.02 | 195 | 8.00 | 195 |
| Type HS Cement | 33.04 | 807 | 33.14 | 808 | 33.11 | 806 |
| Silica fume (SF) | 9.21 | 225 | 9.21 | 224 | 9.20 | 224 |
| Quartz sand (QS) | 39.80 | 972 | 39.74 | 969 | 39.77 | 967 |
| Quartz powder (QP) | 9.95 | 243 | 4.96 | 121 | — | — |
| Glass powder (GP) | — | — | 4.96 | 121 | 9.94 | 242 |
| % solid of SP | | 13 | | 13 | | 13 |
| w/b ratio | 0.189 | | 0.189 | | 0.189 | |

Example 7

Replacement of Quartz Powder (QP) by Fine Glass Powder (FGP)

Tests were conducted to replace 100 wt % of quartz powder with FGP in a conventional RPC, with a w/b of 0.189. The compressive strength and slump flow of reference concrete composition Ref-3 was compared with the compressive strength and slump flow of Mix Y (compositions shown in Table 11 below).

TABLE 11

Concrete mixtures Ref-3 and Y

| Material and mixture | Ref-3 wt % of total concrete mass | kg/m³ | Mix Y (100% QP replaced by FGP) wt % of total concrete mass | kg/m³ |
|---|---|---|---|---|
| Water | 8.00 | 195.5 | 8.00 | 195 |
| Type HS Cement | 33.04 | 807 | 26.47 | 806 |
| Silica fume (SF) | 9.21 | 225 | 9.20 | 224 |
| Quartz sand (QS) | 39.80 | 972 | 39.77 | 967 |
| Quartz powder (QP) | 9.95 | 243 | 0 | 0 |
| Fine Glass powder (FGP) | — | — | 6.63 | 242 |
| % solid of SP | | 13 | | 13 |
| w/b ratio | 0.189 | | 0.189 | |

Figure 32:
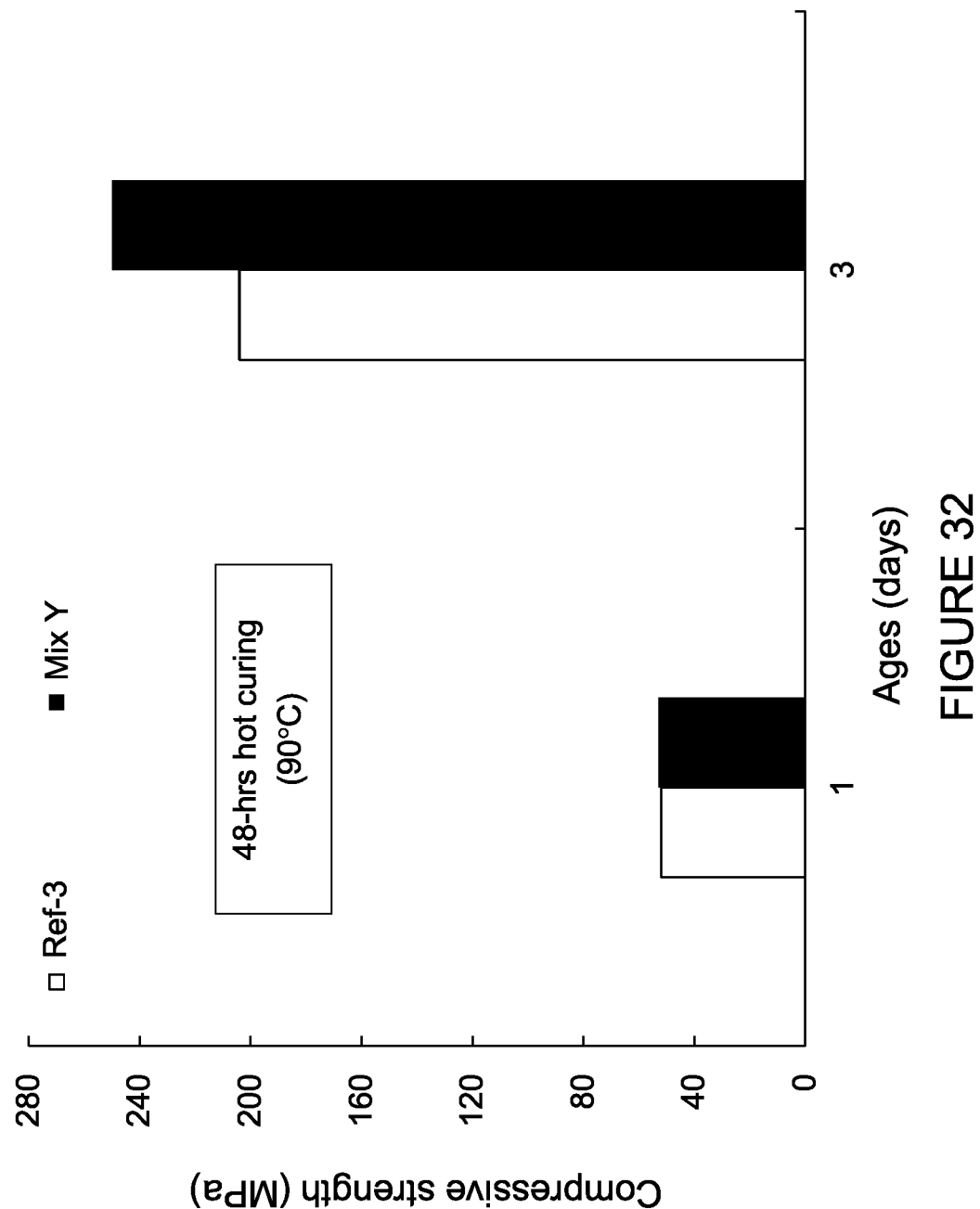
FIG. 32 is a graph showing the compressive strength of a traditional RPC (Ref-3) and an embodiment of UHPGC (Mix Y) after a 2-days hot curing.

As shown in FIG. 32, it has been found that the compressive strength in the 2-day hot curing regime at 90° C. increases from 204 MPa for 0 wt % of the QP replaced (Ref-3) to 250 MPa for 100 wt % of QP replaced with FGP (Mix Y). Similarly, workability was also improved (slump flow increased from 185 to 225 mm).

Example 8

Replacement of Silica Fume by Fine Glass Powder

Another set of tests were carried out. More particularly, fine glass powder (FGP) with a $d_{50}$ of approximately 3 μm was used to replace 30%, 50%, 70% and 100% of the silica fume (mixtures L, M, N and O, respectively) in the reference mixture (Ref-2), as shown in Table 12.

Figure 18A:
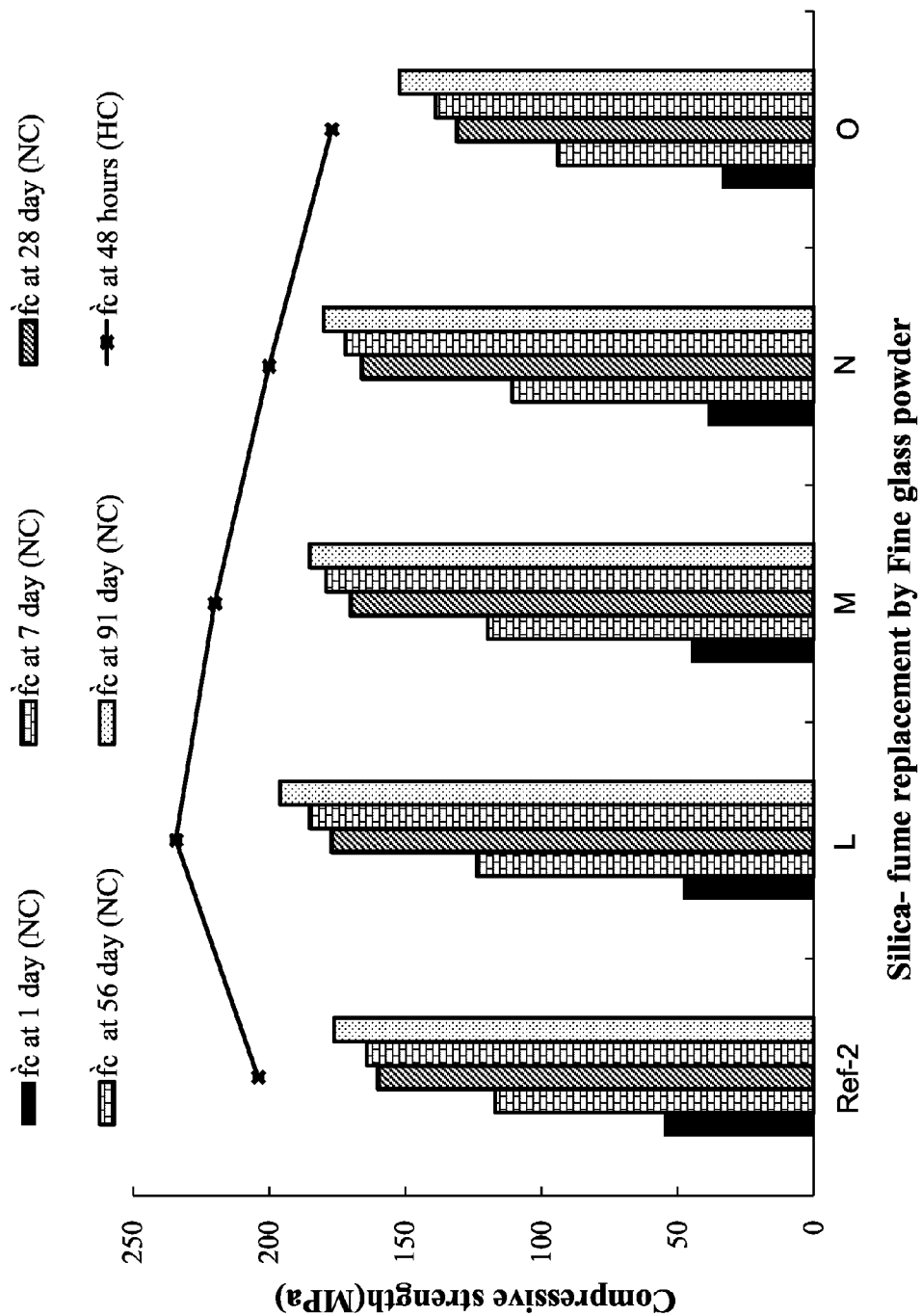
FIG. 18a is a graph showing the compressive strength in MPa of a traditional RPC (Ref-2) and of embodiments of UHGPC (Mixes L to O)—as a function of time under normal curing, and after a 2-day hot curing.
Figure 18B:
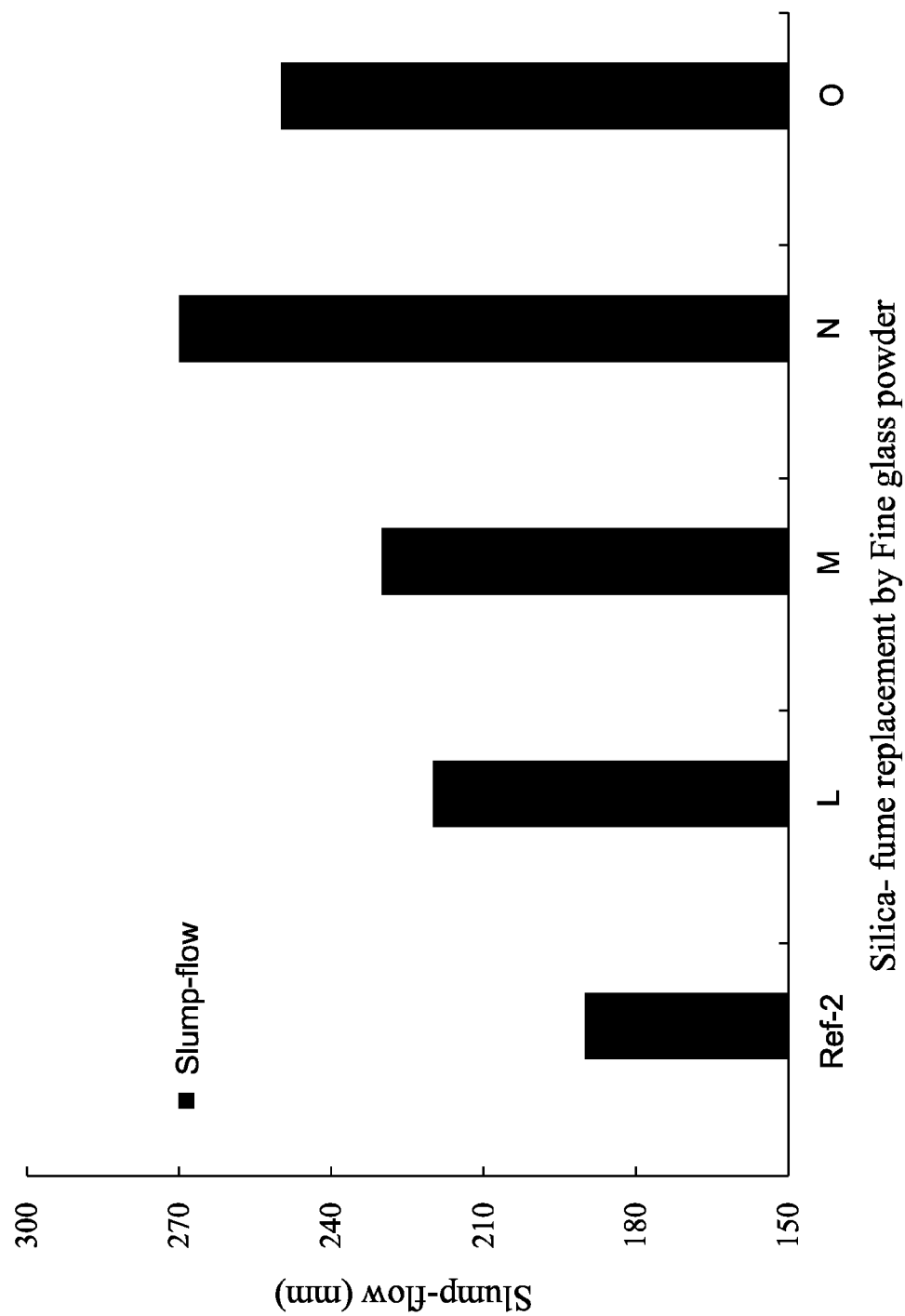
FIG. 18b is a graph showing the slump flow in mm of a traditional RPC (Ref-2) and of embodiments of UHGPC (Mixes L to O).

The results showed an increase of compressive strength ($f'_c$) from 206 to 235 MPa and 220 MPa in mixtures of 30% and 50% replacements of silica fume by fine glass powder, respectively. This was achieved with hot standard curing regime at 48 hours as indicated in FIG. 18. The increasing of $f'_c$ can be referred to the enhancement of the packing density. This leads to enhancement of the microstructure. In addition, the slump flow increased from 185 to 215 between reference mixture and 30% silica fume replacement by fine glass powder. The corresponding increase in case of 50% replacement was from 185 to 225 mm. In addition, the FGP also replaced 70% of the silica fume in the reference mixture and yielded a material having a similar $f'_c$ and improved workability (slump flow increased from 185 to 270 mm). This increase in the slump flow was due to the fact that the FGP has no absorption. The FGP also replaced 100 wt % of the silica fume in the reference mixture Ref-2. A decrease in $f'_c$ was observed (from 206 MPa to 177 MPa), which is due to a decrease in the packing density.

TABLE 12

Mixtures with different proportions of SF replaced by FGP

| Material and mixture | Ref-2 wt % of total concrete mass | kg/m³ | Mix L (30 wt % SF replaced by FGP) wt % of total concrete mass | kg/m³ | Mix M (50 wt % SF replaced by FGP) wt % of total concrete mass | kg/m³ | Mix N (70 wt % SF replaced by FGP) wt % of total concrete mass | kg/m³ | Mix O (100 wt % SF replaced by FGP) wt % of total concrete mass | kg/m³ |
|---|---|---|---|---|---|---|---|---|---|---|
| Water | 8.00 | 195.5 | 7.95 | 196 | 8.00 | 197 | 7.97 | 197 | 7.98 | 198 |
| Cement | 33.04 | 807 | 32.97 | 813 | 33.14 | 816 | 33.12 | 819 | 33.16 | 823 |
| Silica fume (SF) | 9.21 | 225 | 6.61 | 163 | 4.59 | 113 | 2.75 | 68 | — | — |
| Quartz sand (QS) | 39.80 | 972 | 39.52 | 976 | 39.72 | 978 | 39.75 | 983 | 39.77 | 987 |
| Quartz powder (QP) | 9.95 | 243 | 9.56 9.89 | 244 | 9.95 | 245 | 9.95 | 246 | 9.91 | 246 |
| Fine glass powder (FGP) | — | — | 3.00 | 74 | 4.59 | 113 | 6.47 | 160 | 9.19 | 228 |
| % solid of SP | | 13 | | 13 | | 13 | | 13 | | 13 |

Example 9

Replacement of Quartz Sand by Glass Sand

Figure 13:
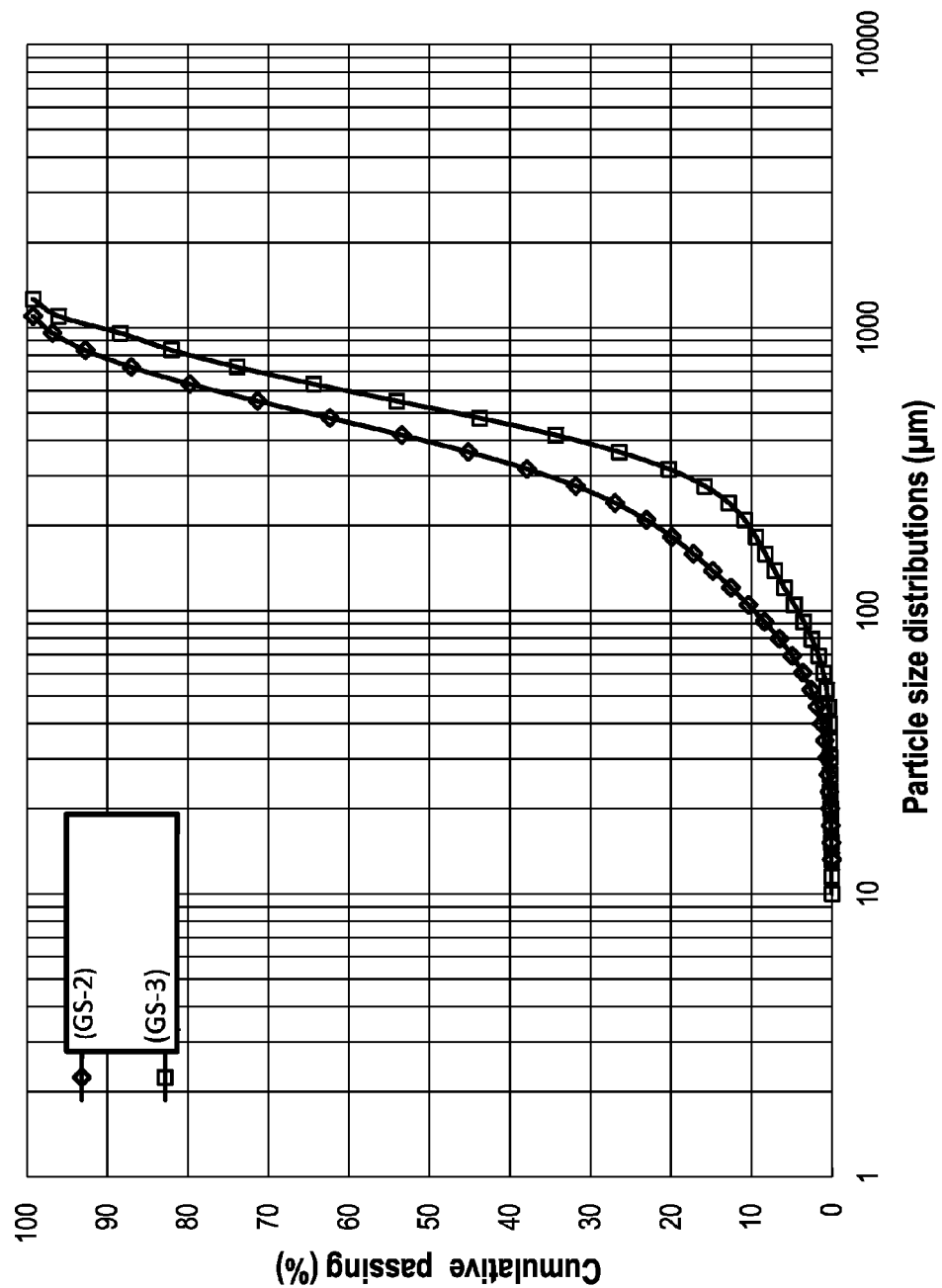
FIG. 13 is a graph showing the particle size distribution of glass sand types GS-2 and GS-3.

The quartz sand was replaced in an embodiment of UHPGC by different types of glass sand. GS-1 has a maximum particle size distribution of 1000 μm, while GS-2 and GS-3 have a maximum particle size distribution of 800 μm. GS-2 has finer particles than GS-3: GS-2 has a $d_{50}$ of 417 μm while GS-3 has a $d_{50}$ of 549 μm. The particle size distribution of GS-2 and GS-3 is shown in FIG. 13.

Figure 19A:
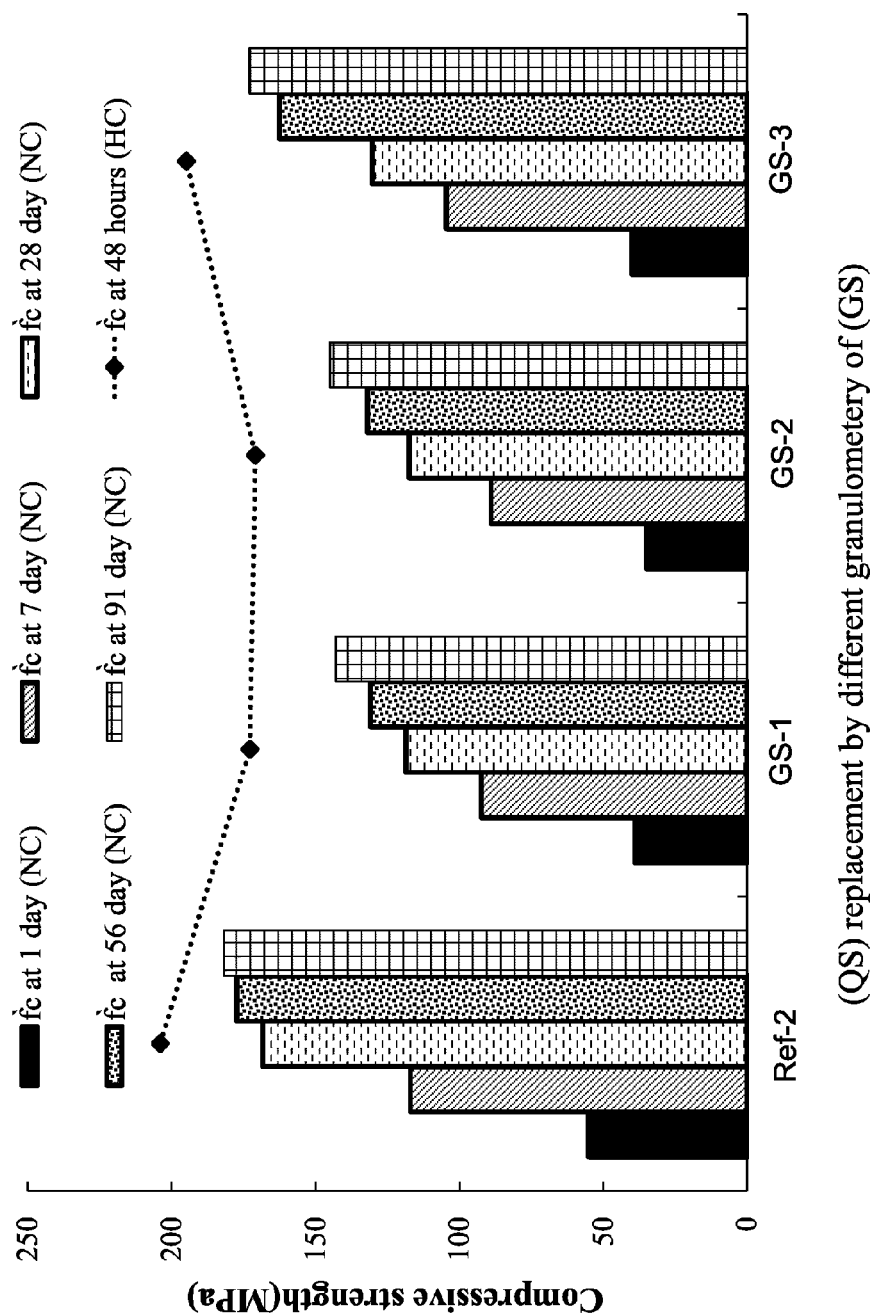
FIG. 19a is a graph showing the compressive strength in MPa of a traditional RPC (Ref-2) and of embodiments of UHGPC featuring different grades of glass sand (GS-1, GS-2 and GS-3)—as a function of time under normal curing, and after a 2-day hot curing.
Figure 19B:
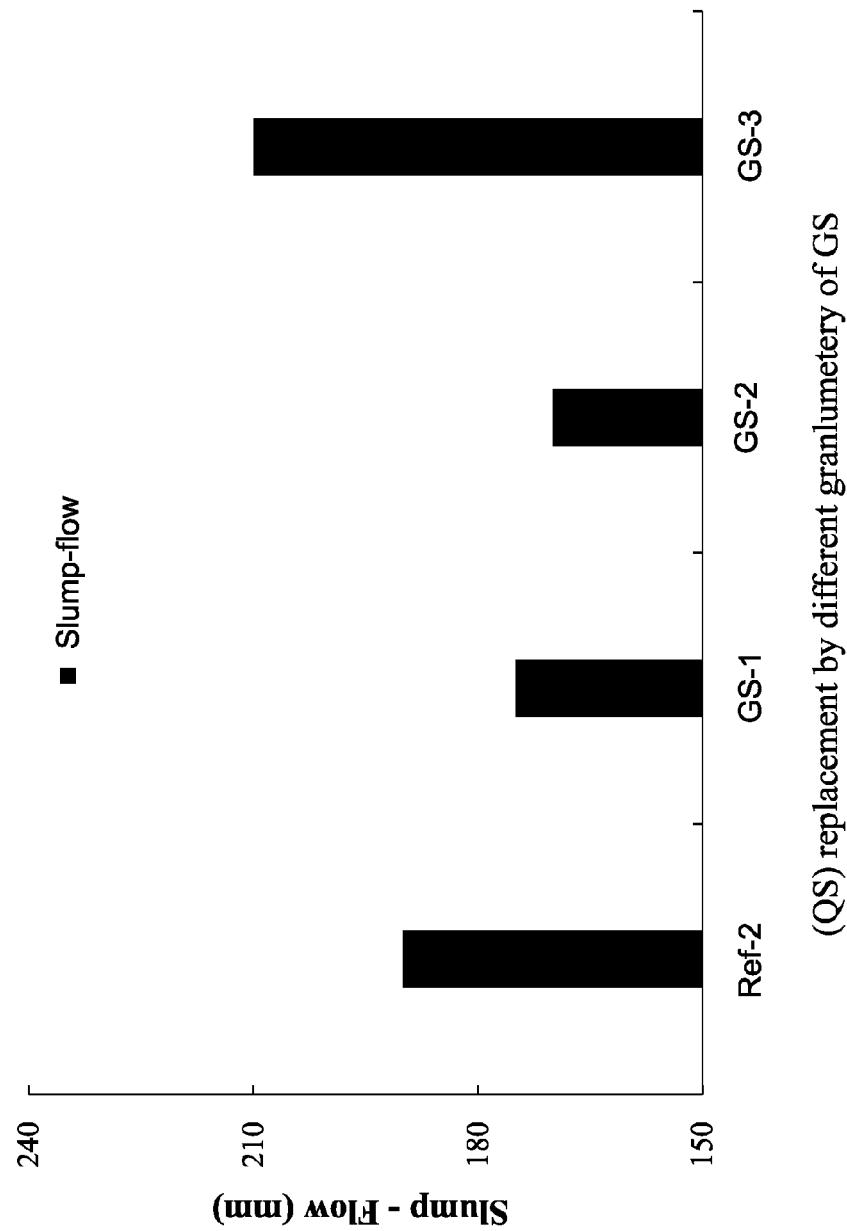
FIG. 19b is a graph showing the slump flow in mm of a traditional RPC (Ref-2) and of embodiments of UHGPC featuring different grades of glass sand (GS-2, GS-2 and GS-3).

FIG. 19a represents the compressive strength of UHPGC when QS was replaced by glass sands of different granulations. Interestingly the GS-3 increases the compressive strength as well as the slump flow as seen in FIG. 19b, compared to GS-2 and GS-1. The GS-3 replaced up to 100 wt % of quartz sand (about 1250 kg/m³) in conventional UHPC at different w/b equals (0.15 to 0.26) with a slight decrease in compressive strength.

Binary Replacement of Different Components of UHPGC

Tests were conducted to compare the compressive strength and slump flow of reference composition Ref-2 with the compressive strength and slump flow of mixtures P, Q and R (shown in Table 13 below).

pared to the compressive strength of an embodiment of UHPGC (Mixture Q) in which 20 wt % of cement (about 200 kg/m³) is replaced by GP and 100 wt % of QP is replaced by GP (about 250 kg/m³). An increase in compressive strength was observed from 206 to 228 MPa under steam curing regime at 90° C., and from 176 to 190 MPa after 91 days with a normal curing at 20° C. It has also been observed th at the use of glass powder enhances the workability, as the slump flow increased from 185 to 225 mm. The w/b of Mix Q is 0.189.

TABLE 13

Concrete mixtures Ref-2, P, Q and R

| Material and mixture | Ref-2 | | Mix P | | Mix Q | | Mix R | |
|---|---|---|---|---|---|---|---|---|
| | wt % of total concrete mass | kg/m³ | wt % of total concrete mass | kg/m³ | wt % of total concrete mass | kg/m³ | wt % of total concrete mass | kg/m³ |
| Water | 8.00 | 195.5 | 7.98 | 194 | 8.03 | 193 | 7.97 | 196 |
| Type HS Cement | 33.04 | 807 | 26.49 | 644 | 26.46 | 636 | 33.18 | 812 |
| Silica fume (SF) | 9.21 | 225 | 4.61 | 112 | 9.19 | 221 | 4.62 | 113 |
| Quartz sand (QS) | 39.80 | 972 | 39.74 | 966 | 39.68 | 954 | 39.80 | 974 |
| Quartz powder (QP) | 9.95 | 243 | 9.91 | 241 | — | — | — | — |
| Glass powder (GP) | — | — | 6.66 | 162 | 16.64 | 400 | 9.85 | 243 |
| Fine glass powder (FGP) | — | — | 4.61 | 112 | — | — | 4.58 | 113 |
| % solid of SP | | 13 | | 13 | | 13 | | 13 |

Example 10

Figures 20A, 20B:
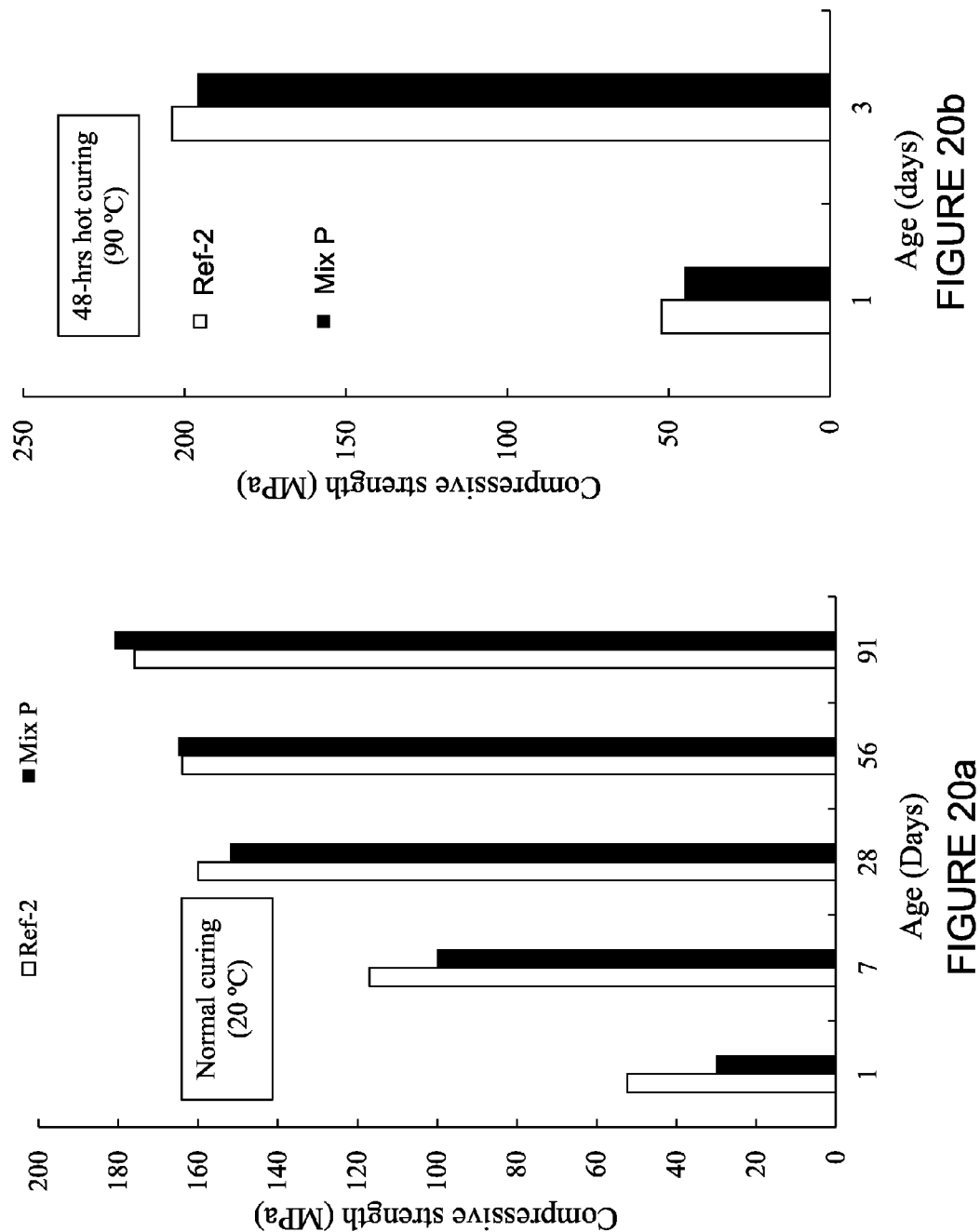
FIG. 20a shows the compressive strength as a function of time under normal curing and FIG. 20b shows the compressive strength as a function of time for a 48-hour hot curing.

Tests were conducted to show the effect of combining GP and FGP to replace cement and silica fume, respectively. FIG. 20 shows the compressive strength of reference mixture Ref-2 compared to the compressive strength of an embodiment of UHPGC (Mix P) in which 50 wt % of SF is replaced by FGP (about 140 kg/m³) and 20 wt % of cement is replaced by GP (about 200 kg/m³). It can be seen that combinations of GP and FGP have a significant effect on the compressive strength in 2-days hot curing regime at 90° C. In addition, an improvement in the workability was observed (slump flow increased from 185 mm to 280 mm). The w/b of Mix P is 0.189.

Example 11

Figures 21A, 21B:
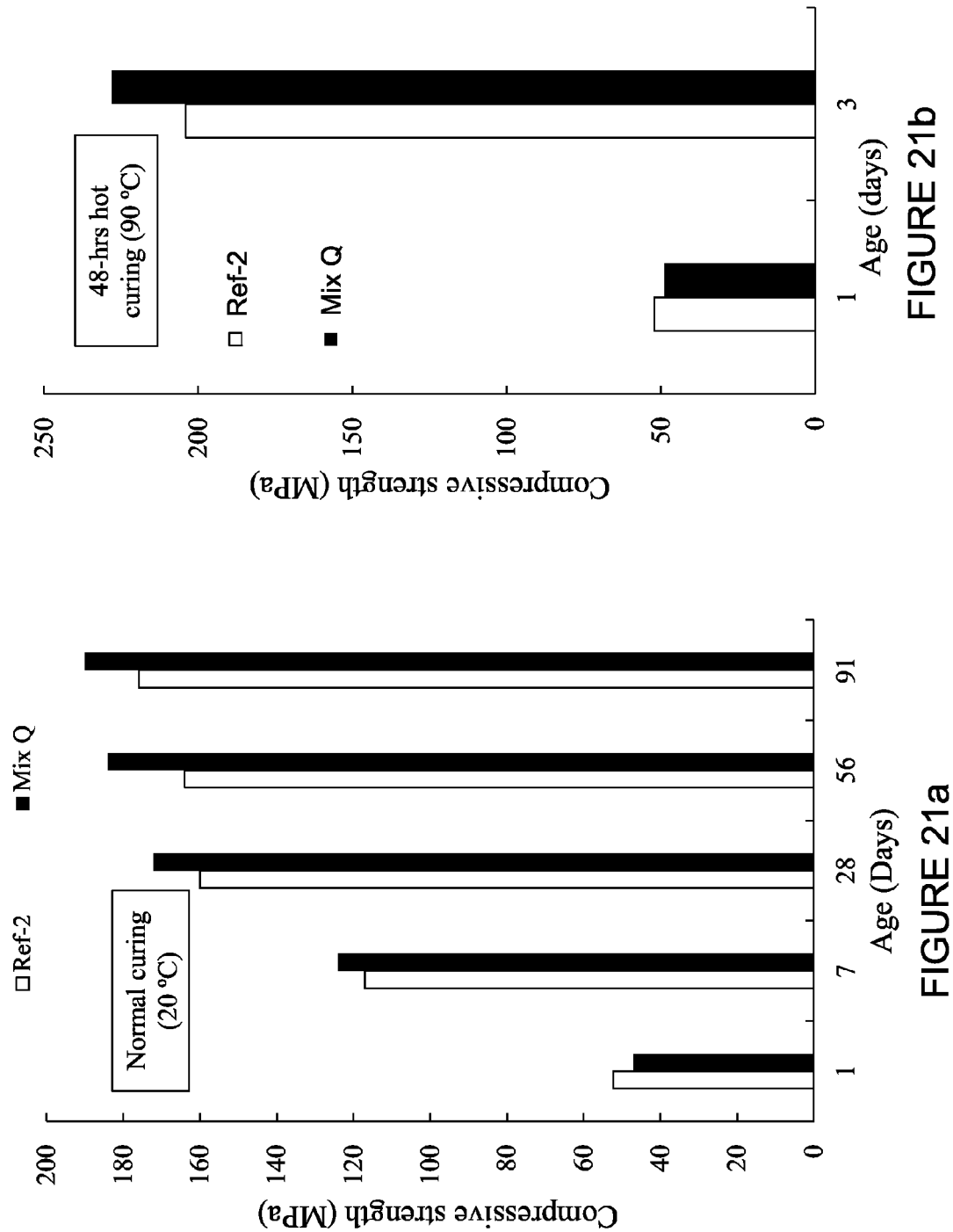
FIG. 21a shows the compressive strength as a function of time under normal curing and FIG. 21b shows the compressive strength as a function of time for a 48-hour hot curing.

Tests were conducted to show the effect of GP as a replacement to cement and quartz powder. FIG. 21 shows the compressive strength of reference mixture Ref-2 com- Example 12

Figures 22A, 22B:
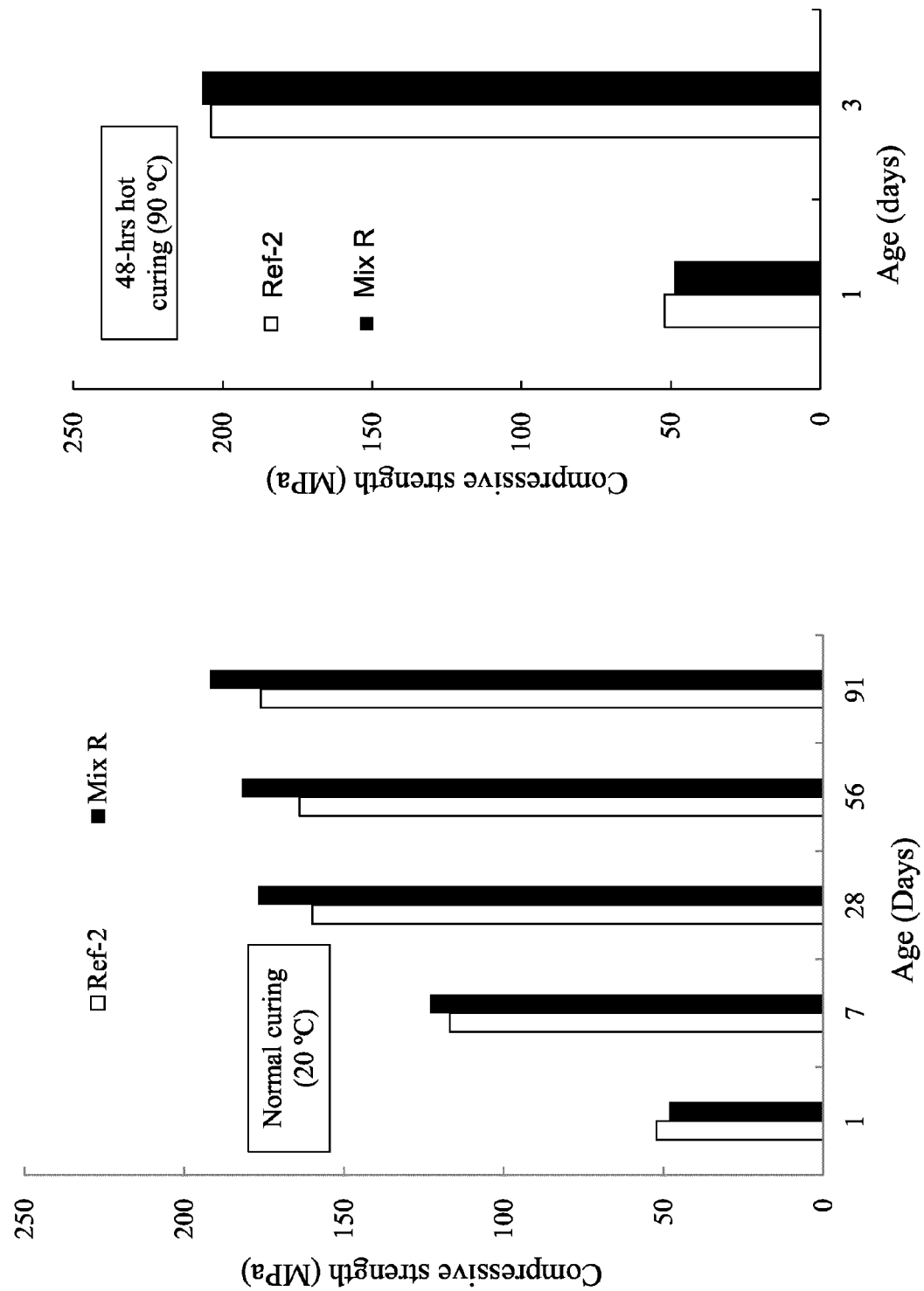
FIG. 22a shows the compressive strength as a function of time under normal curing and FIG. 22b shows the compressive strength as a function of time for a 48-hour hot curing.

Tests were conducted to show the effect of GP as a replacement to quartz powder and silica fume. FIG. 22 shows the compressive strength of reference mixture Ref-2 compared to the compressive strength of an embodiment of UHPGC (Mixture R) in which 50 wt % SF was replaced by GP (about 150 kg/m³) and 100 wt % QP was replaced by GP (about 250 kg/m³). An increase in compressive strength was observed from 206 to 212 MPa under steam curing regime at 90° C., and from 176 to 192 MPa after 91 days with a normal curing at 20° C. It has also been observed that the use of GP and FGP enhances the workability, as the slump flow increased from 185 to 250 mm. The w/b of Mix R is 0.189.

Ternary Replacement of Different Components of UHPGC

Tests were conducted to compare the compressive strength and slump flow of reference composition Ref-2 with the compressive strength and slump flow of mixtures S, T, U and V (shown in Table 14 below).

TABLE 14

Concrete mixtures S, T, U and V

| Material and mixture | Mix S | | Mix T | | Mix U | | Mix V | |
|---|---|---|---|---|---|---|---|---|
| | wt % of total concrete mass | kg/m³ | wt % of total concrete mass | kg/m³ | wt % of total concrete mass | kg/m³ | wt % of total concrete mass | kg/m³ |
| Water | 7.95 | 193 | 10.24 | 241 | 9.39 | 219 | 8.45 | 199 |
| Type HS Cement | 26.36 | 640 | 25.66 | 604 | 19.55 | 456 | 19.78 | 466 |

TABLE 14-continued

Concrete mixtures S, T, U and V

| Material and mixture | Mix S wt % of total concrete mass | Mix S kg/m³ | Mix T wt % of total concrete mass | Mix T kg/m³ | Mix U wt % of total concrete mass | Mix U kg/m³ | Mix V wt % of total concrete mass | Mix V kg/m³ |
|---|---|---|---|---|---|---|---|---|
| Silica fume (SF) | 6.45 | 142 | 5.61 | 132 | 6.52 | 152 | 6.58 | 155 |
| Quartz sand (QS) | 35.42 | 960 | 38.49 | 906 | 39.15 | 913 | 39.56 | 932 |
| Quartz powder (QP) | — | — | — | — | — | — | — | — |
| Glass powder (GP) | 15.38 | 400 | 16.44 | 387 | 22.86 | 533 | 23.09 | 544 |
| Fine glass powder (FGP) | 3.10 | 80 | 3.23 | 76 | 2.53 | 59 | 2.55 | 60 |
| % solid of SP | | 13 | | 8 | | 13 | | 17 |
| w/b ratio | 0.189 | | 0.25 | | 0.225 | | 0.2 | |

Example 13

Figures 23A, 23B:
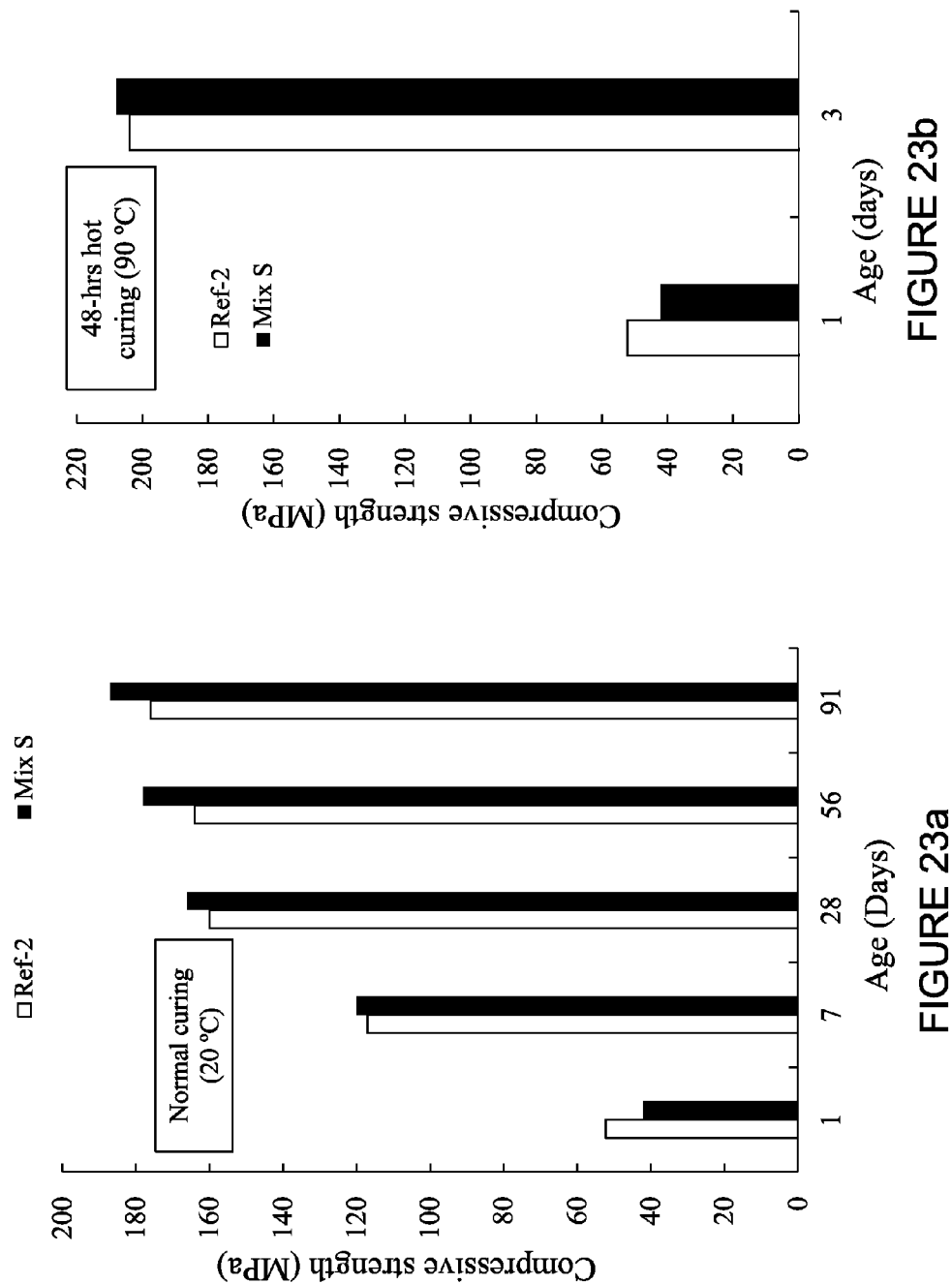
FIG. 23a shows the compressive strength as a function of time under normal curing and FIG. 23b shows the compressive strength as a function of time for a 48-hour hot curing.

Tests were conducted to show the effect of GP as a replacement to cement and QP, as well as the effect of FGP as a replacement to silica fume. FIG. 23 shows the compressive strength of reference mixture Ref-2 compared to the compressive strength of an embodiment of UHGPC (Mixture S) in which 40 wt % SF was replaced by FGP (about 150 kg/m³), 20 wt % cement was replaced by GP (about 200 kg/m³), and 100 wt % QP was replaced by GP (about 250 kg/m³) (w/b=0.15, SP=1.5 wt % according to cement content). An increase in compressive strength was observed from 206 to 209 MPa under steam curing regime at 90° C., and from 176 to 187 MPa with a normal curing at 20° C. It has also been observed that the use of a relatively high amount of GP and FGP enhanced the workability. More particularly, the workability was enhanced, as the slump flow was increased from 185 to 240 mm.

Example 14

Figures 24A, 24B:
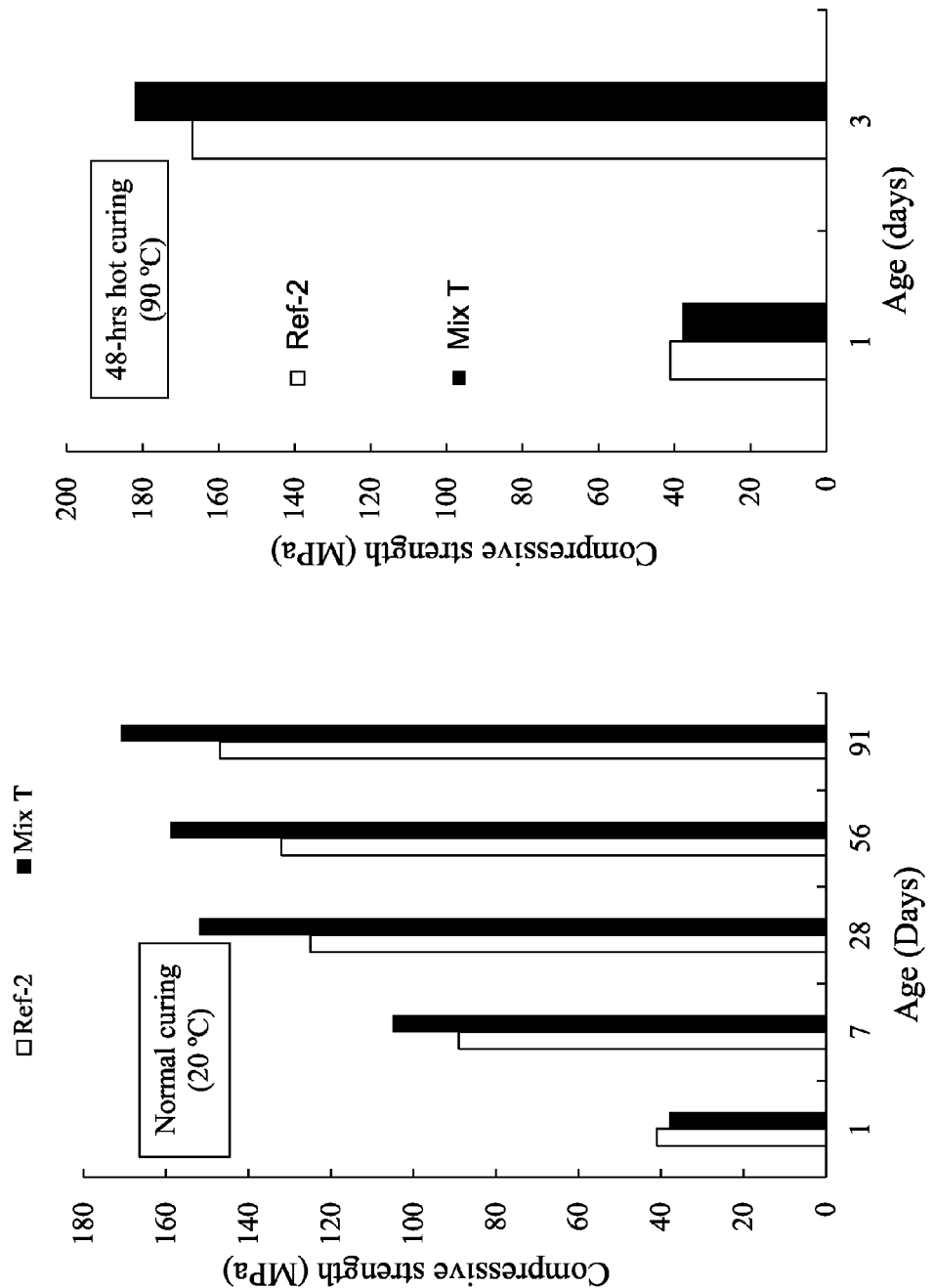
FIG. 24a shows the compressive strength as a function of time under normal curing and FIG. 24b shows the compressive strength as a function of time for a 48-hour hot curing.

Another series of tests were conducted to show the effect of GP as a replacement to cement and QP, as well as the effect of FGP as a replacement to silica fume. FIG. 24 shows the compressive strength of reference mixture Ref-2 compared to an embodiment of UHGPC (Mixture T) in which 40 wt % SF was replaced by FGP, 20 wt % cement was replaced by GP, and 100 wt % QP was replaced by GP (w/b=0.25 w/b, SP=1 wt % according to cement content). An increase in compressive strength was observed from 167 to 183 MPa under steam curing regime at 90° C., and from 147 to 171 MPa with a normal curing at 20° C. It has also been observed th at the workability was enhanced by the GP and the FGP, as the slump flow was increased from 250 to 300 mm.

Example 15

Figure 25B:
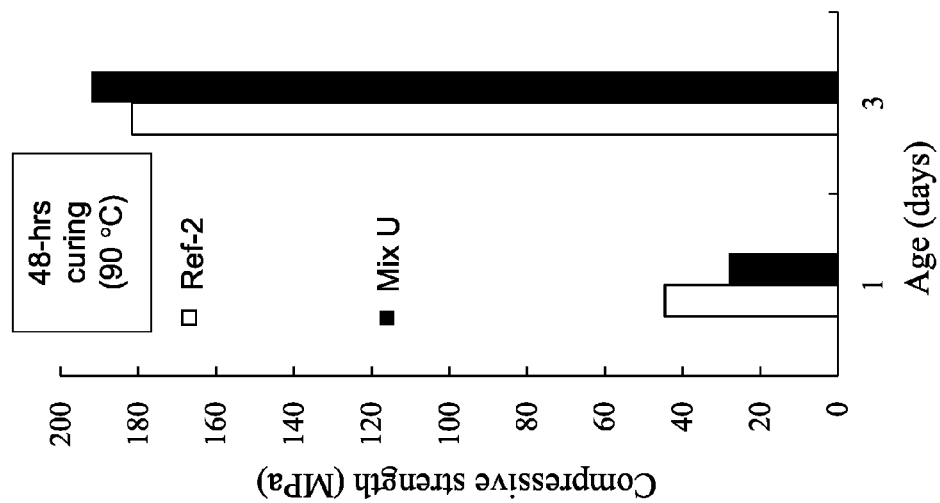
FIG. 25a shows the compressive strength as a function of time under normal curing and FIG. 25b shows the compressive strength as a function of time for a 48-hour hot curing.
Figure 25A:
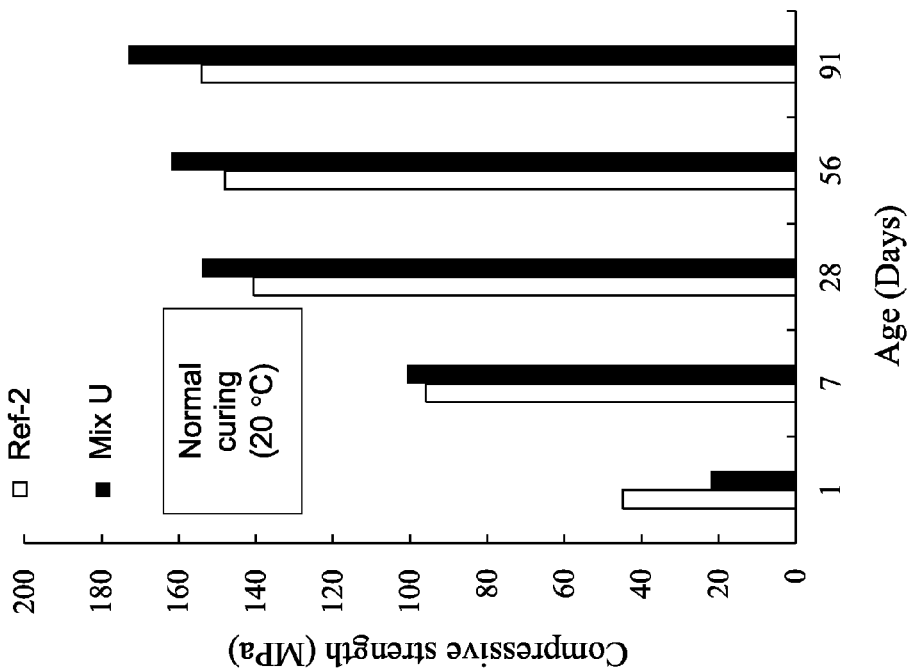

Another series of tests were conducted to show the effect of GP as a replacement to cement and QP, as well as the effect of FGP as a replacement to silica fume. FIG. 25 shows the compressive strength of reference mixture Ref-2 compared to an embodiment of UHGPC (Mixture U) in which 30 wt % SF was replaced by FGP (about 120 kg/m³), 40 wt % cement was replaced by GP (about 350 kg/m³), and 100 wt % QP was replaced by GP (about 250 kg/m³) (w/b=0.225 w/b, SP=1.5 wt % according to cement content). An increase in compressive strength was observed from 182 to 192 MPa under steam curing regime at 90° C., and from 154 to 173 MP a with a normal curing at 20° C. It has also been observed that the workability was enhanced by the use of different particle size distribution of glass, as the slump flow was increased from 230 to 300 mm.

Example 16

Figures 26A, 26B:
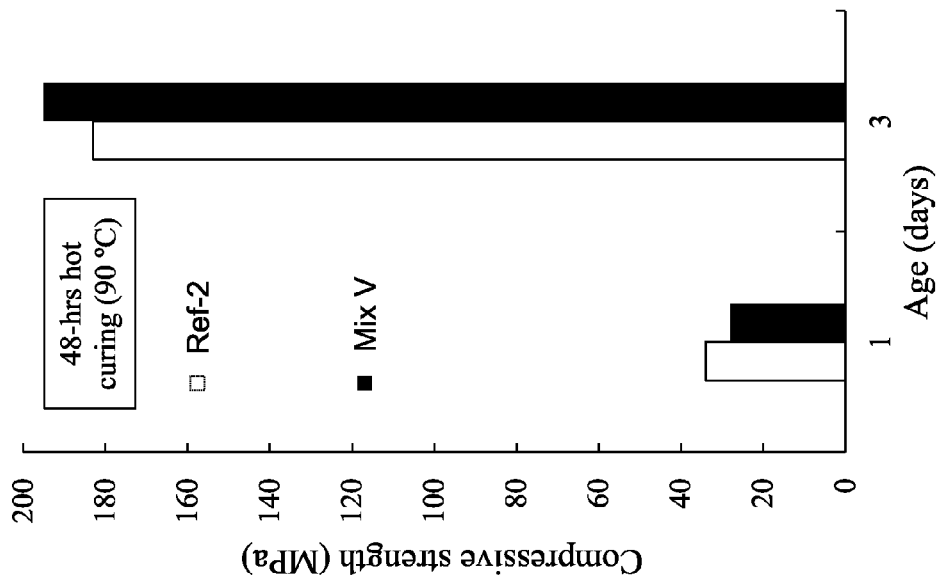
FIG. 26a shows the compressive strength as a function of time under normal curing and FIG. 26b shows the compressive strength for a 2-days hot curing.

Another series of tests were conducted to show the effect of GP as a replacement to cement and QP, as well as the effect of FGP as a replacement to silica fume. FIG. 26 shows the compressive strength of reference mixture Ref-2 compared to an embodiment of UHGPC (Mixture V) in which 30 wt % SF was replaced by FGP, 40 wt % cement was replaced by GP, and 100 wt % QP was replaced by GP (about 250 kg/m³) (w/b=0.2 w/b, SP=2 wt % according to cement content). An increase in compressive strength was observed from 183 to 195 MPa under steam curing regime at 90° C., and from 168 to 173 MPa with a normal curing at 20° C. It has also been observed that the workability was enhanced by the use of different particle size distribution of glass, as the slump flow was increased from 215 to 290 mm.

Properties of UHPGC and Effect of the Fibers

Example 17

Other embodiments of UHPGC were tested. The compositions of UHPGC tested (mixtures W and X) are shown in Table 15 below.

TABLE 15

Compositions of Mixes W and X

| Material and Mixture | Mix W (without fiber) wt % of total concrete mass | Mix W (without fiber) kg/m³ | Mix X (with fiber) wt % of total concrete mass | Mix X (with fiber) kg/m³ |
|---|---|---|---|---|
| Water | 10.30 | 239 | 10.25 | 237 |
| Type HS Cement | 24.28 | 562 | 24.31 | 556 |
| Silica fume (SF) | 9.02 | 208 | 8.94 | 206 |
| Quartz sand (QS) | 38.99 | 899 | 39.02 | 899 |
| Glass powder (GP) | 18.00 | 412 | 18.01 | 415 |
| Steel fiber | — | — | | 79 |
| % solid of SP | | 8 | | 8 |

Table 16 presents fresh concrete temperature, unit weight, air content, and slump-flow spread (without chock). It is seen that the incorporation of the glass powders resulted in producing a self-consolidating UHPGC with a slump flow 650 mm for the non-fibre concrete and 600 mm for the fibre concrete. The second mix had a content of 1% of fibres and it was possible to keep almost the same flow as the one that did not contain any fibres. It seen that the polycarboxylate-based superplasticizer (SIKA-Viscocrete™ 6100) used entrained a high amount of entrapped air over 3% in that case.

TABLE 16

Fresh properties of UHPGC

| Mixture | Slump flow (mm) | Theoretical unit weight (kg/m$^3$) | Air voids (%) | Temperature (° C.) |
|---|---|---|---|---|
| Mix W (Non-Fibre) | 650 | 2330 | 3.2 | 22 |
| Mix X (Fibre) | 600 | 2390 | 3.3 | 23 |

Figure 27:
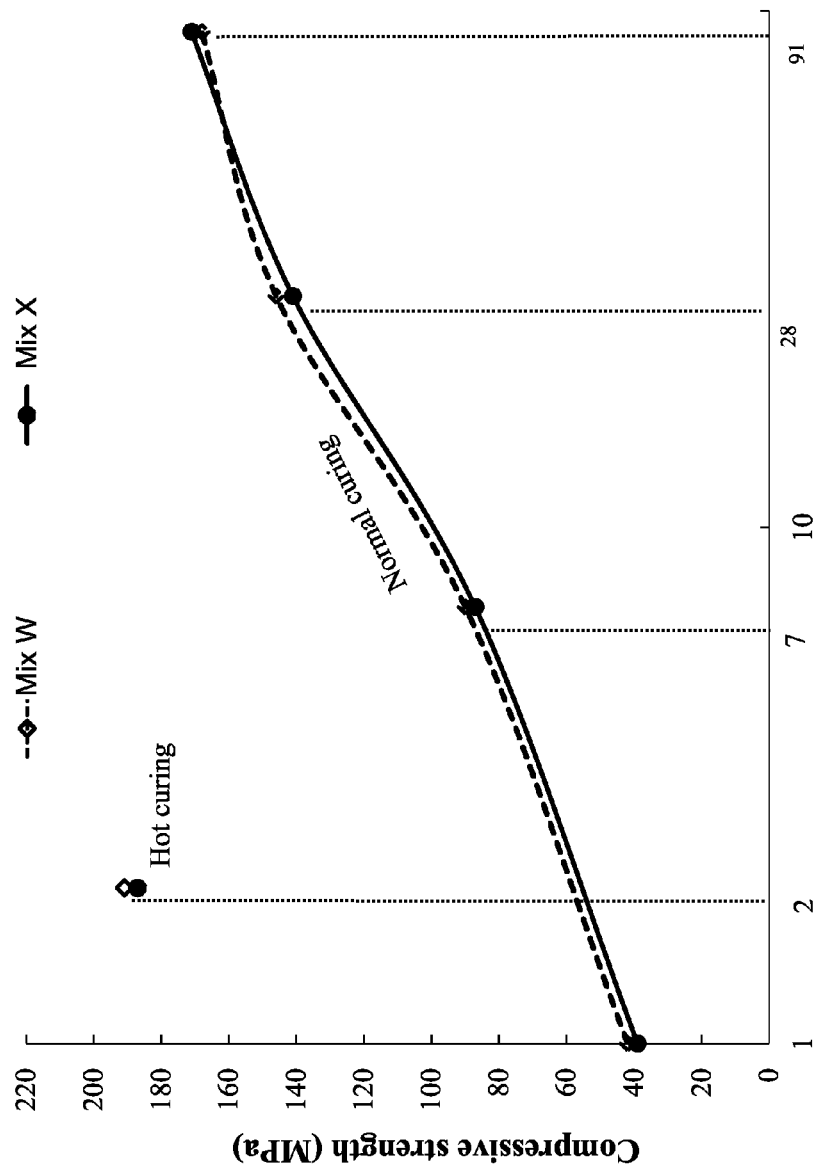
FIG. 27 is a graph showing the compressive strength in MPa of embodiments of UHPGC with or without fibre—as a function of time under normal curing, and after a 2-days hot curing.

The compressive strength of the various UHPGC was measured at different ages as seen in FIG. 27. The compressive strengths of the mixtures without fiber and with fiber were 191 and 187 MPa after steam curing, respectively. It can be seen that the compressive strength is practically not increased by the fibers, due to the low content of the fibres which occupied 1% of the volume of the UHPGC mix, as shown in FIG. 27. Also, FIG. 27 compares compressive strengths obtained for normal curing and the steam curing. It is seen globally that the heat treatment did not increase significantly the compressive strength. It is only accelerate the achievement of the final strength. The difference between the two different curing regimes after 91 days of normal curing is less than 10%.

Figure 28:
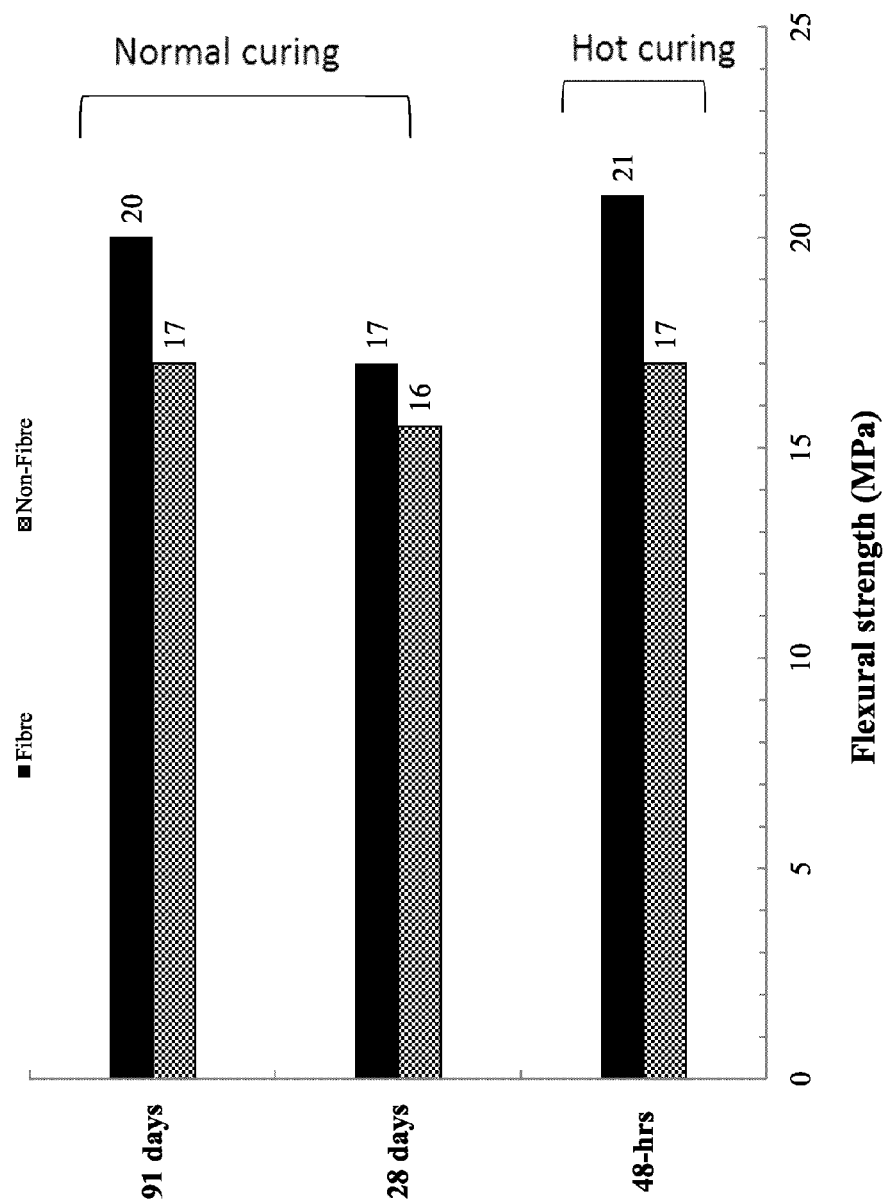
FIG. 28 is a graph showing the flexural strength in MPa of embodiments of UHPGC with or without fibre—as a function of time under normal curing, and after a 2-days hot curing.

The ASTM C 1018 standard test method was used to determine the flexure strength. The flexural strength results are shown in FIG. 28. As can be seen, the inclusion of the fibers increased the flexural strength of UHPGC. The UHPGC made with 1% fibers had flexural strength of 20 MPa under standard curing for 91 days and 21 MPa under steam curing regime. It is seen globally that the heat treatment did not increase significantly the flexural strength. The same type of results was obtained also when measuring the splitting strength according to ASTM C496 standard. The UHPGC made with 1 wt % fiber had tensile strength of 15 MPa under standard curing for 91 days and 16 MPa under steam curing regime.

The modulus of elasticity was measured on 100×200 mm cylinders from each of two curing regime following the ASTM C 469 standard. Table 17 shown below presents the values of the modulus of elasticity. The elastic modulus is not significantly affected by the type of curing, age and fibers content.

TABLE 17

Modulus of elasticity of UHPGC

| Age and type of curing | Mix W (Non-Fiber) | Mix X (Fiber) |
|---|---|---|
| 48-hours hot curing | 50 GPa | 51 GPa |
| 28 days normal curing | 48 GPa | 49 GPa |
| 91 days normal curing | 49 GPa | 49 GPa |

Figure 29:
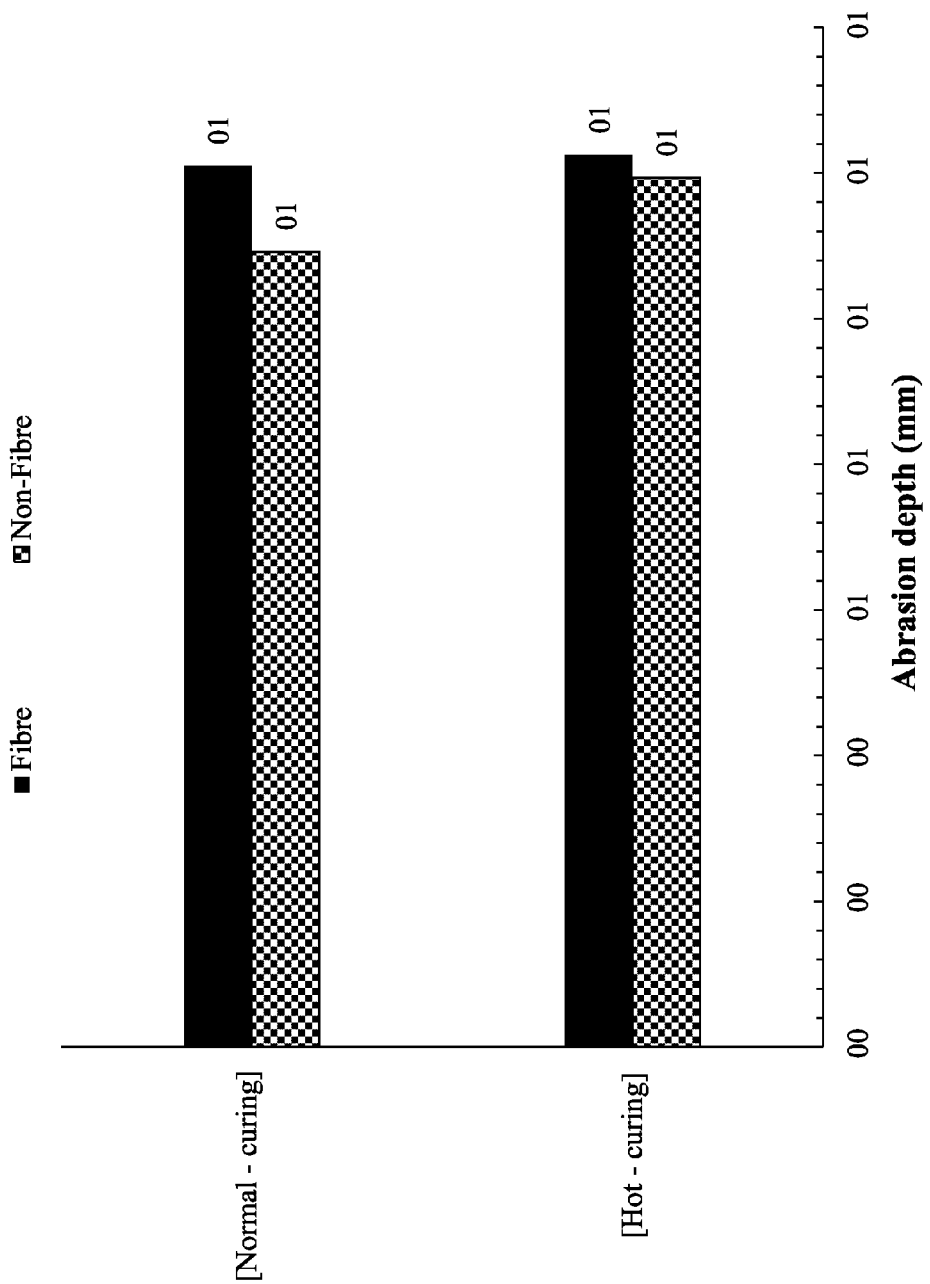
FIG. 29 is a graph showing the abrasion depth in mm of embodiments of UHPGC with or without fibre, after a normal curing or after a hot curing.

Abrasion resistance was measured according to ASTM C944 standard. Abrasion resistance in concrete is usually measured as a relative volume loss index. Glass is used as a reference material, which has a relative volume loss index of 1.0. The abrasion test was performed on two specimens from each of the two curing regimes as well as with and without fiber. The value of a relative volume loss index of UHPGC ranges from approximately 1 to 1.2 as seen in FIG. 29.

Figure 30:
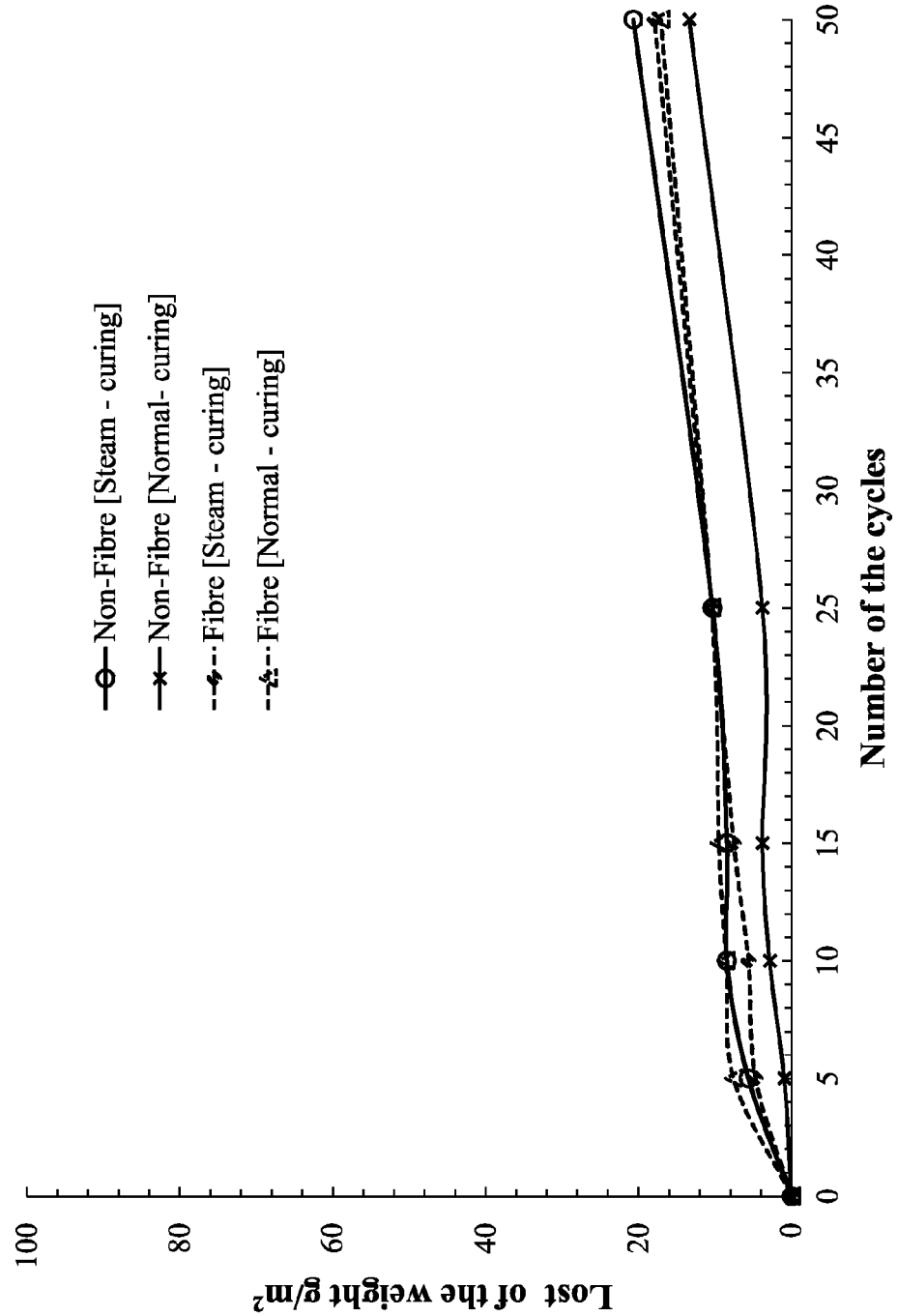
FIG. 30 is a graph showing the scaling resistance of embodiments of UHPGC with or without fiber, after a normal curing or after a hot curing.

Scaling resistance was measured according to ASTM C672 standard. The weight loss measured was between 13 to 21 g/m$^2$ after 50 freeze-thaw cycles as presented in FIG. 30, which is a very low value. Estimate of salt scaling of UHPC reported in the literature vary from approximately 8 to 60 g/m$^2$ for studies conducted between 28 and 50 freeze-thaw cycles. The mass lost from salt scaling of HPC and NC are much higher than that of UHPC at (150 g/m$^2$) for HPC and (1500 g/m$^2$) for normal concrete.

Figure 31:
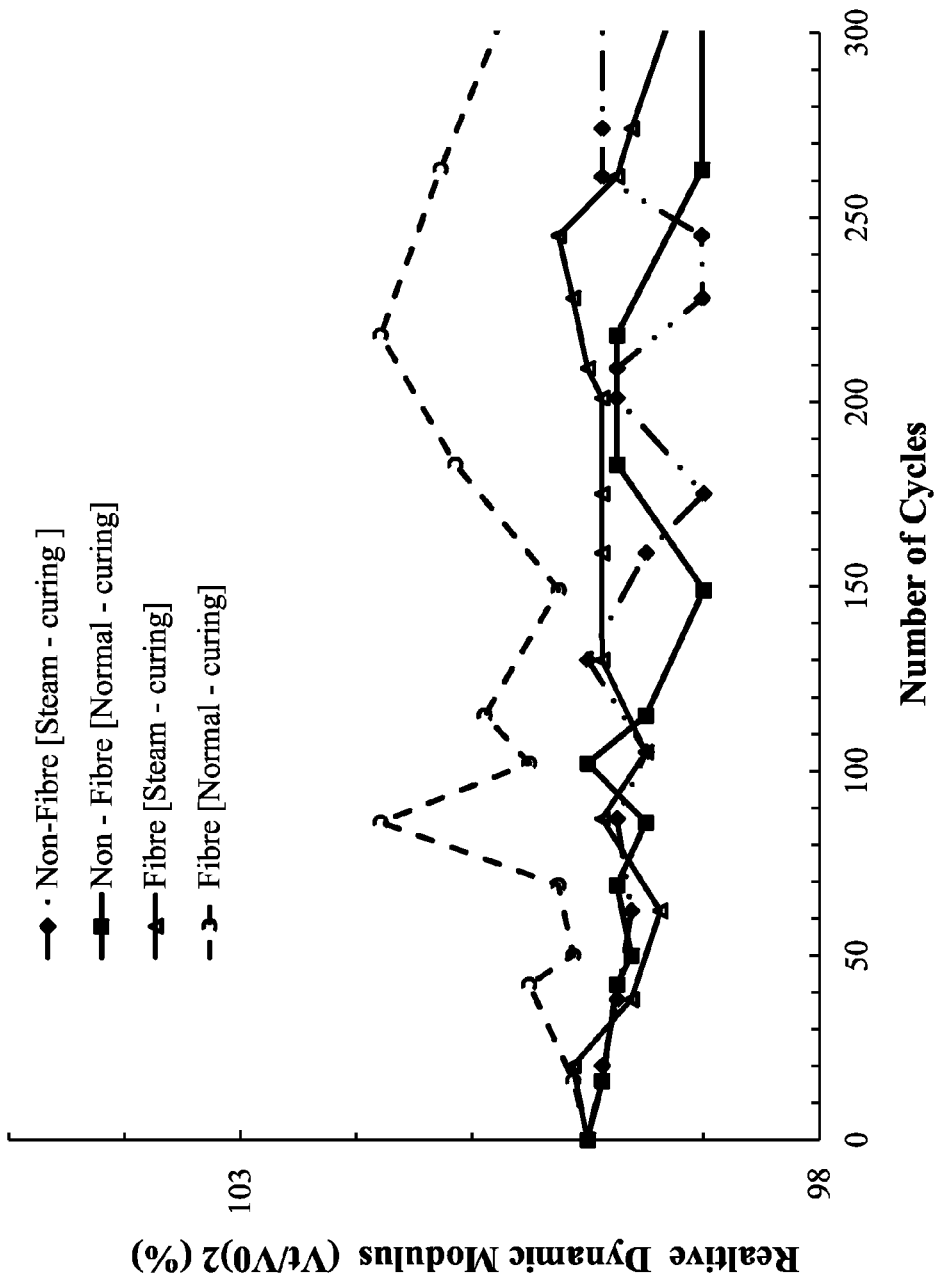
FIG. 31 is a graph showing the freeze-thaw resistance of embodiments of UHPGC with or without fiber, after a normal curing or after a 2-days hot curing.

The freeze-thaw resistance of UHPGC was tested according to ASTM C666 standard. Periodically, the cycling is stopped and the dynamic modulus of elasticity of the specimens was measured. FIG. 31 provides the results for 300 freeze-thaw cycles. The results show that the specimens with normal or heat curing and with or without fibre maintained their dynamic modulus characteristics close to their original UHPC.

Rapid chloride ion penetrability tests were completed on UHPGC specimens according to ASTM C1202. The electrical current was recorded at 1 minute intervals over the 6 hour time frame, resulting in the total coulombs passed value shown in Table 18. Two or three specimens were tested for each condition. The specimens were tested at both 28 and 91 days for normal curing and 48 hours hot curing with and without fibre. The results show that the chloride ion permeability is very low, regardless of the curing regime applied.

TABLE 18

Charges passed during rapid chloride ion penetrability test (ASTM C1202)

| Curing Method | Mixture | Tests | Age (days) | Coulombs passed |
|---|---|---|---|---|
| Normal curing | Non Fiber | 2 | 28 | 30 |
| | Fiber | | | 28 |
| Normal curing | Non Fiber | 2 | 91 | 18 |
| | Fiber | | | 20 |
| Steam curing | Non Fiber | 2 | 2 | 8 |
| | Fiber | | | 7 |

Alkali-silica reaction testing was performed in accordance with ASTM C1260 standard. The only modification made to this standard was that the test duration was extended from 14 to 28 days to provide more time for the initiation of the alkali-silica reaction if any. Table 19 provides the results from these tests. In all the cases, the expansion was approximately an order of magnitude below the specification that defines innocuous alkali-silica reaction behaviour which is 0.10%.

TABLE 19

Alkali-silica reactivity expansion (ASTM C1260)

| Mixture | Tests | Expansion (%) |
|---|---|---|
| Non Fiber | 2 | 0.004 |
| Fiber | 2 | 0.009 |

CONCLUSION

The above-described UHPGC provide the possibility to, amongst others, produce the concrete on site; reduce the production cost by replacing expensive materials by waste glass particles; follow the sustainable development trend; and reduce the quantity of concrete and eliminate the need of using steel.

Amongst others, the above-described UHPGC can be used for bridges, beams, truss type structures, decks of steel bridges, buildings, slabs, permanent floor formwork, curtain wall panels, facade panels, columns, false floor panels, stand seating plats, railways, sleepers, sound absorbing panels, noise walls, highways, light poles, crash barriers, noise walls, pipes, hazardous waste containment, arch culverts, blast protection, and vaults.

The above-described UHPGC can be used as reinforced concrete wherein reinforcing bars, such as steel reinforcing bars, polymer reinforcing bars or composite materials reinforcing bars, are embedded in the UHPGC before it sets.

The UHPGC is thus produced by using waste glass materials (glass sand, glass powder, and fine glass powder) of different particle-size distribution (PSD), the PSD being selected individually based on the packing density and the sustainability theory. The UHPGC comprises glass sand, high amount of glass powder, and moderate content of fine glass powder, moderate content of cement, moderate content of high reactive pozzolanic material (silica fume, SF), fine steel fibers (to increase tensile strength and improve ductility), low water-to-binder ratio (w/b), and moderate dosage of high-range water-reducing admixture (HRWRA).

It will be appreciated that the methods described herein may be performed in the described order, or in any suitable order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. Ultra-high performance glass concrete (UHPGC) comprising:
a cement content between 300 and 1000 kg/m$^3$;
between 0 and 1400 kg/m$^3$ of glass sand (GS) with a mean diameter between about 250 µm and 400 µm;
between 0 and 300 kg/m$^3$ of reactive pozzolanic material;
between 150 and 900 kg/m$^3$ of glass powder (GP) with a mean diameter between about 10 µm and 13 µm;
between 0 and 600 kg/m$^3$ of fine glass powder (FGP) with a mean diameter between about 1 µm and 3 µm;
between 5 and 60 kg/m$^3$ of superplasticizer;
between 50 and 300 kg/m$^3$ of fiber; and
between 130 and 275 kg/m$^3$ of water,
wherein a content of GP is of at least 3 wt % of the UHPGC, and/or a content of GS is of at least 19 wt % of the UHPGC, and/or a content of FGP is of at least 0.5 wt % of the UHPGC.

2. The UHPGC of claim 1, wherein the content of GP is of at least 6 wt % of the UHPGC, and/or the content of GS is of at least 26 wt % of the UHPGC, and/or the content of FGP is of at least 0.7 wt % of the UHPGC.

3. The UHPGC of claim 1, wherein the cement comprises particles smaller than about 100 µm and is at least one of high sulface resistance (HS) cement and low heat of hydratation (LH) cement.

4. The UHPGC of claim 1, wherein the content of glass powder (GP) ranges between about 10 wt % and about 80 wt % of the cement content and a content of reactive pozzolanic material ranges between 15 wt % and 30 wt % of the cement content.

5. The UHPGC of claim 1, wherein the glass powder comprises particles smaller than about 100 µm, the glass sand comprises particles between about 150 µm and about 850 µm, and the fine glass powder comprises particles smaller than about 10 µm.

6. The UHPGC of claim 1, wherein the reactive pozzolanic material comprises silica fume with particles between about 0.10 µm and about 0.20 µm.

7. The UHPGC of claim 1, wherein a content of the superplasticizer ranges between 1 wt % and 4 wt % of the cement content.

8. The UHPGC of claim 1, wherein the ultra-high performance concrete has a compressive strength between 130 MPa and 270 MPa and a slump-flow between 130 mm and 350 mm.

9. The UHPGC of claim 1, wherein the ultra-high performance concrete has a water to binder ratio between 0.10 and 0.30 and a packing density between 0.71 and 0.85.

10. The UHPGC of claim 1, further comprising at least one of quartz sand with particles ranging between about 150 µm and about 650 µm in a content below 960 kg/m$^3$ and quartz powder with particles smaller than about 100 µm in a content below 245 kg/m$^3$.

11. Ultra-high performance glass concrete (UHPGC) comprising:
between about 15 wt % and about 40 wt % of cement;
between about 0 wt % and about 40 wt % of glass sand (GS) with a mean diameter between about 250 µm and 400 µm;
between about 4.5 wt % and about 10 wt % of reactive pozzolanic material;
between about 5 wt % and about 25 wt % of glass powder (GP) with a mean diameter between about 10 µm and 13 µm;
between about 0.5 wt % and about 10 wt % of fine glass powder (FGP) with a mean diameter between about 1 µm and 3 µm;
between about 0.2 wt % and about 4 wt % of superplasticizer;

fibers; and
between about 4 wt % and about 10 wt % of water,
wherein a sum of GS+GP+FGP is greater than or equal to about 10 wt %.

12. The UHPGC of claim 11, wherein the sum GS+GP+FGP is greater than or equal to about 30 wt %.

13. The UHPGC of claim 11, wherein a content of GP is of at least 6 wt % of the UHPGC, and/or a content of GS is of at least 26 wt % of the UHPGC, and/or a content of FGP is of at least 0.7 wt % of the UHPGC.

14. The UHPGC of claim 11, wherein the cement comprises particles smaller than about 100 µm and is at least one of high sulfate resistance (HS) cement and low heat of hydration (LH) cement.

15. The UHPGC of claim 11, wherein the glass powder comprises particles smaller than about 100 µm, the glass sand comprises particles between about 150 µm and about 850 µm, and the fine-glass powder comprises particles smaller than about 10 µm.

16. The UHPGC of claim 11, wherein a content of reactive pozzolanic material ranges between 15 wt % and 30 wt % of the cement content and comprises silica fume with particles between about 0.10 µm and about 0.20 µm.

17. The UHPGC of claim 11, wherein the content of the superplasticizer ranges between 1 wt % and 4 wt % of the cement content.

18. The UHPGC of claim 11, wherein the ultra-high performance concrete has a compressive strength between 130 MPa and 270 MPa, a slump-flow between 130 mm and 350 mm, a water to binder ratio between 0.10 and 0.30 and a packing density between 0.71 and 0.85.

19. The UHPGC of claim 11, further comprising at least one of quartz sand with particles ranging between about 150 µm and about 650 µm in a content below 120 wt % of the total cement content and quartz powder with particles smaller than about 100 µm in a content below 30 wt % of the total cement content.

20. A composition for a ultra-high performance concrete comprising: cement particles; quartz sand with a diameter smaller than about 650 µm in a ratio between 0 and 1.4 of the cement content, glass sand with a mean diameter between about 250 µm and 400 µm in a ratio between 0 and 1.40 of the cement content, quartz powder with a diameter smaller than about 100 µm in a ratio between 0 and 0.40 of the cement content, reactive pozzolanic material in a ratio between 0.15 and 0.30 of the cement content, glass powder with a mean diameter between about 10 µm and 13 µm in a ratio between 0.10 and 0.90 of the cement content, fine glass powder with a mean diameter between about 1 µm and 3 µm in a ratio between 0.1 and 0.40 of the cement content, a superplasticizer in a ratio between 0.01 and 0.04 of the cement content, fibers, and wherein the composition has a water to binder ratio between 0.10 and 0.30.

21. The composition of claim 20, wherein the reactive pozzolanic material comprises silica fume with particles between about 0.10 µm and about 0.20 µm.

22. The composition of claim 20, wherein a content of glass powder is of at least 6 wt % of the composition, and/or a content of glass sand is of at least 26 wt % of the composition, and/or a content of fine glass powder is of at least 0.7 wt % of the composition.

23. The composition of claim 20, wherein the cement comprises particles smaller than about 100 µm and is at least one of high sulface resistance (HS) cement and low heat of hydratation (LH) cement; the ratio of the glass powder (GP) ranges between about 0.2 and 0.7 of the cement content and the glass powder comprises particles smaller than about 100 µm; and the ratio of glass sand is above 0.8 of the cement content and the glass sand comprises particles between about 150 µm and about 850 µm.

24. The composition of claim 20, wherein the ultra-high performance concrete has a compressive strength between 130 MPa and 270 MPa and a slump-flow between 130 mm and 350 mm.

25. The composition of claim 20, wherein the composition has a water to binder ratio between 0.10 and 0.30 and a packing density between 0.71 and 0.85.

26. The composition of claim 20, wherein the fine glass powder comprises particles smaller than about 10 µm.

27. Ultra-high performance glass concrete (UHPGC) comprising:
between about 15 wt % and about 40 wt % of cement;
between about 0 wt % and about 40 wt % of glass sand (GS) with a mean diameter between about 250 µm and 400 µm;
between about 4.5 wt % and about 10 wt % of reactive pozzolanic material;
between about 5 wt % and about 25 wt % of glass powder (GP) with a mean diameter between about 10 µm and 13 µm;
between about 0 wt % and about 10 wt % of fine glass powder (FGP) with a mean diameter between about 1 µm and 3 µm;
between about 0.2 wt % and about 4 wt % of superplasticizer;
fibers; and
between about 4 wt % and about 10 wt % of water,
wherein a sum of GS+GP+FGP is greater than or equal to about 30 wt %.

28. The UHPGC of claim 27, wherein the fine glass powder comprises particles smaller than about 10 µm.

* * * * *